(12) United States Patent
Bouzakri et al.

(10) Patent No.: US 12,508,301 B2
(45) Date of Patent: Dec. 30, 2025

(54) DECORIN FOR ITS USE IN THE TREATMENT OF DIABETES

(71) Applicants: CENTRE EUROPEEN D'ETUDE DU DIABETE, Strasbourg (FR); Karim Bouzakri, Truchtersheim (FR)

(72) Inventors: Karim Bouzakri, Truchtersheim (FR); Michel Pinget, Bernolsheim (FR)

(73) Assignee: CENTRE EUROPEEN D'ETUDE DU DIABETE, Strasbourg (FR)

( * ) Notice: Subject to any disclaimer, the term of this patent is extended or adjusted under 35 U.S.C. 154(b) by 845 days.

(21) Appl. No.: 17/416,130

(22) PCT Filed: Dec. 19, 2019

(86) PCT No.: PCT/FR2019/053186
§ 371 (c)(1),
(2) Date: Jun. 18, 2021

(87) PCT Pub. No.: WO2020/128351
PCT Pub. Date: Jun. 25, 2020

(65) Prior Publication Data
US 2022/0072106 A1     Mar. 10, 2022

(30) Foreign Application Priority Data

Dec. 19, 2018 (FR) ........................ 1873296

(51) Int. Cl.
| | | |
|---|---|---|
| *A61K 38/17* | (2006.01) | |
| *A61K 38/39* | (2006.01) | |
| *A61K 45/06* | (2006.01) | |
| *A61P 1/18* | (2006.01) | |
| *A61P 3/10* | (2006.01) | |
| *C07K 14/47* | (2006.01) | |

(52) U.S. Cl.
CPC ............ *A61K 38/39* (2013.01); *A61K 45/06* (2013.01); *A61P 3/10* (2018.01)

(58) Field of Classification Search
CPC ........ A61K 38/17; A61K 38/39; A61K 45/06; A61P 1/18; A61P 3/10; C07K 14/47
See application file for complete search history.

(56) References Cited

U.S. PATENT DOCUMENTS

2019/0062447 A1*  2/2019  Levit .................... A61K 47/183

FOREIGN PATENT DOCUMENTS

| EP | 0616536 | * | 3/1999 | ............. A61K 38/00 |
| WO | 2011069046 A1 | | 6/2011 | |

OTHER PUBLICATIONS

Zhang et al., "Decorin is a pivotal effector in the extracellular matrix and tumour microenvironment," Oncotarget, 2018, 9(4): 5480-5491. (Year: 2018).*
Gitelman et al., "Antithymocyte globulin therapy for patients with recent-onset type 1 diabetes: 2 year results of a randomised trial," Diabetologia, 2016, 59: 1153-1161. (Year: 2016).*
International Search Report (PCT/ISA/210) and Written Opinion (PCT/ISA/237) mailed on Mar. 17, 2020, by the European Patent Office as the International Searching Authority for International Application No. PCT/FR2019/053186.
Haider, et al.,"Decorin: A new positive component of skeletal muscle to beta cell communication?", DIABETOLOGIA,, vol. 58, p. S222, Aug. 12, 2015, XP055621520.
Bouzakri, K. et al., "Decorin: a new positive component of skeletal muscle to beta cell communication which prevent TNF-alpha and insulin resistance condition medium effect on beta cells", DIABETOLOGIA, vol. 59, pages S171-S172, Aug. 1, 2016, XP055621498.
Ferrini, M. G. et al., "Amelioration of diabetes-induced cavernosal fibrosis by antioxidant and anti-transforming growth factor-[beta]1 therapies in inducible nitric oxide synthase-deficient mice: Corporal Fibrosis Amelioration in Diabetic Inos Knockout Mice", BJU International, vol. 109, No. 4, pp. 586-593, Feb. 1, 2012, XP055621165.

\* cited by examiner

*Primary Examiner* — Julie Ha
(74) *Attorney, Agent, or Firm* — BUCHANAN INGERSOLL & ROONEY PC

(57) ABSTRACT

Decorin or a composition containing decorin for use in the treatment of type 1 diabetes, type 2 diabetes or gestational diabetes is described herein. Decorin or a composition containing decorin is also described for use in the context of transplanting pancreatic islet cells.

13 Claims, 18 Drawing Sheets

Specification includes a Sequence Listing.

N=2

DECORIN FOR ITS USE IN THE TREATMENT OF DIABETES

TECHNICAL FIELD

The present disclosure relates to the field of health and more particularly concerns the treatment of diabetes.

Technological Background

Currently, a person dies from diabetes every six seconds. In 2017, the estimation of the WHO reports that there are 466 million people with diabetes worldwide and 3.5 million in France (in addition between 500,000 and 800,000 with diabetes do not know). Diabetes is a chronic disease that appears when the pancreas does not produce enough insulin or that the organism does not properly use the insulin it produces. This results in a disorder of the assimilation, the use and the storage of the glucose supplied during the various meals of the day. This results in an increase in the blood glucose level, which is hyperglycemia. According to the World Health Organization (WHO), if the blood glucose level is greater than 1.26 g/L fasting, then the patient is diabetic. There are many forms of diabetes, the main ones being type 1 diabetes, type 2 diabetes and gestational diabetes.

Type 1 diabetes, also known as insulin-dependent diabetes, occurs after the destruction of the insulin-producing pancreatic cells by the patient's immune system: beta cells. This results in a significant decrease in the amount of insulin produced by the body, thus causing an increase in the blood glucose level. There are many acute symptoms, in particular a polyuria (excessive excretion of urine), a polydipsia (intense thirst), a constant hunger and a weight loss.

To treat diabetic patients, several therapeutic solutions exist.

The first option is insulin therapy, based on the multi-daily administration of insulin by injection with an insulin pen or by infusion with insulin pumps. This type of treatment is highly constraining and strongly impacts the quality of life of patients.

The second option is pancreatic transplantation. This surgical treatment is reserved for diabetic patients with severe kidney complications and who need to undergo dialyses. In this case, the pancreas graft is generally associated with the grafting of another organ, in general the kidney. The operation has the advantage of completely replacing the insulin injections. It therefore leads to improved quality and life expectancy, as well as a reduction in diabetes-related complications. Unfortunately, this technique has many limitations, such as the rejection of the graft, the need for lifelong immunosuppressant treatment, infections or internal haemorrhages. In addition, there is a very heavy surgical procedure under general anesthesia, presenting a non-negligible risk of morbidity.

The third option is the transplantation of pancreatic islets. This approach involves transplanting pancreatic secretory cells into a diabetic recipient. This technique makes it possible to eliminate certain limits of the pancreas graft, by transplanting only the endocrine fraction of the pancreas: the cells of the pancreatic islets. This alternative has the advantage of being minimally invasive, rapid and causes fewer complications related to the surgical procedure. It ensures the stabilization of glucose metabolism, a significant decrease in severe hypoglycemic episodes and the normalization of glycated hemoglobin levels (Shapiro A. M. et al., 2000, The New (Shapiro A. M. et al., 2000. The New England Journal of Medecine, N°343, p. 230-238.; Pepper A. R. et al., 2013, World Journal of Transplantation, N°3, p. 48-53). England Journal of Medecine, N°343, p. 230-238.; Pepper A. R. et al., 2013, World Journal of Transplantation, N°3, p. 48-53). This technique is particularly recommended for patients whose diabetes is particularly unstable (severe hypoglycemia, coma episodes) thus bringing into play their vital prognosis, for which the injections of insulin are not a possible therapeutic approach.

Pancreatic islet transplantation is carried out in several stages. First, the donor's pancreas is surgically removed and transported to a facility able to perform the isolation of the pancreatic islets. Mechanical and enzymatic digestion is performed to separate the various tissues that compose the pancreas. The islets are purified and separated from the other tissues by a discontinuous gradient of Ficoll. Said isolated islets are cultured for 12 to 48 h before being transplanted. In the recipient patient, pancreatic islet transplantation is a procedure carried out under local anesthesia in 30 to 45 minutes. The pancreatic islets are injected into the liver of the recipient patient by means of a catheter placed in the portal vein. The islets then fit into the liver where they release insulin.

Although pancreatic islet transplantation is a promising method, today it has several limitations, in particular related to the survival of the pancreatic islets. Indeed, during the various steps of this transplantation, the cells are no longer vascularized and the cell mortality rate is high. In particular, the quantity of living cells decreases after the brain death of the donor, during the preservation of the pancreas, during the digestion of the organ and the isolation of the islets, then during implantation in the recipient patient. Thus, before islet transplantation in the recipient, only 50% of the pancreatic islets of the donor are still viable. The loss of still functional islets is also very important at implantation, especially due to an inflammatory reaction, to oxidative stress and especially to a vascularization defect in the recipient patient. It is for these reasons that at this time, two or three donors are needed to transplant a sufficient quantity of islets to the recipient and obtain a durable insulin dependency.

Thus, there is a need to develop new strategies for treating diabetes, and in particular to provide a medicament and a method for preserving pancreatic islet cells before and/or after their transplantation to promote the treatment of diabetes.

SUMMARY

Facing the problem posed by the decreasing of viable pancreatic islets during transplantation, the inventors show here that the decorin is an interesting candidate to solve the problem of early mortality of transplanted cells by promoting an anti-inflammatory reaction, a faster revascularization of the pancreatic islets in the recipient patients as well as the secretion of insulin by the cells of these islets, thus allowing the treatment of diabetes and the insulin-independence of patients. More generally, the inventors demonstrated the interest of decorin in the treatment of diabetes for its ability to decrease the mortality of pancreatic islet cells and improve the synthesis and secretion of insulin by these cells. In addition, the inventors show that decorin protects pancreatic cells from loss of function and cell death observed in type 2 diabetes.

One aspect of the disclosure relates to decorin or a pharmaceutical composition comprising decorin, for its use as a medicament in the treatment of diabetes. Preferably, diabetes is type 1 diabetes, type 2 diabetes or gestational diabetes.

In particular, the disclosure relates to decorin or a pharmaceutical composition comprising decorin, for use in the treatment of a subject grafted or capable of being grafted with pancreatic islet cells.

The disclosure also relates to decorin or a pharmaceutical composition comprising decorin, for use in combination with an immunosuppressive therapy and/or an anti-inflammatory treatment concomitant or following transplantation of pancreatic islet cells in a subject, or for use in combination with an antidiabetic active ingredient.

Preferably, the immunosuppressive therapy and/or the anti-inflammatory treatment is selected 45 from THYMOGLOBULIN™ (anti-thymocyte globulin), anti-TNFa, rapamycin, calcineurin inhibitors, T lymphocytes depleting agents, or combinations thereof. Preferably, the immunosuppressive therapy and/or the anti-inflammatory treatment is a combination of THYMOGLOBULIN™ (anti-thymocyte globulin) and RITUXIMAB™ (anti-CD20).

Preferably, the antidiabetic active is selected from insulin, metformin, sulfonylureas, tolbutamide, acetohexamide, tolazamide, chlorpropamide, glibenclamide, glimepiride, glipizide, gliclazide, glyclopyramide, gliquidone, alpha-glucosidase inhibitors, acarbose, miglitol, voglibose, thiazolidinediones, pioglitazone, rosiglitazone, meglitinides, repaglinide, nateglinide, incretin mimetics, an analogue of glucagon-like peptide, exenatide or its derivatives, taspoglutide, liraglutide, semaglutide, a dipeptidyl peptidase-4 inhibitor, vildagliptin, sitagliptin, saxagliptin, linagliptin, alloliptin, septagliptin, an analogue of amylin, pramlintide, an inhibitor of sodium glucose transporter, empagliflozin, dapagliflozin, kanamycin, or a combination thereof.

The disclosure also relates to decorin or a pharmaceutical composition for use in the treatment of a donor subject of pancreatic islet cells prior to the sample of said cells.

In particular, the disclosure also relates to decorin or a pharmaceutical composition for use in the treatment of a subject grafted with pancreatic islet cells. Preferably, the grafted pancreatic islet cells have been treated with decorin.

The pharmaceutical composition used according to the disclosure may comprise human cells and decorin as an active substance. In particular, the cells are selected from endocrine cells and pancreatic islet cells.

Of course, the various characteristics, variants and embodiments of the disclosure may be associated with each other in various combinations insofar as they are not incompatible or exclusive of one another.

In addition, various other characteristics of the disclosure emerge from the appended description made with reference to the drawings which illustrate non-limiting forms of realization of the disclosure.

DESCRIPTION OF THE DRAWINGS

In FIG. 23B, the decorin is abbreviated under the term "decorin".

DETAILED DESCRIPTION

Introduction

Figure 1:
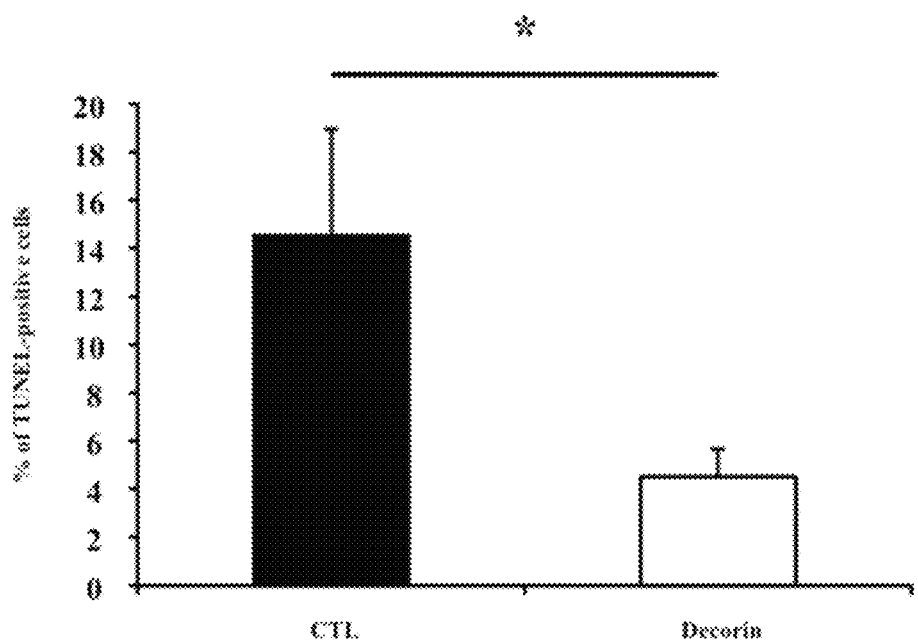
FIG. 1 represents the impact of decorin on the viability of pancreatic islets. Evaluation of apoptosis by measuring the positive TUNEL cells carried out on sections of pancreatic islets of 10 pm. The black and white columns respectively represent the control conditions (CTL) and treatment of the pancreatic islets with the decorin. The results are presented in the average form±SEM. n=6 independent experiments; * p<0.05 versus CTL.

The present disclosure relates to decorin or a pharmaceutical composition comprising decorin, for use as a medicament in the treatment of diabetes, wherein the treatment of diabetes may further comprise transplantation of pancreatic islet.

It should be noted that all studies of the present application were carried out on non-altered, non-dissociated, and not chemically treated human islets. This differs from studies performed on pure beta cells sorted by FACS and for example cultured on extracellular matrix (804G), rich in laminin 5. Indeed, this matrix makes it possible to protect pancreatic beta cells from cell death and increases glucose-induced insulin secretion by activating the pathway of integrins B1 and thereby disrupting intracellular signalling and cell physiology. The results obtained by these methods make it possible to identify a direct or indirect effect on the pancreatic beta cell as such but does not absolutely reflect the effects on the whole islet which is composed of a mixture of different cell types (alpha, beta, delta, exocrine cell). The results obtained on the sorted beta cell model do not make it possible to predict any effect on the native islet. On the contrary, the inventors demonstrate here the importance of the effect of decorin on the level of complete native islets.

Definitions

The term "decorin" refers here to a myokine. The decorin belongs to the family of small leucine-rich proteoglycans (SLRP) and consists of a protein core containing leucine repeats with a glycosaminoglycan chain (GAG) consisting of chondroitin sulfate (CS) or dermatan sulfate (DS). Leucine residues allow it to attach to a large number of cellular receptors. It is thus able to trigger the corresponding signalling cascades. In particular, the decorin is an endocrine factor produced by the muscles, which is capable of binding to the surface of the pancreatic beta cells. The alternative names for this protein are PG-S2, PG40 or bone proteoglycan II. The decorin can be in the form of different isoforms produced by alternative splicing. These are isoforms A (consensus sequence), B, C, D and E. The decorin is described in the databases under the following access numbers: Gene ID: 1634, UniGene: Hs. 156316 and Hs530910 this protein is also described under access number UniProt P07585. The references of the RNA sequences for human decorin are for example NM_001920.4 (isoform A), NM_133503.3 (isoform A), NM_133504.3 (isoform B), NM_133505.3 (isoform C), NM_133506.3 (isoform D) and NM_133507.3 (isoform E). The references of the protein sequences are for example NP_001911.1 (isoform A), NP_598010.1 (isoform A), NP_598011.1 (isoform B), NP_598012.1 (isoform C), NP_598013.1 (isoform D) and NP_598014.1 (isoform E). Preferably, the decorin according to the disclosure is the isoform of type A. The decorin generally comprises a signal peptide in position 1-16 and a pro-peptide in position 17-30. The decorin preferably comprises the sequence between positions 17-359 or 31-359. The decorin optionally comprises the signal peptide and/or the pro-peptide.

A sequence of the human decorin is in particular described in SEQ. ID NO: 1.

The term "substitution", as used herein refers to the replacement of an amino acid residue by another chosen from the 20 natural standard amino acid residues, the residues of rare natural amino acids and of non-natural amino acids. Preferably, the term "substitution" refers to the replacement of an amino acid residue by another chosen from the 20 natural standard amino acid residues (G, P, A, V, L, I, M, C, F, Y, W, H, K, R, Q, N, E, D, S and T). The substitution(s) may be conservative or non-conservative substitutions. The term "conservative substitution" as used in this document refers to a substitution of an amino acid residue with another which has similar chemical or physical properties (size, charge or polarity). Examples of conservative substitutions are presented in the following tables.

TABLE 1

| Amino acid groups | Amino acid residues |
| --- | --- |
| Acid | D and E |
| Basic | K, R, and H |
| Hydrophilic non-charged | S, T, N, and Q |
| Aliphatic non-charged | G, A, V, L, and I |
| Non-polar, non-charged | C, M, and P |
| Aromatics | F, Y, and W |

TABLE 2

| | | | | |
| --- | --- | --- | --- | --- |
| 1 | Alanine (A) | Serine (S) | | Threonine (T) |
| 2 | Aspartic Acid (D) | Glutamic Acid (E) | | |
| 3 | Asparagine (N) | Glutamine (Q) | | |
| 4 | Arginine (R) | Lysine (K) | | |
| 5 | Isoleucine (I) | Leucine (L) | | Methionine (M) |
| 6 | Phenylalanine (F) | Tyrosine (Y) | | Tryptophan (W) |

Alternative Conservative Substitution Groups

TABLE 3

| Residues with an alcohol group | S and T |
|---|---|
| Aliphatic residues | I, L, V, and M |
| Residues with an aromatic ring | F, H, W, and Y |
| Hydrophobic residues | A, C, F, G, H, I, L, M, R, T, V, W, and Y |
| Negatively charged residues | D, and E |
| Positively charged residues | K, R, and H |
| Polar residues | C, D, E, H, K, N, Q, R, S, and T |
| Small residues | A, C, D, G, N, P, S, T, and V |
| Very small residues | A, G, and S |
| Flexible residues | E, Q, T, K, S, G, P, D, E, and R |

Additional Functional and Physical Classification of Amino Acids

By "myokine" is meant a soluble substance produced and released by muscle cells is response to muscle contractions. These molecules have the ability to act directly or indirectly on several organs, leading to the necessary metabolic changes during or after a physical exercise.

The term "diabetes" refers here to a chronic disease which occurs when the pancreas does not produce enough insulin or when the organism is not capable of effectively using the insulin it produces. Diabetes is a disorder of assimilation, use and storage of sugars supplied by the diet. This results in hyperglycemia, characterized by a high blood glucose level, usually greater than 1.26 g/L of blood. There are two main types of diabetes: type 1 diabetes which affects about 6% of diabetics and type 2 diabetes which affects 92%. The other types of diabetes concern the remaining 2% (MODY, LADA or secondary diabetes to certain diseases or medication intake).

"Type 1 diabetes" or "insulin-dependent diabetes" means a particular form of diabetes, generally considered to be an autoimmune disease, which results from the disappearance of pancreatic beta cells, resulting in a total insulin deficiency. Since glucose cannot enter the cells it returns to the blood, this leads to a strong increase in blood glucose level, characterized by a glucose level much greater than 1.26 g/L of blood.

"Type 2 diabetes" or "non-insulin-dependent diabetes" means a particular form of diabetes, resulting either from insulinopaenia when the pancreas insufficiently produces insulin, or from insulin resistance when this insulin is not capable of acting sufficiently to regulate blood glucose. In both cases, blood glucose is not regulated.

"Gestational diabetes" means a particular form of diabetes which is a disorder of the carbohydrate tolerance leading to a hyperglycemia of variable severity, starting or diagnosed for the first time in a woman during pregnancy. Gestational diabetes appears in particular in women who have an undiagnosed diabetes and that pregnancy will reveal or in women who develop diabetes during pregnancy, disorder that most often disappears after birth of the baby.

By "complication of diabetes" are meant all states, conditions, disorders, or diseases that result from the consequences of hyperglycemia relating to diabetes. Substantially all of the parts of the body and the organs may be affected by diabetes and/or a poorly controlled blood glucose level. The hyperglycemia may in particular weaken the walls of the blood vessels that supply the tissues and/or organs with oxygen and nutrients. Complications of diabetes include acute complications such as diabetic ketoacidosis and hyperosmolar conditions, as well as long-term complications such as eye disorders, nephropathies and cardiovascular diseases. The complications are more particularly described below in paragraph "Diabetes and complications targeted by the present disclosure".

By "Insulin" is meant here a protein hormone secreted by the pancreatic islet B cells. It makes it possible to regulate blood glucose by promoting the uptake of glucose in the muscle cells, of the liver or in adipose cells. It is a hypoglycemic hormone.

By "hypoglycemia" is meant here a low glucose level in the blood, typically less than 0.60 g/L of blood.

The terms "pancreatic islet cells" or "Langerhans islet cells" relate to pancreatic endocrine cells, grouped into spherical clusters. The islets are composed of a majority of beta cells and alpha cells. The latter secrete insulin and glucagon, respectively.

The term "treatment" refers here to obtaining a desired pharmacological and/or physiological effect. The effect can be prophylactic in terms of total or partial prevention of a disease or symptom and/or can be therapeutic in terms of partial or complete healing of a disease and/or an adverse effect attributable to the disease. The term "treatment" as used herein covers any treatment of a disease in a mammal, in particular in a human, for: reducing the incidence and/or risk of relapse of the disease for a period of time without symptoms; relieving or reducing a symptom of the disease; preventing the disease from occurring in a subject that can be predisposed to the disease but has not yet been diagnosed as having it; inhibiting the disease, i.e., stopping its development (for example, reducing the rate of disease progression); reducing the frequency of the episodes of the disease; slowing down the development of the disease and relieving the disease, i.e. causing total or partial regression of the disease.

The expression "therapeutically effective amount", as used herein, refers to an amount that results in an improvement in the condition of an organ or a subject, or to a decrease in the disease, disorder or symptoms of the disease or disorder in question.

The terms "individual", "host", "subject" and "patient", are used herein in an interchangeable manner, and designate a mammal, more particularly an animal subject, and even more particularly a human. The subject may suffer from diabetes.

The terms "donor", "donor patient" and "donor subject" are used herein in an interchangeable manner and refer to the persons from whom the pancreatic islets are removed. It may be deceased persons, particularly in the state of brain death (mainly due to traumas, strokes, anoxias or poisonings) or of living subject.

The terms "recipient", "patient recipient", "subject recipient", "grafted subject", "subject eligible for a graft" refer to a subject having undergone or being susceptible to undergo a pancreatic islet cells transplantation, said cells originating from a donor. Preferably, the recipient suffers from diabetes.

As used herein, a "pharmaceutical composition" refers to a preparation of one or more of the active agents with other optional chemical components such as physiologically suitable carriers and/or excipients. The purpose of a pharmaceutical composition is to facilitate the administration of the active agent to an organism. The compositions of the present disclosure can be in a form suitable for any route of administration or conventional use. The pharmaceutical composition according to the disclosure encompasses the pharmaceutical compositions used in human medicine and the pharmaceutical compositions used in animal medicine, i.e. veterinary compositions. In one embodiment, the pharmaceutical composition further comprises a pharmaceutically acceptable carrier.

As used herein, the terms "pharmaceutically acceptable carrier" or "pharmaceutically acceptable excipient" or "pharmaceutically acceptable vehicle" are interchangeable and comprise any compounds or combinations of compounds that are known to those skilled in the art to be useful in the formulation of pharmaceutical or veterinary compositions. In the context of the present disclosure, by "physiologically acceptable" or "pharmacologically acceptable" meant any medium or additive which does not interfere with the efficacy of the biological activity of the active substance (here, decorin), and which is not excessively toxic to the patient or subject, at the concentrations at which it is administered and/or which does not produce an undesirable reaction when administered to a human or to an animal. A physiologically acceptable vehicle, carrier or excipient can be suitable for administration to humans and/or animals (in particular mammals).

The term "active substance", as used herein, refers to a substance or molecule that, in a composition, a mixture or a medium produces a particular and desired effect on cells or on a subject. The active substance is opposed the "inert" ingredients having no particular pharmacological activity, in particular the excipients as well as to the secondary compounds, having or not a pharmacological effect, which serve as support or adjuvant to the main active substance, and which only act to enhance the effect of the active substance directly (by acting on the active substance) or indirectly (by acting on the conditions or disorders involved in the disease).

The term "medicament", as used herein, encompasses medicaments for human and animal use in human and veterinary medicine and refers to any pharmacologically acceptable substance which provides a therapeutic and/or beneficial effect. The term "medicament" used herein is not necessarily limited to the substances requiring a marketing authorization.

By "transplantation" or "graft" is intended to mean an intervention, in particular a surgical procedure which consists in transferring an organ, a tissue or cells from one individual to another. In particular, these terms refer to a heterograft and/or an allograft. Preferably, a transplantation consists in replacing a diseased organ or tissue with a healthy organ or tissue, referred to as a graft or a transplant, originating from a donor subject. In the context of the disclosure, the graft corresponds to the pancreatic islets taken from the donor patient and/or the purified pancreatic islet cells intended to be transplanted into the recipient patient. For example, the graft may correspond to pancreatic islets that were prepared from stem cells.

As used herein, the term "embryonic stem cell" refers to cells derived from the internal cell mass of blastocyst and which have the ability to lead to the formation of all tissues of the organism (mesoderm, endoderm, ectoderm), including cells of the germ line. The pluripotency of embryonic stem cells can be evaluated by the presence of markers such as transcription factors OCT4 and NANOG and surface markers such as SSEA3/4, Tra-1-60 and Tra-1-81.

As used herein, the term "induced pluripotent stem cell" (CSPi, or iPS) refers to pluripotent stem cells obtained by genetic reprogramming of differentiated somatic cells, and having a morphology and a potential of self-renewal and pluripotency in part similar to those of the embryonic stem cells. These cells are particularly positive for pluripotency markers, including staining with alkaline phosphatase and the expression of NANOG, SOX2, OCT4 and SSEA3/4. The methods for obtaining the induced pluripotent stem cells are well known to a person skilled in the art and are particularly described in the articles of Yu et al (Science, 2007, 318 (5858): 1917-1920), Takahashi et al (Cell, 2007, 131 (5): 861-872) and Nakagawa et al (Nat Biotechnol, 2008, 26 (1): 101-106).

By "therapeutic adjuvant" or "treatment adjuvant", is meant a treatment that completes a main treatment (generally a "first-line treatment" or a "standard treatment") in order to enhance the desired therapeutic effect, in order to prevent or delay the reoccurrence (recurrence) of the disease, or in order to reduce the risks of complications arising from the disease or the treatment.

By "medium", "culture medium" or "conservation medium" is meant a composition that allows the maintenance and/or culture of viable and/or functional pancreatic islet cells. This medium can be specific to the separation, isolation, culture and control of pancreatic islet cells. In principle, the cells find in this medium the essential components for their survival and/or their multiplication such as amino acids, vitamins, inorganic salts, glucose. In particular, this medium is optimized for in vitro culture of pancreatic islets.

By "maintaining the viability of pancreatic islet cells" or "preserving the viability of pancreatic islet cells", is meant maintaining the survival and/or functionality of pancreatic islet cells, and/or the decreasing the occurrence and/or frequency of apoptosis of pancreatic islet cells.

In the context of the present application, the term "nucleic acid" means a phosphate diester of a polymeric form of ribonucleosides (adenosine, guanosine, uridine or cytidine; "RNA molecules") or deoxyribonucleosides (deoxyadenosine, deoxyguanosine, deoxythymidine, or deoxycytidine; "DNA molecules"), or any phosphodiester analogue thereof, such as phosphonothioates and thioesters, in a single-stranded or double-stranded form. The nucleic acid can be a deoxyribonucleic acid or a ribonucleic acid. It may be sequences of natural or artificial origin, and in particular genomic DNA, cDNA, mRNA, sequences of hybrid amino acids or synthetic or semi-synthetic sequences, modified or not.

As used herein, the terms "nucleic acid construct" and "vector" are equivalent and refer to a nucleic acid molecule that serves to transfer and/or express a nucleic acid sequence, such as DNA or RNA, into a host cell. A vector may comprise an origin of replication, a selectable marker and optionally a site suitable for insertion of a sequence or a gene. A vector may be either a self-replicating extra-chromosomal vector or a vector that integrates into the genome of the host cell. It may also include expression elements comprising, for example, a promoter, a ribosomal translation initiation sequence, an initiation codon, a termination codon, and/or a transcription termination sequence. The vectors capable of directing the expression of the nucleic acid sequence to which they are operably linked can also be referred to herein as "expression vectors". The nucleic acid construct can be a vector for the stable or transient expression of a gene or a sequence. As used herein, the term "sequence identity" or "identity" or "identity percentage" refers to the percentage of identical amino acid residues between the two compared sequences, this percentage being obtained after implementing the best alignment (optimum alignment) between the two sequences. The sequence identity is determined by comparing the sequences when aligned so as to maximize overlap and identity while minimizing sequence interruptions. In particular, the percentage of identity with respect to the reference sequence will be calculated by dividing (i) the total number of identical residues aligned between the two sequences by (ii) the total number of residues contained in the reference sequence, then by multiplying by 100 the obtained ratio. In particular, the sequence identity can be determined using any of the many global or local alignment algorithms, depending on the length of the two sequences. Sequences of similar lengths are preferably aligned using global alignment algorithms (ex. Needleman & Wunsch, J. Mol. Biol 48:443, 1970) that optimally align the sequences along the entire length, while sequences of substantially different lengths are preferably aligned using a local alignment algorithm, for example the Smith and Waterman algorithm (Smith and Water, Adv. Appl. Math 2:482, 1981) or the algorithm of Altschul (Altschul et al (1997) Nuclear Acids Res. 25:3389-3402; Altschul et al (2005) FEBS J. 272:5101-5109). The alignment for the purpose of determining the percentage of identity of amino acid sequences can be performed by any method known to a person skilled in the art, for example using software available on Internet sites such as http://blast.ncbi.nlm.nih.gov or http://www.ebi.ac.uk/Tools/emboss/. A person skilled in the art can easily determine the parameters suitable for measuring the alignment. For the purposes of the present disclosure, the amino acid sequence identity percentage values refer to values generated by using the Needleman-Wunsch EMBOSS program in pairs that create an optimal overall alignment of two sequences using the Needleman-Wunsch algorithm in which the parameters are the default parameters: Scoring matrix=BLOSUM62, Gap open=10, Gap extend=0.5, End gap penalty=false, End gap open=10 and End gap extend=0.5.

As used herein, the term "comprising" or "comprises" is used with reference to substances, compounds or methods that are essential, but which are open to the inclusion of non-specific elements, essential or not.

The term "and/or" as used herein is to be considered to be a specific description of each of the two specified features or components, with or without the other. For example, "A and/or B" is to be considered to be a specific disclosure of each of the following elements: (i) A, (ii) B and (iii) A and B, as if each were presented individually.

Decorin

The decorin according to the disclosure is a myokine, in particular a mammalian myokine, preferably a human myokine, preferably the isoform A of the human decorin, even more preferably the decorin described by SEQ ID No: 1 or a functional fragment or variant thereof.

It is understood that the present disclosure also relates to any protein having modifications, such as mutants, variants or homologues, having the same effect or activity as the decorin according to the disclosure. The term "homologous", "variant", "biological equivalent" or "mutant" are interchangeable and refer to a protein having homology or sequence identity to the nucleotide sequence of the decorin according to the disclosure, said functional variant retaining the biological activity of the protein from which it is obtained. As used herein, the term "mutation" comprises natural or induced mutations, including at least alterations including deletions, insertions, substitutions known to those skilled in the art, including a genetic modification introduced into a nucleotide or amino acid sequence. For example, a variant has at least about 70%, 80%, 85%, 90%, 95% or 98% homology or sequence identity to the reference protein (also referred to as "parent sequence"), and has a biological activity substantially equivalent thereto. By "variant" or "equivalent" is meant a polypeptide or protein sequence which differs from that of a reference sequence by at least one modification or mutation of amino acid.

Thus, the decorin can comprise a sequence having an identity percentage of at least 80%, 85%, 90%, 91%, 92%, 93%, 94%, 95%, 96%, 97%, 98% or 99% with the sequence of the mature decorin (i.e. without the signal peptide and the pro-peptide), more specifically for human with the sequence between positions 31-359 of SEQ ID NO: 1. Alternatively, the decorin can comprise the mature sequence of the decorin (more specifically for humans with the sequence between the positions 31-359 of SEQ ID NO: 1) and further having 1 to 20 modifications selected from a substitution, a deletion or an addition of an amino acid. Preferably, the substitutions are conservative.

In particular, the decorin according to the disclosure may comprise 1 to 20 conservative substitutions, preferably 1, 2, 3, 4, 5, 6, 7, 8, 9 or 10 conservative substitutions in comparison with SEQ ID No. 1 or a fragment corresponding to amino acids 17-359 or 31-359 thereof. The decorin according to the disclosure can particularly comprise the substitution T268M or E273Q.

According to one embodiment, the decorin is a biologically active fragment of decorin. The "biologically active fragment" here means a protein or polypeptide fragment which has a biological activity substantially equivalent to decorin. Thus, the decorin can be chosen from decorin with the signal peptide and the pro-peptide (in particular SEQ ID NO: 1 for human), the decorin without the signal peptide and with the pro-peptide (in particular 17-359 of SEQ ID NO: 1 for humans), or the decorin without the signal peptide and the pro-peptide (in particular 31-359 of SEQ ID NO: 1 for humans).

According to the treated subject, the decorin will preferably be a decorin of the same species. Thus, if the subject to be treated is a human patient, the decorin will be a human decorin.

In particular, the disclosure relates to decorin or a pharmaceutical composition comprising it for its use as a medicament in the treatment of diabetes, for example type 1 diabetes, type 2 or gestational diabetes, preferably in the treatment of type 1 diabetes.

Indeed, in the context of the treatment of diabetes, the decorin makes it possible to improve the synthesis and secretion of insulin by the cells of the pancreatic islets, in particular in response to a stimulation by glucose, and to reduce the mortality of the cells of these islets. In particular, decorin makes it possible to increase insulin secretion by pancreatic islet cells in response to glucose stimulation, and to decrease the mortality of cells of these islets when they are subjected to the effect of pro-inflammatory cytokines such as TNF-alpha, INF-gamma or IL1-beta, fatty acids such as palmitate, or an excessive amount of sugar. Thus, the present disclosure also relates to the use of decorin for decreasing in a diabetic patient the effects of inflammation, in particular of pro-inflammatory cytokines such as TNF-alpha, INF-gamma or IL1-beta, on insulin secretion in response to glucose stimulation, and on the mortality of cells of these islets induced by this inflammation. The present disclosure further relates to the use of decorin for decreasing in a diabetic patient the effects of a fatty diet on insulin secretion in response to glucose stimulation, and on the mortality of the cells of these islets.

According to a preferred embodiment, the medicament is intended to be administered to the diabetic subject before, during and/or following a transplantation of pancreatic islet cells. In particular, the decorin is intended to be administered to a recipient patient, in particular for the purpose of facilitating the engraftment of pancreatic islet cells.

In one embodiment, the patient treated by the decorin is a patient grafted with pancreatic islet cells. Preferably, the grafted pancreatic islet cells have been treated prior to grafting with decorin. Indeed, the inventors have clearly demonstrated an extremely beneficial effect of the treatment of a patient grafted by the decorin, in particular when the grafts have been treated with the decorin prior to grafting.

Alternatively or in parallel, the decorin is intended to be administered to a donor patient, in particular for the purpose of preserving the viability of the pancreatic islets that will be collected.

Nucleic Acids and Vectors for Expression of Decorin

The present disclosure also relates to a nucleic acid sequence encoding decorin according to the disclosure for use in the treatment of diabetes or a complication of diabetes. Preferably, the nucleic acid sequence encodes decorin as described above or a fragment or a variant thereof. For example, a coding sequence for decorin is described in SEQ ID NO: 2.

The disclosure also relates to a recombinant vector comprising a nucleic acid sequence encoding decorin according to the disclosure as described above for use in the treatment of diabetes or of a complication of diabetes.

Preferably, these are expression vectors comprising, in addition to a nucleic acid sequence according to the disclosure, regulatory sequences for controlling transcription and/or translation. In particular, the vector according to the disclosure will include, in particular, elements for regulating the expression of the sequence coding for the decorin according to the disclosure, such as promoters and activating sequences ("enhancers"), as well as appropriate sequences of initiation and termination of the transcription.

Furthermore, the vectors according to the disclosure may comprise one or more replication origins in the cellular hosts in which their amplification and/or their expression is sought and/or selection markers.

In particular, the vectors comprising the amino acid sequence encoding the decorin may be viral vectors or not. The viral vectors are well known to a person skilled in the art and may comprise, for example, baculoviral, adenoviral, parvoviral, retroviral, lentiviral or adeno-associated virus derived vectors, for example described in Giannoukakis et al, Diabetes 48:2107-2121 (1999); Efrat, Er. J of Endocrinol 138:129-133 (1998); Stone et al, J Endocinol 164:103-118 (2000); Castro et al, Basil Best Prac. Clin. Endocrine Metab. 13:431-449 (1999); Becker et al, J Biol. Chem 59:21234-21238 (1994); Csete et al, Transplantation 59:263-268 (1995); Sigala et al, Hum. Gen Ther. 8:1625-1634 (1997); Leibowitz et al, Diabetes 48:745-753 (1999); Guo et al, Cell Transplant 8:661-671 (1999).

The vectors according to the disclosure comprise in particular ubiquitous, constitutive or inducible eukaryotic promoters, such as ubiquitous promoters (for example HPRT, vimentin, a-actin, tubulin), the promoters of the intermediate filaments (for example desmin, neurofilaments, keratin, GFAP) the tissue-specific promoters (for example the promoter of the liver albumin gene) or the early promoter of cytomegalovirus (Boshart et al, 1985, Cell 41:521-530).

In a particular embodiment, the nucleic acid sequence or vector further comprises a CRISPR-Cas system, preferably a CRISPR-Cas9 system, in particular for use in gene therapy in the treatment of diabetes, in particular for introducing the nucleic acid sequence encoding decorin into the genome of a target cell. Preferably, the CRISPR system contains two distinct elements, namely i) an endonuclease and ii) a guide RNA.

Cells

The nucleic acid sequence or the vector comprising it can be transduced into a host cell. Thus, one aspect of the disclosure concerns a cell comprising the nucleic acid sequence encoding decorin according to the disclosure for its use in the treatment of diabetes or a complication of diabetes.

The introduction of the nucleic acid sequence or the vector according to the disclosure into a host cell can be carried out in vitro, according to the techniques well known to a person skilled in the art, such as electroporation, for transforming or transfecting cells, either in primary culture, or in the form of cell lines. Alternatively, the introduction of the nucleic acid sequence or vector according to the disclosure can be carried out in cells in vivo, in particular in a subject with diabetes.

Preferably, the host cell is a eukaryotic cell, preferably a human cell. Any cell of the human body or any cell suitable for pancreatic islet transplantation can be used. Preferably, the cells are stem cells or endocrine cells, in particular pancreatic islet cells or liver cells, preferably the cells are pancreatic islet beta and/or alpha cells. Preferably, the cells are pancreatic islet beta cells. Alternatively, the cells are pancreatic islet alpha cells.

According to a particular aspect, the cell comprising a sequence of nucleic acids coding for decorin according to the disclosure or a vector comprising it is a stem cell. The stem cells are preferentially obtained by differentiation of pluripotent stem cells, in particular embryonic stem cells (ES) or induced pluripotent stem cells (iPS or hiPSC) for example obtained by dedifferentiation.

Embryonic stem cells may be obtained without destruction of the embryo from which they are derived, for example by using the technique described by Chung et al. (Cell Stem Cell, 2008, 2 (2): 113-117). In a particular embodiment, and for legal or ethical reasons, embryonic stem cells are non-human embryonic stem cells. In another embodiment, the embryonic stem cells used in the disclosure are human embryonic stem cells, preferably obtained without destruction of the embryo from which they stem. The embryos used are preferably supernumerary embryos obtained in the framework of a parental project after obtaining the regulatory and ethical authorizations in accordance with the laws in force.

An advantage of using stem cells over differentiated islet cells is that the stem cells specifically adapt to their environment by virtue of their ability to differentiate in situ.

Alternatively, the cell comprising a nucleic acid sequence encoding decorin according to the disclosure or a vector comprising the same is a precursor of pancreatic islet cells, in particular pancreatic islet beta cells. In another embodiment, this cell is a liver cell.

In another embodiment, the cell comprising a nucleic acid sequence encoding decorin according to the disclosure or a vector comprising the same is a neuroendocrine cell, such as those found in pituitary and adrenal glands. Indeed, these cells have the secretory machinery necessary for regulated secretion of polypeptide hormones.

Pharmaceutical Compositions and Medicament

According to one aspect of the disclosure, the decorin, a variant or a fragment thereof, a nucleic acid sequence encoding the decorin, a vector comprising this nucleic acid sequence, or a cell comprising the nucleic acid sequence or the vector, is included in a pharmaceutical composition.

Typically, the pharmaceutical composition comprises decorin, a nucleic acid sequence encoding the decorin, a vector comprising this nucleic acid sequence, or a cell comprising the nucleic acid sequence or the vector, and a pharmaceutically acceptable carrier.

The composition according to the disclosure can be a pharmaceutical composition for use in human medicine or a veterinary use.

The disclosure also concerns a pharmaceutical composition comprising decorin, a nucleic acid sequence encoding the decorin, a vector comprising this nucleic acid sequence, or a cell comprising the nucleic acid sequence or the vector, for use in the treatment of diabetes, in particular in the treatment of type 1 diabetes, type 2 diabetes or gestational diabetes, as well as in the treatment of at least one complication of diabetes.

According one aspect, the disclosure also relates to the use of decorin, a nucleic acid sequence encoding the decorin, a vector comprising this nucleic acid sequence, or a cell comprising the nucleic acid sequence or the vector, for the preparation of a pharmaceutical composition for use as a medicament, in particular as an antidiabetic medicament or as an anti-inflammatory medicament.

The disclosure also relates to a pharmaceutical composition as described above for use as a medicament in the treatment of diabetes or a complication of diabetes. In particular, the disclosure relates to a pharmaceutical composition for use as a medicament in the treatment of type 1 diabetes or a complication thereof. Alternatively, the disclosure relates to a pharmaceutical composition for use as a medicament in the treatment of type 2 diabetes or a complication thereof. According to a particular embodiment, the medicament is intended to be administered before, during and/or following a transplantation of pancreatic islet cells. Alternatively, the disclosure relates to a pharmaceutical composition comprising decorin for use as a medicament in the treatment of gestational diabetes or a complication thereof.

According to one aspect, the present disclosure concerns a pharmaceutical composition comprising decorin as a main active substance, that is to say that the decorin is the substance of the composition that has the desired activity and/or effect. In particular, the decorin is an active substance of the pharmaceutical composition by its activity on pancreatic islet cells, in particular on the synthesis and secretion of insulin, on the survival of the cells and/or on the improvement of the vascularization of pancreatic islets.

In one embodiment, the pharmaceutical composition may, further, contain at least one additional pharmaceutical active ingredient or be intended to be used in combination with at least one additional active ingredient. The term "pharmaceutical active ingredient" means any compound or substance whose administration has a therapeutic effect or a beneficial effect on the health or general condition of a patient or of a subject to whom it is administered. Examples of pharmaceutical active ingredients that may be present in a pharmaceutical composition of the present disclosure or used in combination with this pharmaceutical composition include, without limitation, anti-inflammatory agents, immunosuppressive agents, antidiabetic agents, antibiotics, antipyretic agents, antiemetic agents, antihistaminic agents, vitamins, antispasmodic agents, anti-ulcer agents or combinations thereof. The medicament according to the disclosure can thus be administered in combination with another medicament, such as an anti-inflammatory agent, an immunosuppressive agent, an antibiotic agent, an antipyretic agent, an antihistamine agent, vitamins, an antispasmodic agent or an antiulcer agent.

More particularly, the decorin, a nucleic acid sequence encoding decorin, a vector comprising this nucleic acid molecule, or a cell comprising the nucleic acid sequence or the vector, or the pharmaceutical composition comprising the same can be used in combination with one or more treatments or medicaments used for the treatment of diabetes, in particular an antidiabetic active ingredient. Thus, the composition may further comprise an antidiabetic active ingredient. The present disclosure therefore relates to a pharmaceutical composition comprising decorin, a nucleic acid sequence encoding decorin, a vector comprising this nucleic acid molecule, or a cell comprising the nucleic acid sequence or the vector, and an antidiabetic active ingredient. In particular, the present disclosure therefore relates to a pharmaceutical composition comprising decorin and an antidiabetic active ingredient.

In an alternative manner, the composition can be intended for use in the treatment of diabetes in combination with such an active ingredient. The present disclosure therefore relates to a kit comprising the decorin and an antidiabetic active ingredient for a simultaneous, separate or sequential use, in particular in the treatment of diabetes.

For example, the antidiabetic active ingredient may be selected from the following non-exhaustive list: insulin, metformin, sulfonylureas such as tolbutamide, acetohexamide, tolazamide, chlorpropamide, glibenclamide, glimepiride, glipizide, glicazide, glycopyramide and gliquidone, alpha-glucosidase inhibitors such as acarbose, miglitol and voglibose, thiazolidinediones such as pioglitazone and rosiglitazone, meglitinides such as repaglinide and nateglinide, incretino-mimetic, a glucagon-like peptide analogue such as exenatide or its derivatives, taspoglutide, liraglutide, semaglutide, a dipeptidyl peptidase-4 inhibitor such as vildagliptin, sitagliptin, saxagliptin, linagliptin, allopiliptin, and septagliptin, an amylin analogue such as palmlintide, a sodium glucose transporter inhibitor such as empaglia, dapagliptin, canamycin, or a combination thereof.

Furthermore, the present disclosure also relates to decorin or a pharmaceutical composition for use in the treatment of diabetes in the context of a pancreatic islet cell transplantation. Thus, this relates to recipient subjects, i.e. grafted or susceptible of being grafted with pancreatic islet cells.

In this particular embodiment, the decorin or the composition according to the disclosure can be combined with conventional agents used for promoting the engraftment of pancreatic islet cells, in particular of molecules inducing immunosuppression or reduction of inflammation.

These medicaments or compositions comprise in particular immunosuppressive compositions and/or anti-inflammatory compositions. These compositions further comprise THYMOGLOBULIN™ (anti-thymocyte globulin) to promote induction, anti-TNFa to control the early inflammatory reaction, RAPAMUNE™ (sirolimus) at the onset of grafting to benefit from its anti-macrophagic role, calcineurin inhibitors or combinations thereof. A particular combination comprises a combination of THYMOGLOBULIN™ (anti-thymocyte globulin) and RITUXIMAB™ (anti-CD20). These compositions may also include different T-lymphocyte depleting agents Thus, according to a particular aspect, the disclosure relates to decorin or a pharmaceutical composition comprising decorin for use as an adjuvant for an immunosuppressive therapy or an anti-inflammatory treatment concomitant or following transplantation of pancreatic islet cells in a recipient patient. The use of decorin as an adjuvant makes it possible to increase the probability of the engraftment of pancreatic islet cells, to promote the vascularization of pancreatic islet cells and/or to promote insulin secretion by transplanted pancreatic islet cells.

Thus, the pharmaceutical composition according to the disclosure is intended to be administered to a recipient patient, in particular for the purpose of facilitating the engraftment of pancreatic islet cells, promoting the vascularization of pancreatic islet cells and/or promoting the secretion of insulin by the transplanted pancreatic islet cells. In particular, the decorin is used for the purpose of decreasing the occurrence and/or frequency of apoptosis in pancreatic islet cells that are intended to be transplanted or have been transplanted into the recipient.

The decorin or the pharmaceutical composition can be administered to the subject who may be grafted with pancreatic islet cells prior to grafting and/or to the subject having received a transplant of pancreatic islet cells concomitantly with the graft and/or after the graft.

Thus, in a particular embodiment, the present disclosure relates to a method for treating a patient having received a pancreatic islet cell graft, comprising administering a therapeutically effective amount of decorin, so as to increase insulin secretion by the transplanted pancreatic islet cells and/or to increase the viability of the transplanted pancreatic islet cells or to decrease their apoptosis.

More specifically, the method of treating a diabetic subject comprises grafting pancreatic islet cells into the patient and administering a therapeutically effective amount of decorin, thereby increasing insulin secretion by transplanted pancreatic islet cells and/or increasing the viability of transplanted pancreatic islet cells or decreasing their apoptosis. In one particular embodiment, the method of treating a diabetic subject comprises contacting the pancreatic islet cells to be grafted into the patient with decorin, grafting the treated pancreatic islet cells into the patient and administering a therapeutically effective amount of decorin so as to increase insulin secretion by transplanted pancreatic islet cells and/or to increase the viability of transplanted pancreatic islet cells or to decrease their apoptosis.

Alternatively or in parallel, the pharmaceutical composition is intended to be administered to a donor patient, in particular for the purpose of preserving the viability of pancreatic islets that are intended to be removed, i.e. to decrease the occurrence and/or frequency of apoptosis in pancreatic islet cells that are removed from the donor.

Pharmaceutical Composition Formulation

The formulation of a composition according to the present disclosure can vary according to the administration route and the dosage for which the composition is intended to be used. The composition according to the disclosure may in particular be in solid, semi-solid or liquid form. After formulation with at least one physiologically acceptable carrier or excipient, a composition according to the disclosure can be in any suitable form for administration to a mammal, in particular a human, for example in the form of tablets, pills, lozenges, coated tablets, capsules, softgels, pilules, granulates, powder, suspensions, emulsions, syrups, ointments, liquid bulb, dropper flask and other similar forms of liquid or powder preparations intended to be taken into small quantity measured units, injectable solutions or suppositories.

A person skilled in the art knows how to select the vehicles and excipients most suitable for the preparation of a given type of formulation. Thus, for example, excipients such as water, 2,3-butanediol, Ringer's solution, sodium chloride isotonic solutions, synthetic mono or diglycerides, and oleic acid are often used for the formulation of injectable preparations. Suitable supports may also be selected from magnesium carbonate, magnesium stearate, talc, sugar, lactose, pectin, dextrin, starch, gelatine, tragacanth gum, methylcellulose, sodium carboxymethyl cellulose, low melting point wax, and cocoa butter.

The solid compositions may be formulated in the presence of an inert excipient such as sodium citrate, and optionally additives such as, for example, binding agents, humectants, disintegrating agents, absorption accelerators, lubricants, etc. Other suitable forms comprise preparations in solid form which are intended to be transformed shortly before their use in liquid form preparations.

The physiologically acceptable vehicle may be a liquid, and the composition according to the disclosure is in the form of a solution. The liquid vehicles are used in the preparation of solutions, solvents, dispersion media, suspensions, emulsions, syrups, elixirs and pressurized compositions. Suitable liquid or gel-based carriers include, but are not limited to: water and physiological saline solutions; emulsions or suspensions, including saline solutions and buffered media, urea; alcohols (e.g., methanol, ethanol, propanol, butanol); glycols (e.g., ethylene glycol, propylene glycol and the like), non-aqueous solvents such as propylene glycol, polyethylene glycol, vegetable or seeds oils such as olive oil, and injectable organic esters such as ethyl oleate. Generally, the water-based vehicles have a neutral pH (eg, pH 7.0±1.0 or 0.5 pH unit). The liquid compositions, including for example emulsions, microemulsions, solutions, suspensions, syrups, or elixirs can be formulated in particular in the presence of solvents, solubilizers, emulsifiers, oils, fatty acids and/or other additives such as, for example, suspending agents, preservatives, sweeteners, natural or synthetic flavors, viscosifying agents, stabilizing and/or thickening agents and/or food-grade coloring agents, which must all be compatible with maintaining the activity of the decorin.

The emulsions can be prepared in aqueous solutions of propylene glycol or may contain emulsifying agents such as lecithin, sorbitan monooleate or acacia. Well-known thickening agents can also be added to compositions such as corn starch, natural or synthetic gums, resins, methylcellulose, sodium carboxymethyl cellulose, guar gum, xanthan gum and the like. Preservatives may also be included in the composition, including methylparaben, propylparaben, benzyl alcohol and ethylene diamine tetra-acetate salts. These compositions may also comprise a plasticizer such as glycerol or polyethylene glycol (for example, in a molecular weight range of MW=800 to 20,000). The composition of the excipient can be modified as long as it does not significantly interfere with the pharmacological activity of decorin.

Subject and Administration Regimen

The decorin or the pharmaceutical composition according to the disclosure can be used for human or animal medicine, the subject in question which can in particular be a mammal, more particularly any animal subject such as a laboratory animal (for example, a non-human primate, rat, mouse, hamster, guinea pig), a pet or livestock animal (dogs, cats, horses, etc . . . ), or a human.

The subject may suffer from diabetes, in particular type 1 diabetes, type 2 diabetes, gestational diabetes, or may be likely to develop diabetes. Preferably, the subject has been diagnosed as being type 1 or type 2 diabetic. In particular, the recipient patient has been diagnosed as being type 1 or type 2 diabetic.

Alternatively, the donor subject of pancreatic islet cells is not diabetic. Preferably, the donor is a healthy individual.

When the donor subject is a human, the donor fulfils the requirements for the donation of organs known to a person skilled in the art. For example, the characteristics that allow the proposal of a pancreas for organ or islet transplantation by a human donor are defined by a weight greater than 10 kg, an age of less than 65 years, the absence of a history of diabetes, an increase in liver transaminases greater than 3 times the normal and of cardiac arrest.

The pharmaceutical compositions according to the present disclosure can be administered using any combination of dosage and effective administration route to achieve the desired therapeutic effect. The exact quantity to be administered and the delivery frequency will depend in particular on the type of subject, human or animal, depending on the age, weight, general condition of the patient or of the animal, on the nature and severity of diabetes. The route of administration can be chosen according to the nature and severity of diabetes and/or according to the age and/or of the health of the patient.

The composition according to the disclosure can be administered systemically, orally, by inhalation or by injection, for example intravenously, intramuscularly, subcutaneously, transdermal, intra-arterial.

The composition according to the disclosure can be administered in one or more times, i.e. in the form of a single dose or of multiple doses. In particular, the composition according to the disclosure can be administered in the form of several doses.

In one embodiment, the composition according to the disclosure can be administered chronically. Preferably, the administration of the decorin, the drug or the composition comprising the decorin is at regular intervals. Preferably, the composition is administered to the subject at a frequency between a dose per day and a dose per week, in particular a dose every 2, 3, 4, 5, 6 or 7 days. Alternatively, the delivery frequency may be several doses per day, for example 2, 3, 4 or 5 doses per day. Depending on the age of the subject or its physiological condition, the daily doses can be fractionated to facilitate the administration, for example with a morning administration and another in the evening.

Diabetes Treatment

The present disclosure relates to a method for treating diabetes comprising administering a therapeutically effective amount of decorin or a pharmaceutical composition comprising decorin according to the present disclosure, a nucleic acid sequence encoding same, a vector comprising said nucleic acid sequence, or a cell comprising said nucleic acid sequence or said vector, to a diabetic subject or susceptible to develop diabetes.

In particular, the present disclosure relates to a method of treating diabetes comprising administering a therapeutically effective amount of decorin or a pharmaceutical composition according to the disclosure and transplantation of Langerhans islet cells to a diabetic subject. The cells of Langerhans islet cells are transplanted using the usual procedure in the field. In particular, they are transplanted into the liver of the recipient patient, where they will be implanted intraportally.

The methods of treatment according to the disclosure generally involve administering to an individual in need thereof an effective amount of decorin, a pharmaceutical formulation or composition according to the disclosure, or in order to limit or delay diabetes and its symptoms and/or to limit or delay the onset of complications of diabetes, either to reduce inflammation, or to promote the engraftment of pancreatic islets transplantation.

The methods of treating diabetes include methods of treating individuals diagnosed with diabetes, methods for reducing the risk of diabetes complications in an individual diagnosed with diabetes and who have been treated with conventional treatments, particularly individuals who have undergone or are susceptible to undergo a pancreatic islet cells transplantation.

In particular, the therapeutically effective or sufficient amount of decorin or a pharmaceutical composition according to the disclosure, is an amount making it possible to obtain the desired effect, namely an effect promoting the increase of insulin secretion by pancreatic islets and/or an effect decreasing inflammation and/or an effect promoting the viability of pancreatic islet cells, in particular that of transplanted pancreatic islets and/or their vascularization.

In particular, the therapeutically effective or sufficient amount of decorin or a pharmaceutical composition according to the disclosure, can be an amount that makes it possible to increase the insulin-independence duration of a diabetic patient, in particular that of a recipient patient having undergone a transplantation of pancreatic islet cells.

Preferably, the therapeutically effective or sufficient amount of decorin or of a pharmaceutical composition according to the disclosure, is an amount allowing to delay the onset of complications of diabetes for a diabetic patient, in particular that of a recipient patient having undergone a transplantation of pancreatic islet cells.

In a method of treating diabetes, a "therapeutically effective amount" of decorin or of a composition according to the disclosure is an amount that reduces the severity of a symptom and/or reduces a measurable parameter associated with diabetes of at least about 10%, at least about 20%, at least about 25%, at least about 30%, at least about 40%, at least about 50%, at least about 60%, at least about 70%, at least about 80%, or at least about 90% or more, in comparison with the symptom (for example, the severity of the symptom), or in comparison with the measurable parameter associated with diabetes, in the absence of treatment of the subject. Preferably, the measurable parameter is blood glucose.

In another method of treating diabetes, a "therapeutically effective amount" of decorin or of a pharmaceutical composition according to the disclosure is an amount that reduces inflammation of at least about 10%, at least about 20%, at least about 25%, at least about 30%, at least about 40%, at least about 50%, at least about 60%, at least about 70%, at least about 80%, or at least about 90% or more, in comparison with the symptom (for example, the severity of the symptom), or in comparison with the inflammatory condition of a diabetic patient not having been treated with decorin or by a pharmaceutical composition comprising it.

In another method of treating diabetes, a "therapeutically effective amount" of decorin or of a pharmaceutical composition according to the disclosure is an amount that increases the viability of pancreatic islet cells by at least about 10%, at least about 20%, at least about 25%, at least about 30%, at least about 40%, at least about 50%, at least about 60%, at least about 70%, at least about 80%, or at least about 90% or more, in comparison with the viability of pancreatic islet cells in the absence of treatment of the subject with decorin or with a pharmaceutical composition according to the disclosure.

In another method of treating diabetes, a "therapeutically effective amount" of decorin or of a pharmaceutical composition according to the disclosure is an amount that increases the vascularization of pancreatic islet cells by at least about 10%, at least about 20%, at least about 25%, at least about 30%, at least about 40%, at least about 50%, at least about 60%, at least about 70%, at least about 80%, or at least about 90% or more, in comparison with the vascularization of pancreatic islet cells in the absence of treatment of the subject with decorin or with a pharmaceutical composition according to the disclosure.

The present disclosure can be used in circumstances where it is desired to improve the viability of pancreatic islet cells regardless of the underlying diabetic condition. One advantage of the present disclosure is that it can be used to promote the viability and/or vascularization of pancreatic islet cells, by administration of decorin, of a pharmaceutical composition or a medicament comprising the decorin, a nucleic acid sequence encoding decorin, a vector comprising said nucleic acid sequence, or a cell comprising said nucleic acid sequence or said vector, before, during and/or after transplantation of pancreatic islet cells.

According to one aspect, the disclosure relates to a method for increasing the quality and/or survival duration of pancreatic islet cells, comprising administering to a donor and/or recipient subject a pharmaceutical composition according to the disclosure, such that the quality and/or duration of survival of the graft is increased. Preferably, the graft corresponds to the pancreatic islet cells before and/or after purification.

Thus, the disclosure also relates to the use of decorin to promote revascularization of pancreatic islets after transplantation in a recipient patient.

Particularly, the present disclosure relates to decorin, a nucleic acid sequence encoding decorin, a vector comprising this nucleic acid sequence, or a cell comprising said nucleic acid sequence or said vector, for the preparation of a medicament or of a composition for the treatment of diabetes, in particular in the context of a transplantation of pancreatic islet cells in humans. It also relates to a method allowing the promotion of the engraftment of pancreatic islet cells in a patient, the method comprising administering a therapeutically effective amount of the decorin or of a pharmaceutical composition according to the disclosure and the transplantation of the pancreatic islet cells.

In one embodiment, the donor patient is treated with decorin, a pharmaceutical composition or a medicament comprising the decorin, a nucleic acid sequence encoding the decorin, a vector comprising this nucleic acid sequence, prior to the removal of the pancreatic islets.

In one embodiment, the recipient patient is treated with decorin, a pharmaceutical composition or a medicament comprising the decorin, a nucleic acid sequence encoding the decorin, a vector comprising this nucleic acid sequence, or a cell comprising said nucleic acid sequence or said vector, before, during and/or after the transplantation of the pancreatic islets. The administration of decorin or of a composition according to the disclosure to the recipient patient can thus take place before, during and/or after the recipient patient has undergone the transplantation of the pancreatic islet cells.

Thus, according to a particular aspect, the recipient patient can receive decorin or a pharmaceutical composition according to the disclosure in combination with pancreatic islet cells. Preferably, these pancreatic islet cells come from a donor individual having been treated with decorin, a pharmaceutical composition or a medicament comprising the decorin nucleic acid sequence encoding the decorin or a vector comprising this nucleic acid sequence, prior to the removal of the pancreatic islets. Alternatively or additionally, the pancreatic islet cells may have been cultured in a medium comprising decorin prior to transplantation in the recipient patient.

The disclosure also relates to the administration or the transplantation of pancreatic islet cells having been contacted with decorin or with a composition comprising decorin, a nucleic acid sequence encoding decorin or a vector comprising this nucleic acid sequence, in a recipient patient, preferably a patient with diabetes, in particular type 1 diabetes.

The disclosure also relates to gene therapy methods intended for the treatment of diabetes, enabling the introduction of a nucleic acid sequence encoding decorin according to the present disclosure, in order to induce the secretion of decorin in the blood circulation and/or at the level of a tissue or organ, preferably the pancreas and/or the liver.

The gene therapy consists in correcting a deficiency or an anomaly (e.g. a mutation, aberrant expression) or for ensuring the expression of a protein of interest by introducing its nucleic acid sequence into the affected cell or organ. This nucleic acid sequence can be introduced either ex vivo in a cell extracted from an individual, the cell then being introduced into the target organ or tissue of the individual after its transformation, either directly in vivo in the cells of the appropriate tissue or organ.

In particular, cells are derived from a diabetic subject or from a donor subject and subjected to genetic manipulation to transfer thereto a sequence encoding the decorin or a variant thereof or a vector comprising this sequence. Preferably, these cells are eukaryotic cells, in particular human cells selected from stem cells, endocrine cells, pancreatic islet cells or liver cells. Preferably, the cells are pancreatic islet cells, in particular beta cells.

Thus, according to a particular aspect, the disclosure relates to gene therapy of pancreatic islet cells ex vivo. In this context, the transfer in the cells of the nucleic acid sequence encoding decorin or of the vector comprising it, can be carried out by electroporation, by biolistic or by liposomes, these methods being able to be optimized for the transfection of pancreatic islet cells (Levine et al, Diabetes Metab. Rev. 13:209-246 (1997)). In a particular embodiment, the CRISPR/Cas system may be used to modify the target cells. The transfer in the cells can also be carried out with viral vectors, preferably vectors having tropism for the target cells, for example those of pancreatic islets or liver cells.

In a particular aspect, the disclosure relates to a method for treating diabetes in a diabetic subject comprising the steps of: a) providing one or more pancreatic islet cells, preferably purified pancreatic islet cells, b) introducing into the cells a nucleic acid sequence encoding decorin or a vector comprising said sequence, c) transplanting the modified cells of step b) in the recipient diabetic subject in amounts sufficient to promote survival of the grafted pancreatic islet cells, to promote insulin production by these cells and/or to treat diabetes in the individual.

In particular, the pancreatic islet cells may be derived from a donor patient or the recipient patient itself. Thus, the transformed pancreatic islet cells comprising a nucleic acid sequence encoding decorin or a variant thereof may come from different patients or from the same patient.

Preferably, the increase in survival of the transformed cells with the nucleic acid sequence encoding decorin or a variant thereof that are transplanted in the recipient is of at least 20%, 50% or 75%, with respect to cells that have not been transformed with a nucleic acid sequence encoding decorin. Comparisons in the survival rate of cells can be performed at any time after transplantation, for example, a week, a month, three months, six months, a year, five years, etc.

In some embodiments, the cells transformed with the nucleic acid sequence encoding decorin or a variant thereof promote insulin production in amounts sufficient for treating diabetes in the recipient for more than one week, preferably three months, more desirably a year; and ideally for the entire life of the recipient subject of these cells.

Diabetes and Complications Targeted by the Disclosure

The diabetes is characterized by a sugar level in the fasting blood greater than or equal to 1.26 g/l, verified twice. There are several tests for detecting or monitoring diabetes. The diagnosis of diabetes is based on the clinic, the presence of hyperglycemia, and the patient's questioning. The reference examination made in the laboratory of medical analyses is a blood test measuring the blood glucose level or blood sugar level, which varies according to the dietary intake. The examination of glycosuria, which consists in searching for albumin and sugar in urine, is also useful for detecting diabetes.

Type 1 diabetes occurs in young patients and without overweight. The presence of another type 1 diabetes in the family (in 1 case on 10) or another associated autoimmune disease (in 1 case on 10) reinforces the diagnosis. Type 1 diabetes is generally accompanied by cardinal syndrome and ketonuria.

Type 2 diabetes occurs in patients generally of more than 40 years, overweight with abdominal predominance. The presence of familial antecedent of type 2 diabetes, the existence of HTA, hypertriglyceridemia, arterial hypertension and hypo-HDL-cholesterolemia are frequently associated with hyperglycemia in type 2 diabetes and reinforce the diagnosis.

Gestational diabetes occurs for pregnant women. The pregnancy is of a diabetogenic nature because there is a physiological state of insulin resistance during this period, which can progressively worsen during pregnancy. Gestational diabetes may be asymptomatic or have symptoms similar to those of other types of diabetes. A first fasting blood glucose test in the first trimester of the pregnancy is recommended to detect a diabetes prior to pregnancy that went undetected. A second test called HGPO (Hyperglycemia caused by oral route) is carried out between the 24e and the 28e week of amenorrhea with 75 g of glucose. A blood glucose value greater than the defined thresholds (0.92 g/L to fasting; or I, 80 g/L 1 h after oral glucose loading; or 1.53 g/L 2 h after) is sufficient to diagnose gestational diabetes. In this case, gestational diabetes must be monitored and treated because it comprises a risk for the mother (preterm birth, risk of developing post-birth type II diabetes) such as for children (respiratory distress, neonatal hypoglycemia, risk of developing type II diabetes).

The disclosure also relates to decorin or a pharmaceutical composition according to the disclosure for use in preventing and/or delaying the onset and/or limiting the progression of at least one of the complications of diabetes. The complications concern in particular acute complications such as diabetic ketoacidosis, hyperosmolar coma, severe hypoglycemia, retinopathy, nephropathy, renal failure, cardiovascular diseases, in particular coronary artery disease, obliterating arteriopathy of the lower limbs, strokes/TBI or other peripheral arterial vascular injuries in connection with atherosclerosis, mouth infections, foot ulcers, infections or perforating plantar disease. The disclosure concerns also decorin or a composition comprising decorin for use in order to improve the worsening factors of diabetes or the comorbidities, in particular hypertension, insulin resistance, obesity, overweight, hyperlipidemia or depression.

Preferably, the disclosure also relates to decorin or a pharmaceutical composition according to the disclosure for use in the treatment of a complication of diabetes selected from the group consisting of diabetic ketoacidosis, hyperosmolar coma, severe hypoglycemia, nephropathy, renal failure, cardiovascular diseases, in particular coronary artery disease, obliterating arteriopathy of the lower limbs, strokes/TBI or other peripheral arterial vascular injuries in connection with atherosclerosis, mouth infections, foot ulcers, infections or perforating plantar disease. The disclosure also relates to decorin or a composition comprising decorin for use in order to improve the worsening factors of diabetes or associated comorbidities, in particular hypertension, insulin resistance, obesity, overweight, hyperlipidemia or depression.

The disclosure also relates to decorin or a composition comprising decorin for use in order to improve the overall glycemic balance, in particular the reduction of hypoglycemias and hyperglycemias, the improvement of HbA1c and other parameters for evaluating the glycemic balance (for example TIR).

Pancreatic Islet Preservation

The disclosure also relates to the preparation and the use of a culture medium, for preserving or transforming pancreatic islet cells, the medium comprising decorin. The decorin is present in this medium as an active substance, i.e. having an effect on pancreatic islet cells, in particular on their survival, their quality and their ability to secrete insulin, and/or having an effect on the decrease of inflammation.

The isolation and the purification of human pancreatic islets require a multistage process of 5 to 7 h to extract and purify the fraction of pancreatic islets that will be transplanted to the recipient patient. An enzymatic digestion, a soft mechanical shearing, a controlled purification and culture are the established approach for the preparation of a final product enriched with islet cells.

The final preparation of the islets prior to their implantation consists in their incubation in a culture medium for 24 to 72 hours, in order to allow the quality of the evaluation of the release of the product to be controlled, as well as the initiation of the immunosuppressive treatment in the recipient before the graft. This islet culture period makes it possible to minimize the number of dead or apoptotic cells and their by-products, which once transplanted could trigger and/or increase inflammation, exposing the newly transplanted islets to deleterious cytokines.

The ability of the decorin to preserve the viability of the pancreatic islet cells in culture allows them to be shipped to remote clinical transplantation centers and also makes it possible to concentrate the skills in the matter of the isolation and the purification of the islets in the regional human cell treatment facilities, thus reducing the costs associated with the treatment of the pancreas and the subculturing of islet cells.

Thus, according to a particular aspect, the disclosure relates to a culture medium, for preserving or transforming pancreatic islet cells comprising or consisting essentially of decorin, the use of decorin for preparing pancreatic islet cells intended for transplantation in a diabetic patient, a method for preparing pancreatic islet cells intended for transplantation in a diabetic patient and also a graft comprising pancreatic islet cells prepared by this method or comprising decorin. In particular, the medium of culture, of preservation or of transformation of the pancreatic islet cells does not comprise collagen.

The method for preparing pancreatic islet cells intended for transplantation in a diabetic patient comprising ex vivo contacting of the pancreatic islet cells with the medium or the composition comprising decorin. Thus, the method comprises the steps of providing pancreatic islet cells and contacting said cells with decorin. In a first aspect, the cells of the pancreatic islets were obtained by removal from the donor subject. The cells can be brought into contact with the decorin directly after their removal from the donor, once purified, or at the same time of removal and purification of the cells. In another aspect, the pancreatic islet cells were prepared from stem cells, in particular by inducing their differentiation into pancreatic islet cells.

According to one aspect, the disclosure relates to a method for maintaining or increasing the viability of pancreatic islet cells ex vivo, comprising a step of contacting pancreatic islet cells with decorin as an active substance.

The disclosure also relates to the use of decorin for preserving or increasing the viability of pancreatic islet cells ex vivo.

In particular, the disclosure relates to an ex vivo method for preparing pancreatic islet cells intended for transplantation into a diabetic patient, said method comprising:
the supply of pancreatic islet cells,
optionally, the contact of the pancreatic islet cells with decorin,
the purification of pancreatic islet cells, optionally in the presence of decorin; and
the culture of the pancreatic islet cells, preferably in a medium comprising decorin,
the method comprising at least one step which is carried out in the presence of decorin.

In a particular embodiment, all the steps are carried out in the presence of decorin. In particular, the decorin is used in pretreatment in the donor subject, during the removal of islets from the donor, in culture of pancreatic islet in vitro prior to transplantation, in pre-treatment in the recipient subject, in post-transplantation treatment in the recipient and/or throughout the life of the graft in the recipient subject.

Furthermore, the disclosure relates to a composition or a graft comprising decorin and pancreatic islet cells. The pancreatic islet cells may have been prepared by the method detailed above or may have been prepared by the method currently conventionally used for the preparation of pancreatic islet cell graft. Optionally, these cells may have been transformed with a nucleic acid sequence encoding decorin according to the disclosure or with a vector comprising this sequence, in particular after their purification according to the method described above.

Thus, the disclosure also relates to a method of treating diabetes in a diabetic subject, said method comprising the transplantation of a composition comprising purified pancreatic islet cells and a medium comprising decorin into a recipient subject, preferably a diabetic recipient subject.

In particular, the disclosure also relates to a method of treating diabetes in a diabetic subject, said method comprising:
the removal of pancreatic islets from a donor patient,
optionally, the contact of the pancreatic islets removed with decorin,
the purification of pancreatic islet cells, optionally in the presence of decorin;
optionally, the transformation of the pancreatic islet cells with a nucleic acid sequence encoding decorin according to the disclosure or with a vector comprising this sequence,
the culture of the pancreatic islet cells, preferably in a medium comprising decorin, and
the transplantation into a recipient subject of the composition comprising the purified pancreatic islet cells and optionally decorin,
the method comprising at least one step carried out in the presence of decorin.

In a particular embodiment, all the steps are carried out in the presence of decorin. In particular, the decorin is used in pre-treatment of the donor subject, during the removal of islets from the donor, in culture of pancreatic islet in vitro prior to transplantation, in pre-treatment of the recipient subject, in post-transplantation treatment of the recipient and/or throughout the life of the graft in the recipient subject.

According to another aspect, the disclosure relates to a method for promoting insulin production in a diabetic subject, said method comprising transplanting a composition or a graft comprising pancreatic islet cells and decorin.

In another aspect, the disclosure relates to a method for increasing the insulin-independence duration for a patient, for reducing the risks of hypoglycemia or hyperglycemia, and/or for increasing blood glucose stabilization, said method comprising transplanting a composition or a graft comprising pancreatic islet cells and decorin.

The disclosure relates to decorin for use in preserving, increasing and/or maintaining the viability of pancreatic islet cells and/or increasing insulin secretion by pancreatic islet cells and/or decreasing inflammation. In particular, the cells of the pancreatic islets are present in a graft or in a composition intended to be transplanted. The decorin is in particular for acting on the cells of the pancreatic islets between the time of removal of the islets from the donor patient and their transplantation into the recipient patient. More specifically, it can be used to act on the cells of the pancreatic islets between the time of the removal of the islets from the donor patient and the time of the purification of the islets, and/or between the time of purification of pancreatic islet cells and the time of their transplantation into a recipient patient.

EXAMPLES

The following figures and examples are presented so as to provide a person skilled in the art with a complete disclosure and description of how to make and use the present disclosure. They and are not intended to limit the scope of what the inventors consider as their disclosure and do not necessarily represent all the experiments carried out. Although the present disclosure has been described with reference to its specific embodiments, a person skilled in the art will understand that various changes can be made and that equivalents can be substituted without departing from the true spirit and scope of the disclosure. Many modifications can be made to adapt a situation, a composition, a method, one or more steps of a method, to the objective, to the spirit and to the framework of the present disclosure. All these possible modifications fall within the scope of the disclosure.

In the context of the disclosure, a proteomic study has made it possible to identify the factors/myokines secreted by the muscle. This study makes it possible to study the precise molecular mechanisms at the origin of the effects induced by certain myokines in a "control" situation and after induction of insulin resistance or even diabetes in animals. This proteomic study revealed a myokine that has attracted the entire attention of the inventors: decorin.

1. 1. Effects of Decorin on Apoptosis and Proliferation of Pancreatic Islet Cells In a first time, the effects of decorin on the survival of pancreatic islets were evaluated, in particular in relation to apoptosis. To determine the effect of decorin on cell apoptosis, the TUNEL method has been used. This method makes it possible to fluorescently label the cells whose DNA is fragmented and which are therefore in apoptosis. The nucleus of the cells was also labelled with DAPI, about 1000 cells were counted for each sample. The islets are cultured in the absence or presence of decorin for 24 hours, then histological sections and a TUNEL labelling are carried out.

The apoptosis rate of the untreated cells is 14.51±4.46% while that of the cells treated with the decorin is only 4.51±1.14% (n=6, * p<0.05, FIG. 1). The analysis of this labelling shows that decorin makes it possible to significantly decrease apoptosis. A treatment with decorin for 24 h thus allows for better survival of pancreatic islets.

In a second time, the effect of decorin on the proliferation of pancreatic islet cells was evaluated. An interest in the proliferation helps to determine whether or not the decorin leads to the uncontrolled division of the cells, which may in particular lead to the development of tumors. A marking of KI67 is carried out on histological sections of islets. This protein is only synthesized during the division of the cells. Thus, if the cells are positively labeled for this protein then they are in division. The decorin has no impact on the proliferation of the islet cells.

1. 2. Effects of Decorin on the Functionality of Pancreatic Islets

Rat pancreatic islets are cultured in more or less glucose-rich media (2.8 or 16.7 mM glucose). The quantity of insulin or glucagon released in the medium is then determined by the ELISA method.

The impact of treatment with decorin on insulin secretion by pancreatic islets was evaluated. The insulin has the role of promoting the storage of glucose in the reserve organs of the body when the blood glucose level is high. The results show that the quantity of insulin released in the culture medium with 2.8 mM glucose is much lower than when the medium is rich in sugar with 16.7 mM glucose (n=10, * p<0.05 and *** p<0.001, FIGS. 2 and 3), and this, for both conditions.

The functionality test shows an improvement in insulin secretion in the presence of decorin with respect to the control condition (CTL). The statistical analysis shows that the difference between 2.8 mM and 16.7 mM glucose is of a probability p<0.05 (*, n=10) for the condition CTL and of a probability p<0.001 (***, n=10) for the decorin condition. This statistical power difference results in better management of insulin secretion when the islets are in the presence of decorin for 24 h. In parallel, the total quantity of insulin produced during the functionality test is also studied (n=10, FIGS. 2 and 3). The total quantity of insulin produced by the islets appears to be greater after treatment with decorin.

The impact of a treatment with decorin on the secretion of glucagon by the pancreatic islets was then evaluated.

Glucagon, unlike insulin, has the role of promoting the release of glucose from the storage tissues to blood when blood glucose is low. It is therefore logic to have a quantity of glucagon released in the culture medium with 2.8 mM glucose higher than when the medium is rich in sugar with 16.7 mM of glucose (n=12, NS: non-significant and ** p<0.01, FIGS. 2 and 3).

The functionality test appears to show a decrease in glucagon secretion for 2.8 mM glucose and 16.7 mM glucose after treatment for 24 h with decorin.

Figure 2:
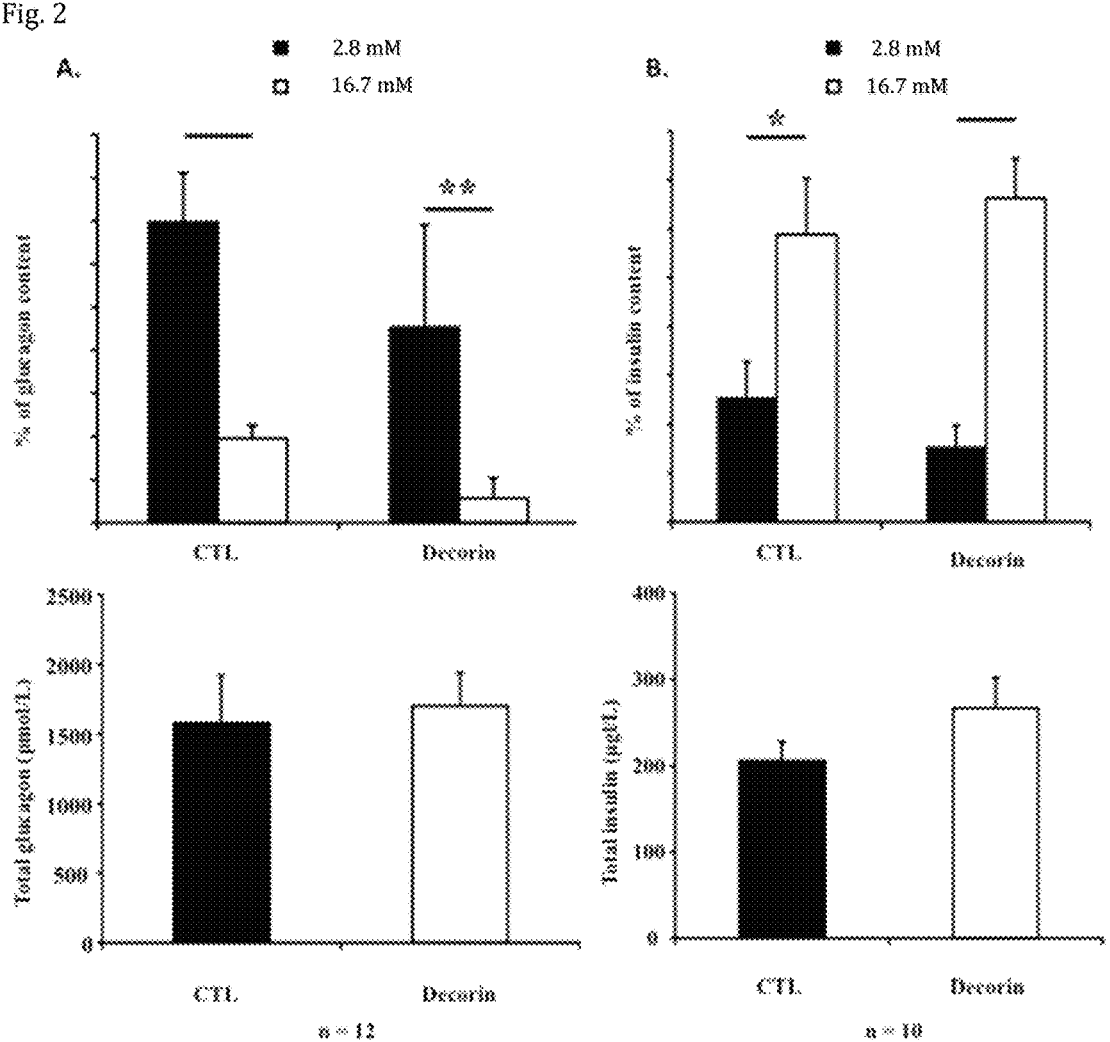
FIG. 2 represents the effect of decorin on the functionality of pancreatic islets. A. Glucagon secretion by the pancreatic islets treated with decorin (decorin) or not (CTL) and incubated in the presence of 2.8 mM (black column) or 16.7 mM glucose (white column). The secretion is represented in percentage with respect to the total glucagon content of the islets. B Insulin secretion by pancreatic islets treated with decorin (decorin) or not (CTL) and incubated in the presence of 2.8 mM (black column) or 16.7 mM glucose (white column). The secretion is represented in percentage with respect to the total insulin content of the islets. C. Total glucagon content of pancreatic islets. The black and white columns respectively represent the control conditions (CTL) and treatment of the pancreatic islets with the decorin. D. Total insulin content of pancreatic islets. The black and white columns respectively represent the control conditions (CTL) and treatment of the pancreatic islets with the decorin. The results are presented in the average form±SEM. n=10 and 12 independent experiments; * p<0.05, ** p<0.01 16.7 mM versus 2.8 mM glucose.
Figure 3:
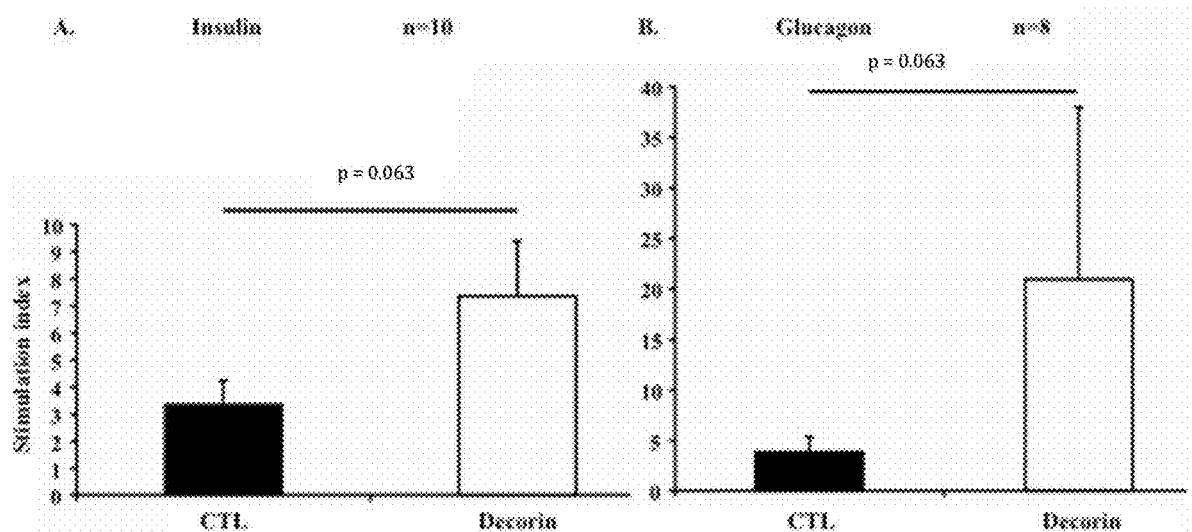
FIG. 3 represents the evaluation of the stimulation index of the pancreatic islets. A. The ratio of insulin secretion obtained when incubating the pancreatic islets with 16.7 mM versus 2.8 mM glucose. B Ratio between the glucagon secretion obtained when incubating the pancreatic islets with 2.8 mM versus 16.7 mM glucose. The black and white columns respectively represent the control conditions (CTL) and treatment of the pancreatic islets with the decorin. The results are presented in the average form±SEM. n=8 and 10 independent experiments.

In parallel, the total quantity of glucagon produced during the functionality test is also studied (n=12, FIG. 2). The statistical test confirms that the decorin does not change the amount of glucagon synthesized by the pancreatic islets.

1. 3. Effects of Decorin on the Signaling Pathways of the Survival and Function of Pancreatic Islets.

A mechanistic approach by Western Blot makes it possible to understand the results obtained for the study of apoptosis and the functionality test. For this purpose, the expression of the proteins of the IGF-1R/1RS/Akt signaling pathway was studied.

The membrane receptor Insulin-like Growth Factor 1 Receptor (or IGF-1 R) is one of the receptors on which insulin can bind and cause its activation. IGF-1 R then acquires a phosphate group and becomes phospho-IGF-1R (p-IGF-1R). This results in the activation of the signalling pathways linked to this receptor (Hakuno F., Takahashi S-L, 2018).

After treatment with or without decorin, the total protein content is retrieved after lysis of the pancreatic islet cells.

Figure 4:
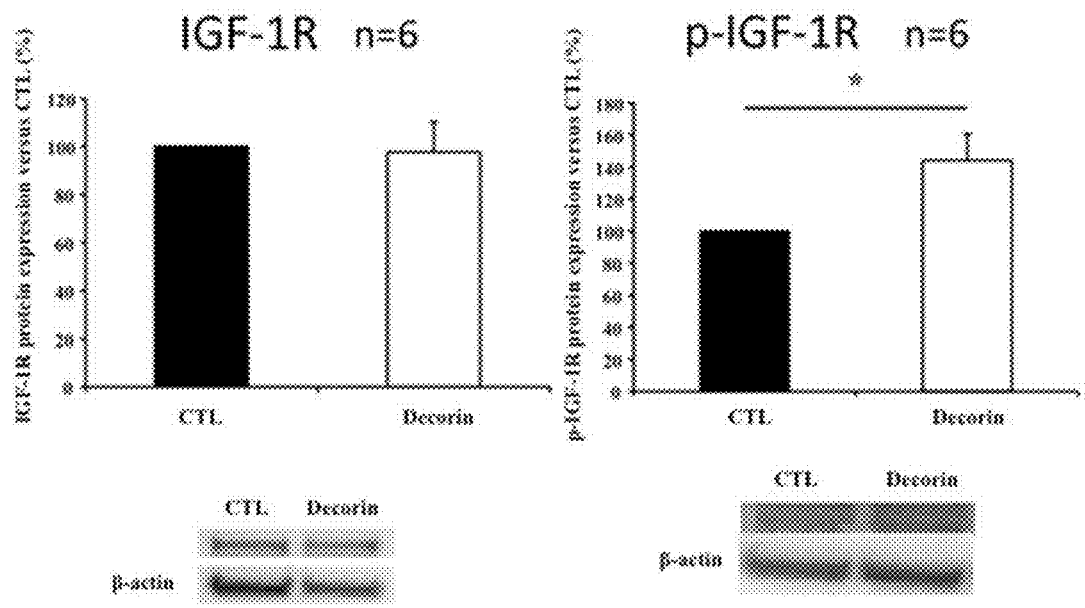
FIG. 4 represents the protein expression of IGF-1R (A) and p-IGFR-1R (B). The black and white columns respectively represent the control conditions (CTL) and treatment of the pancreatic islets with the decorin. The results are presented in the average form±SEM. n=6 independent experiments; * p<0.05 versus CTL.
Figure 5:
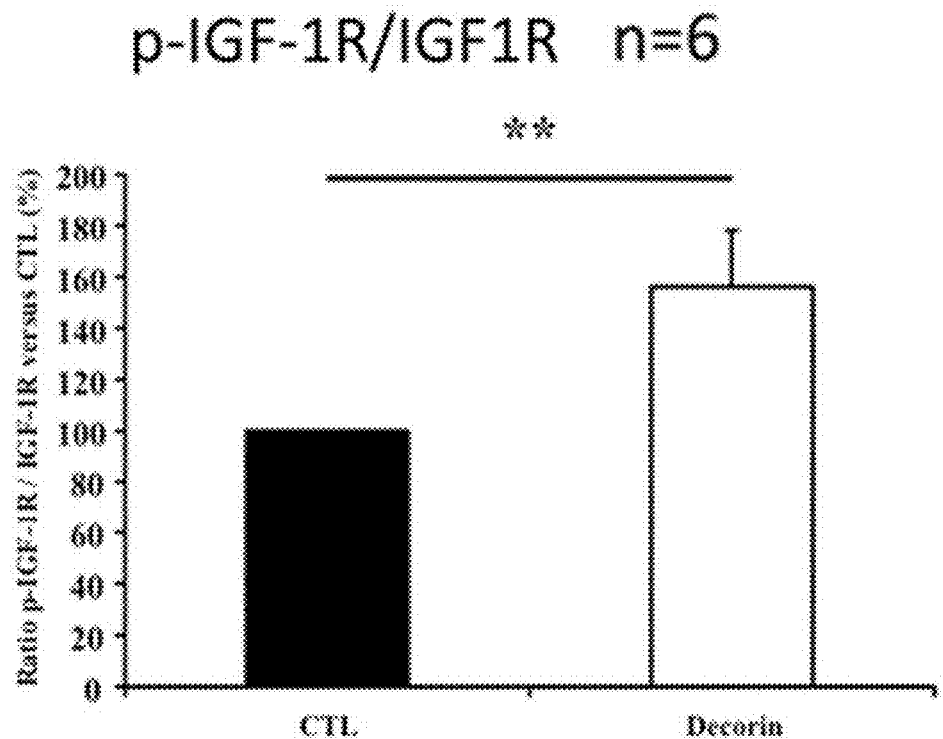
FIG. 5 represents the study of IGF-1R receptor activation. Ratio between the expression of p-IGF-1R and IGF-1R. The black and white columns respectively represent the control conditions (CTL) and treatment of pancreatic islets with decorin. The results are presented in the average form±SEM. n=6 independent experiments; ** p<0.01 versus CTL.

In decorin condition the expression of IGF-1R is of 98±13% with respect to the CTL (n=6, FIG. 4). In parallel, the study of the phosphorylated form of this protein (p-IGF-1R) shows a modification of its protein expression: 144±17% with respect to the CTL (n=6, * p<0.05, FIG. 4). The ratio of p-IGF-1R to IGF-1R shows an increase in the activation of IGF-1R by the decorin: 156±22% with respect to the CTL (n=6, ** p<0.01, FIG. 5).

To explain this increase in activation, two hypotheses emerge. The first is that the decorin binds directly on IGF-1R and causes its activation. The second hypothesis is that the increase in insulin secretion by the decorin causes the fixation of this hormone to its IGF-1R receptor and thus increases its activation. In both cases, an increased activation of IGF-1R is beneficial to pancreatic islet cells, since it makes it possible to trigger cellular survival, insulin secretion, but also angiogenesis signalling pathways. The first step of this signalling pathway is the activation of the substrates of IGF-1R: IRS-1 and IRS-2.

The Insulin Receptor Substrate 1 and 2 (IRS-1 and IRS-2) are inactive proteins linked to the intra-membrane portion of the IGF-1R receptor. When the insulin or the decorin (according to the hypotheses above) binds to this receptor, the phosphate group of the receptor is transmitted to the proteins IRS 1 and 2 (becoming p-IRS-1 and p-IRS2, active proteins). They will then initiate cell reactions, causing the entry of glucose into the cell, the survival and the cell growth.

Figure 6:
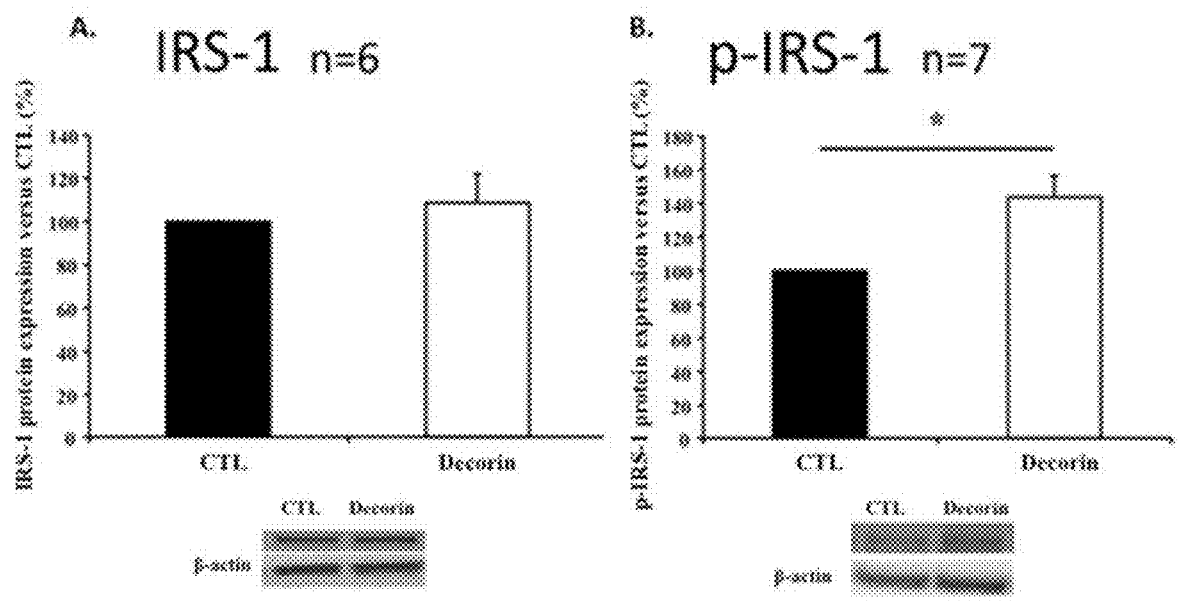
FIG. 6 represents the protein expression of IRS-1 (A) and p-IRS-1 (B). The black and white columns respectively represent the control conditions (CTL) and treatment of the pancreatic islets with the decorin. The results are presented in the average form±SEM. n=6 and n=7 independent experiments; * p<0.05 versus CTL.
Figure 7:
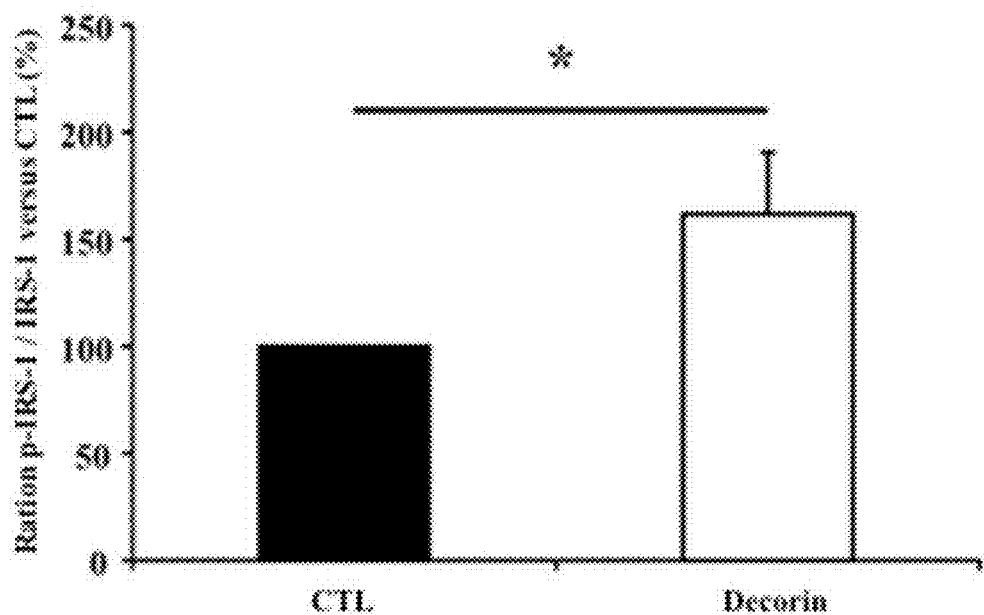
FIG. 7 represents the study of the activation of IRS-1. Ratio between the expression of p-IRS-1 and IRS-1. The black and white columns respectively represent the control conditions (CTL) and treatment of the pancreatic islets with the decorin. The results are presented in the average form±SEM. n=6 independent experiments; * p<0.05 versus CTL.

After 24 h of culture with decorin, the analysis of IRS-1 by Western Blot shows a protein expression of 109±13% with respect to the CTL (n=6, FIG. 6). In parallel, the active form of IRS-1 and p-IRS-1 was studied. The decorin makes it possible to improve the activation of this protein: 144±13% with respect to the CTL (n=7, * p<0.05, FIG. 6). The ratio of p-IRS-1 to IRS-1 shows an improvement in the activation of IRS-1 by the decorin: 162±29% with respect to the CTL (n=6, * p<0.05, FIG. 7).

Figure 8:
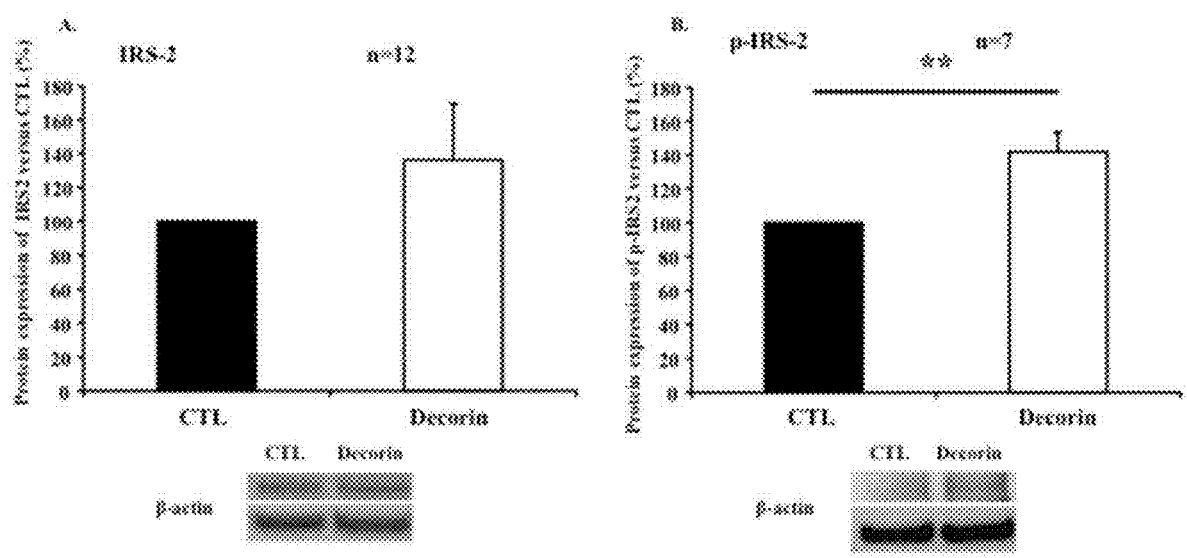
FIG. 8 represents the protein expression of IRS-2 (A) and p-IRS-2 (B). The black and white columns respectively represent the control conditions (CTL) and treatment of the pancreatic islets with decorin. The results are presented in the average form±SEM. n=6 independent experiments; ** p<0.01 versus CTL.
Figure 9:
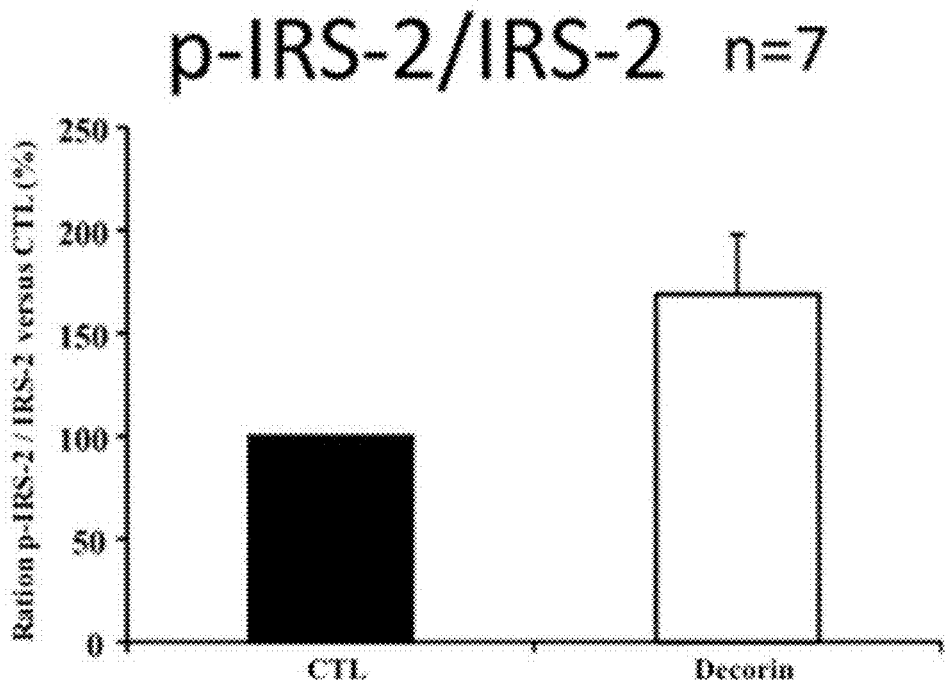
FIG. 9 represents the study of the activation of IRS-2. The ratio between the expression of p-IRS-2 and IRS-2. The black and white columns respectively represent the control conditions (CTL) and treatment of the pancreatic islets with the decorin. The results are presented in the average form±SEM. n=6 independent experiments.

For IRS-2, there is no significant difference between the two conditions, the protein expression of IRS-2 after treatment with the decorin is of 136±34% with respect to the CTL (n=12, FIG. 8). However, the expression of the active form of IRS-2, p-IRS-2, is significantly increased by the decorin: 142±12% with respect to the CTL (n=7, ** p<0.01, FIG. 8). The ratio of the active form (p-IRS-2) to the total form (IRS-2) shows that the decorin appears to increase the activation of IRS-2: 169±29% with respect to the CTL (n=7, FIG. 9).

On human islets, the expression and the activation of IRS 1 and 2 were studied with three repeats. Similarly to Rat, the protein expression of the inactive IRS-1 and IRS-2 forms is not modified. On the other hand, the expression of p-IRS 1 and p-IRS-2 is increased thanks to the decorin.

When IRS-1 and 2 are activated, several intracellular signaling pathways are engaged, The MAPK/ERK pathway: the transcription of growth, proliferation and cell survival genes is activated, The PI3K/AKT pathway: the transcription of cell survival and protein synthesis genes.

The mechanisms for synthesis and secretion of insulin are also activated. This signaling pathway is of interest, since the Akt protein is involved in the regulation of a large number of survival proteins such as FoxO1 and NF-kB p65. Akt is made active when it receives a phosphate group after the activation of IRS-1 or IRS-2, it then becomes phospho-Akt (p-Akt). p-Akt can then in turn activate different signaling pathways of cell survival and inhibit the mechanisms of apoptosis.

Figure 10:
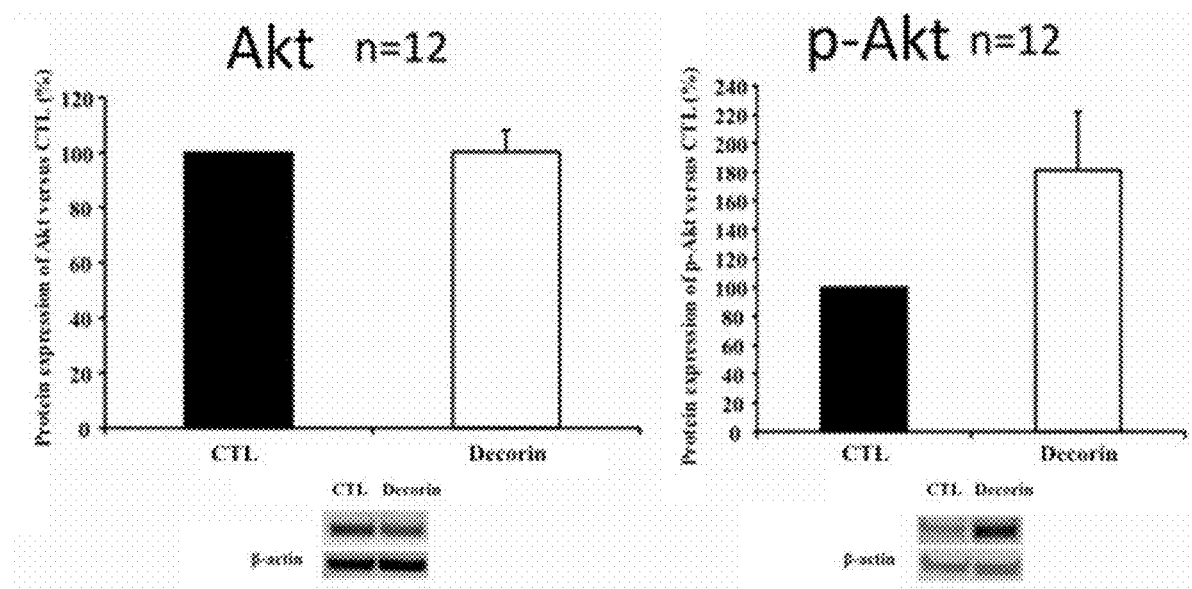
FIG. 10 represents the protein expression of Akt (A) and p-Akt (B). The black and white columns respectively represent the control conditions (CTL) and treatment of the pancreatic islets with the decorin. The results are presented in the average form±SEM. n=12 independent experiments.
Figure 11:
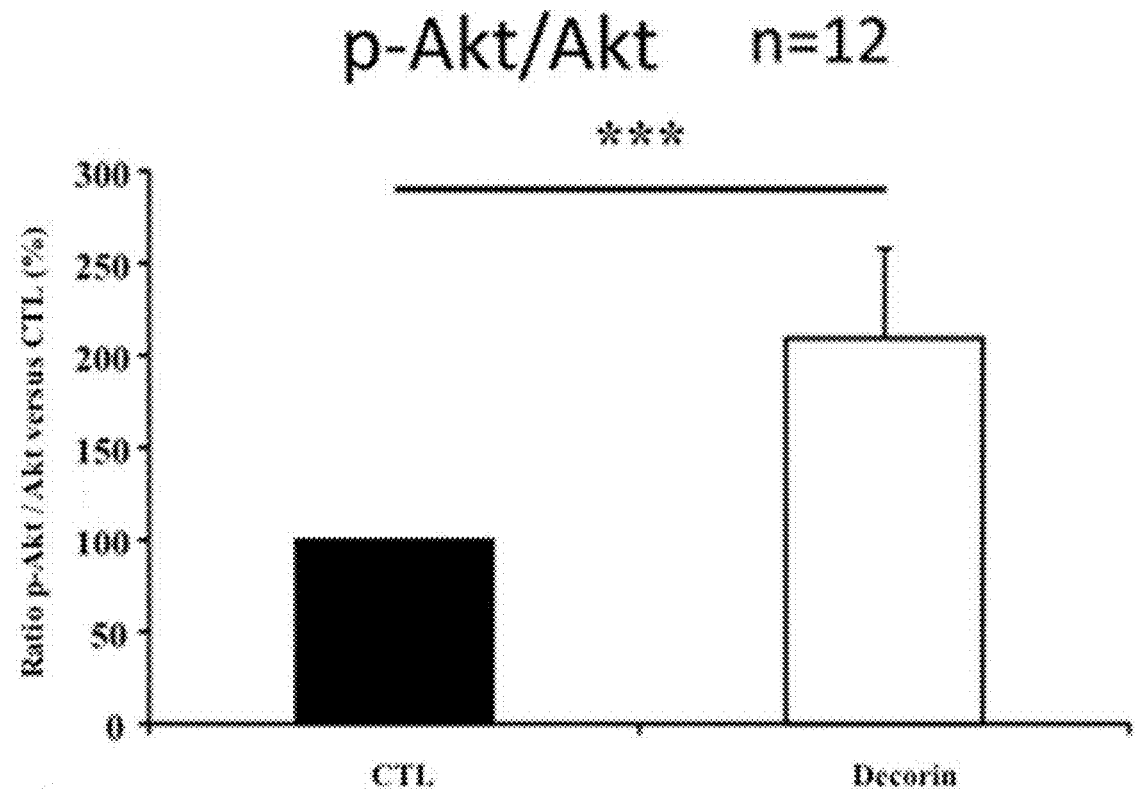
FIG. 11 represents the study of Akt activation. Ratio between the expression of p-Akt and Akt. The black and white columns respectively represent the control conditions (CTL) and treatment of the pancreatic islets with the decorin. The results are presented in the average form±SEM. n=11 independent experiments; *** p<0.001 versus CTL.

Akt is identically expressed in both conditions: $100\pm8\%$ relative to the CTL (n=12, FIG. 10). The decorin therefore does not have an effect on the Akt protein synthesis. However, the activation of Akt is modified: $181\pm41\%$ relative to the CTL (n=12, FIG. 10). The ratio p-Akt to Akt shows a significant difference between the two conditions: $209\pm49\%$ relative to the CTL (n=12, *** $p<0.001$, FIG. 11). It can therefore be concluded that decorin allows a greater activation of Akt.

When Akt is activated, this protein can regulate the activity of a large number of proteins, among them, FoxO1. FoxO1 is a transcription factor that regulates genes involved in apoptosis. This protein is phosphorylated by p-Akt, which will cause its exclusion from the nucleus, thus blocking the transcription of apoptosis genes (Oellich M. F., Potente M., 2012).

Figure 12:
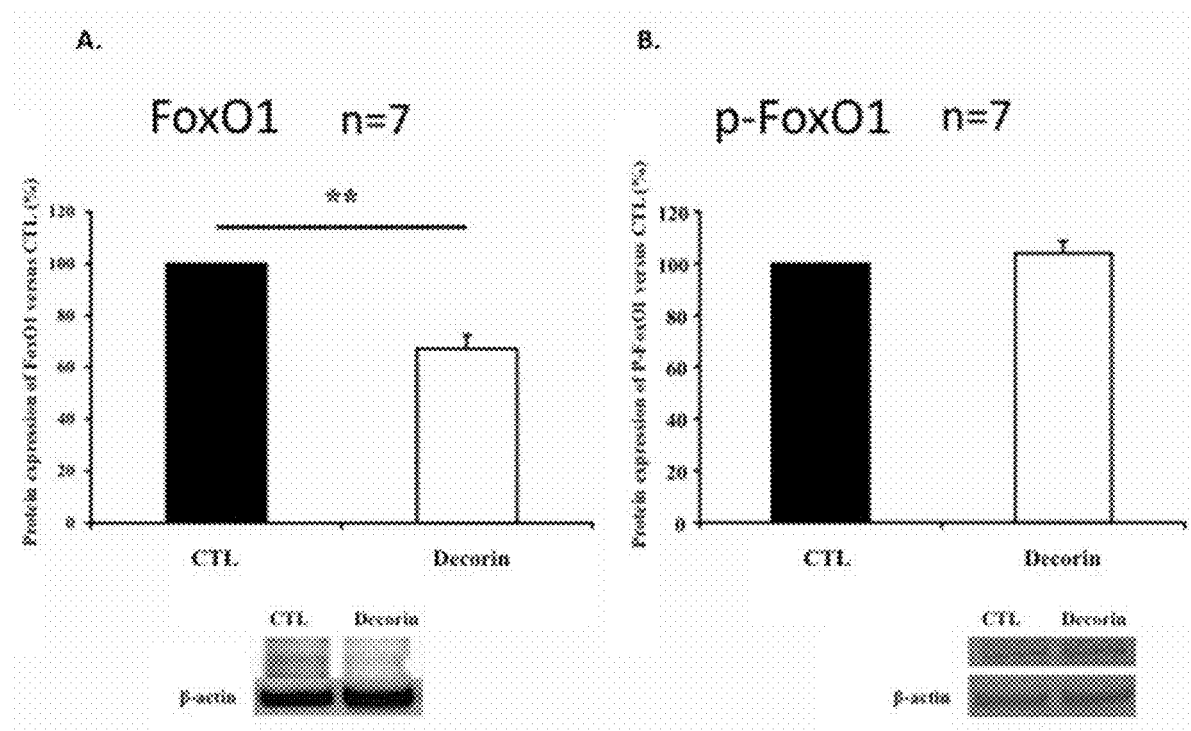
FIG. 12 represents the protein expression of FoxO1 (A) and p-FoxO1 (B). The black and white columns respectively represent the control conditions (CTL) and treatment of the pancreatic islets with the decorin. The results are presented in the average form±SEM. n=7 independent experiments; ** p<0.01 versus CTL.
Figure 13:
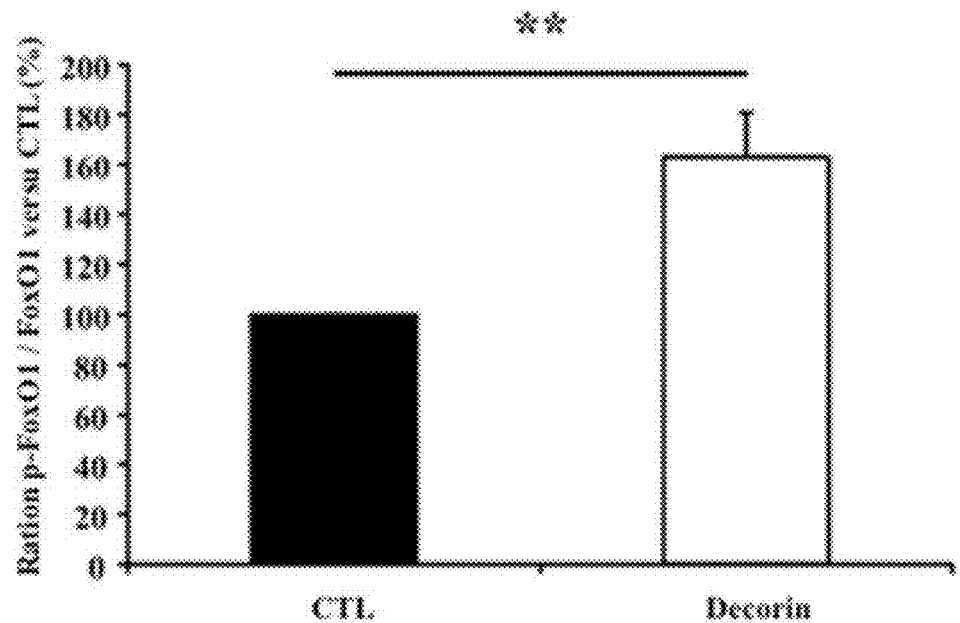
FIG. 13 represents the study of the activation of FoxO1. Ratio between the expression of p-FoxO1 and FoxO1. The black and white columns respectively represent the control conditions (CTL) and treatment of the pancreatic islets with the decorin. The results are presented in the average form±SEM. n=7 independent experiments; ** p<0.01 versus CTL.

The analysis of FoxO1 showed a significant decrease in the expression of this protein after 24 h of treatment with decorin: $67\pm6\%$ with respect to the CTL (n=7,  $p<0.01$, FIG. 12). In parallel, the inactive form of FoxO1 (p-FoxO1) was studied. The expression of the inactive form is identical in both conditions: $104\pm5\%$ with respect to the CTL (n=7, FIG. 12). The ratio of the inactive form to the active form shows significant inactivation thanks to the decorin: $163\pm18\%$ relative to the CTL (n=7,  $p<0.01$, FIG. 13).

These results are therefore consistent with those obtained for Akt and its active form p-Akt. Indeed, Akt makes inactive FoxO1 and causes its ubiquitination and its degradation by proteasome. In the literature, it has been shown that inactivation of FoxO1 makes it possible to promote the cell survival and the vascularization mechanisms (Ollericich M. F., Potente M., 2012). In parallel, a study showed that the inactivation of FoxO1 also plays a positive role in the mechanisms of synthesis and secretion of insulin (Nakae J. et al, 2002). Akt also regulates the protein expression of the p65 subunit of the NF-κB complex. NF-κB is a transcription factor composed of several subunits (p65, RelB, c-Rel, p50 and p52). Depending on the associations between the subunits, the binding to the target genes is different. Here, the NF-κB subunit p65 has been studied. If p65 and p50 form a complex, then the genes targeted by this transcription factor are genes of cell survival. When the p65 subunit is phosphorylated (phospho-p65), then the transcribed genes are pro-inflammatory and thus deleterious for the cell.

Figure 14:
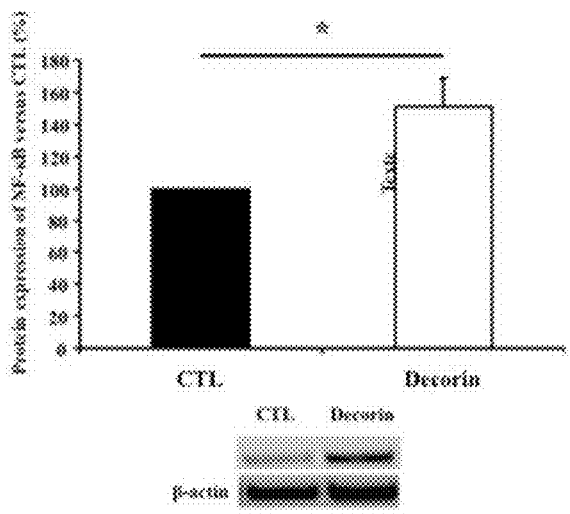
FIG. 14 represents the protein expression of NF-κB p65 (A) and p-NF-κB p65 (Ser536) (B). The black and white columns respectively represent the control conditions (CTL) and treatment of the pancreatic islets with decorin. The results are presented in the average form±SEM. n=7 and n=8 independent experiments; * p<0.05 versus CTL.
Figure 14:
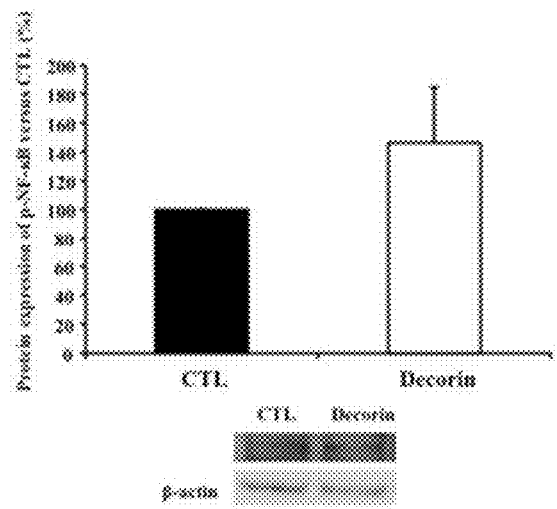
Figure 15:
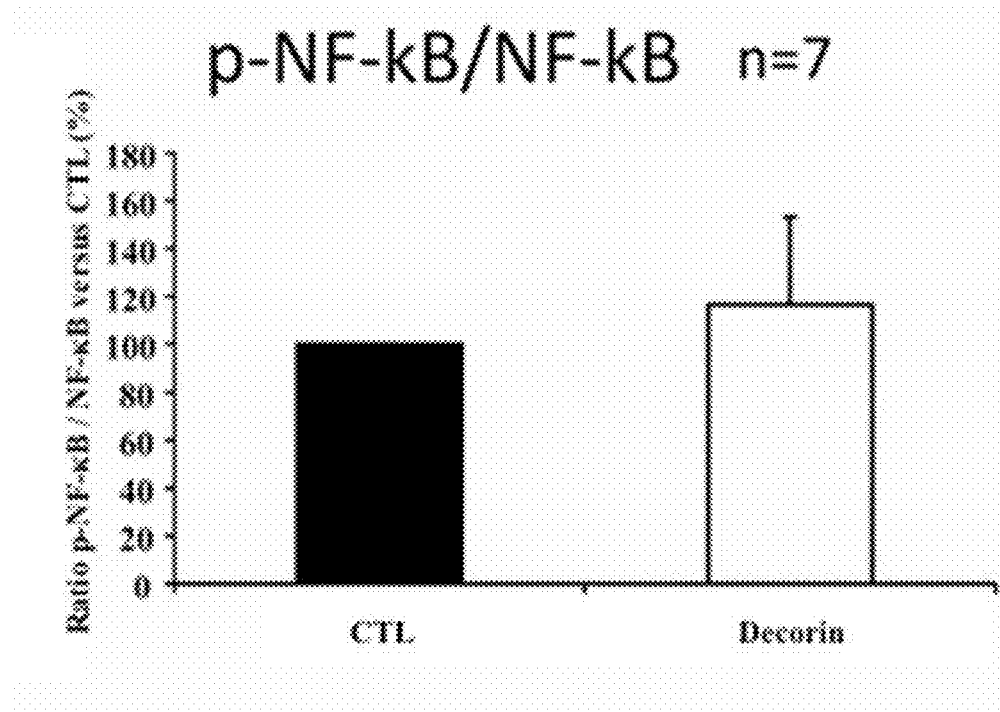
FIG. 15 represents the study of the activation of NF-κB p65. Ratio of the expression of p-NF-κB p65 (Ser536) and NF-κB p65. The black and white columns respectively represent the control conditions (CTL) and treatment of the pancreatic islets with the decorin. The results are presented in the average form±SEM. n=7 independent experiments.

The analysis of NF-kB p65 by Western Blot shows an increase of this factor thanks to decorin: $151\pm18\%$ with respect to the CTL (n=7, * $p<0.05$, FIG. 14). In parallel, the study of the phosphorylated form of p65 does not show a modification of the protein expression: $146\pm38\%$ with respect to the CTL (n=8, FIG. 14). Moreover, the ratio p-p65 to the total form p65 shows no change in expression: $116\pm37\%$ relative to the CTL (n=7, FIG. 15). Therefore, there is no increase in phosphorylation of the p65 protein of the NF-kB complex after exposure to decorin for 24 h.

This molecule therefore does not promote the transcription of pro-inflammatory genes via phosphorylation of p65. On the other hand, the protein expression of p65 due to decorin is interesting since in this inactive form, p65 can bind to another subunit of this complex (p50) and thus promote transcription of genes of cell survival.

Figure 16:
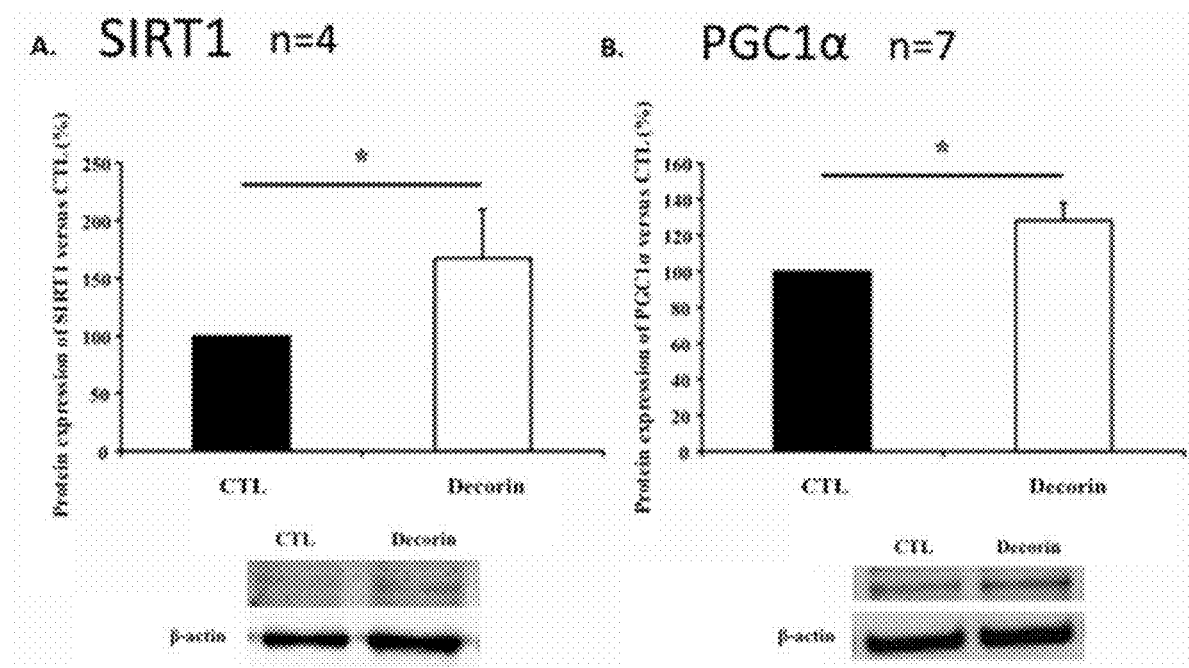
FIG. 16 represents the protein expression of SIRT1 (A) and PGC1α (B). The black and white columns respectively represent the control conditions (CTL) and treatment of the pancreatic islets with the decorin. The results are presented in the average form±SEM. n=4 and n=7 independent experiments; * p<0.05 versus CTL.

To refine these results, other intracellular survival mechanisms have been investigated, in particular with the study of SIRT1. This protein is a deacetylase that plays a positive role in the regulation of the metabolism, DNA repair, aging and cell survival mechanisms (Ollerich M. F., Potente M., 2012). SIRT1 thus makes it possible to control many signaling pathways such as those of NF-kB but also those of PGC1a. It also makes it possible to activate the HIF-2α signaling pathway, one of the angiogenesis pathways allowing the development of blood vessels. The analysis of SIRT1 shows a significant increase in its expression after exposure to decorin: $167\pm42\%$ with respect to the CTL (n=4, * $p<0.05$, FIG. 16).

It has been shown in the literature that the increase in SIRT1 expression makes it possible to protect pancreatic beta cells from inflammation (Prud'homme G J et al. 2014). The activity of SIRT1 is dependent on the quantity of nutrients in the cell. More it is low and more SIRT1 is activated (ratio NAD+/NADH low) (Oellerich M. F., Potente M., 2012). However, throughout the transplantation of pancreatic islets, the quantity of nutrients supplied to the cells is low since the vascular system is not yet sufficiently developed. Thanks to decorin, the expression of SIRT1 is increased, that will make it possible to multiply its actions during the islet transplantation, thus promoting the cellular survival mechanisms.

SIRT1 positively regulates the p65 subunit of NF-kB but also regulates the increase in the protein expression of PGC1α. This protein binds to a transcription factor that regulates genes involved in the energy metabolism management. It increases the biogenesis and function of mitochondria, it also plays a role in vascularization mechanisms.

The analysis of PG1lα shows an overexpression after exposure to decorin: $168\pm10\%$ with respect to the CTL (n=7, * $p<0.05$, FIG. 16). An increase in the protein expression of PGC1α thanks to decorin thus makes it possible to play on several important mechanisms after islet transplantation: efficiency of the cell (function of mitochondria, thus leading to an improvement in survival) and angiogenesis. The results obtained for this protein are consistent since it is established that SIRT1 can bind to PGC1α and activate it (Rodgers J T et al, 2005). A study also showed that PGC1α can positively regulate the production of VEGF and thus increase angiogenesis in a skeletal muscle model (Arany Z et al., 2008).

1. 4. Effects of Decorin on the Angiogenesis of Pancreatic Islets

In a first time, one of the major pathways of angiogenesis: the Hypoxia Induced Pathway (HIF-1a and 2a) as well as enzymes involved in their regulations, the Prolyl Hydroxylase Domains (PHDs) were studied by Western blot.

Figure 17:
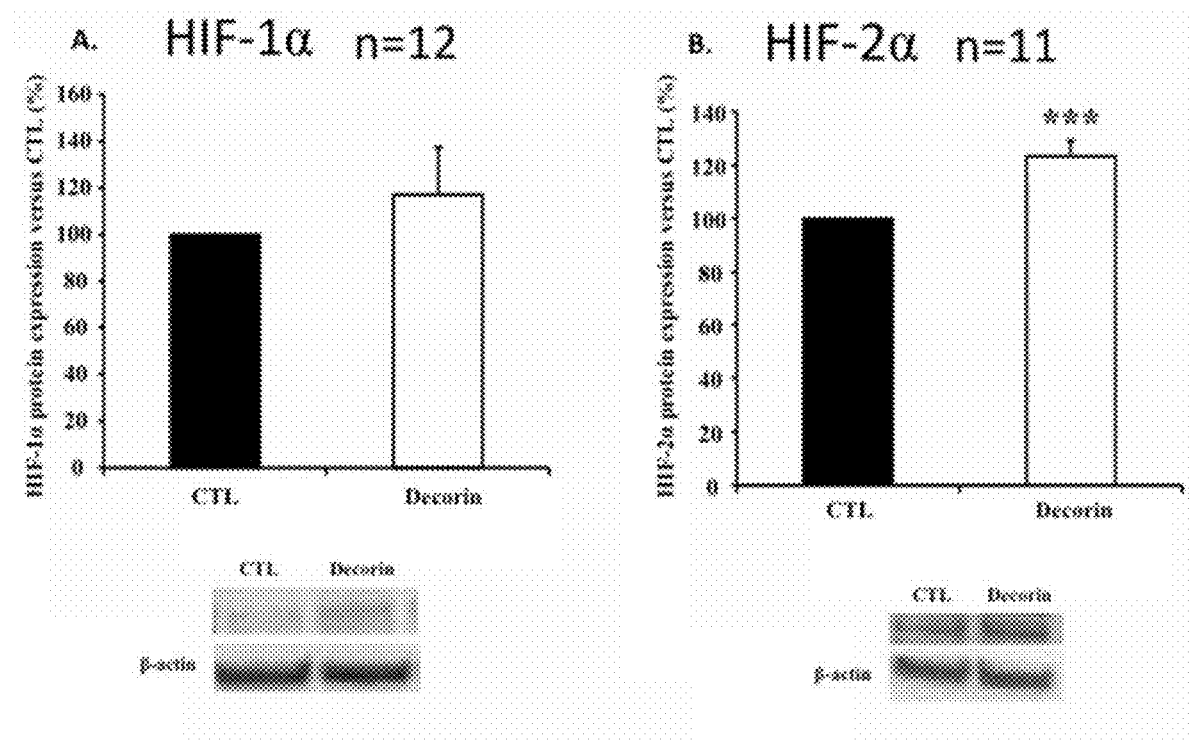
FIG. 17 represents the protein expression of HIF-1a (A) and HIF-2α (B). The black and white columns respectively represent the control conditions (CTL) and treatment of the pancreatic islets with the decorin. The results are presented in the average form±SEM. n=12 and n=11 independent experiments; *** p<0.001 versus CTL.

HIF-1a and HIF-2α are subunits of the transcription factors HIF-1 or HIF-2. After binding with the HIF-1β subunit, these protein complexes can bind to the promoter regions of angiogenesis-specific genes (such as the VEGF gene for example). They therefore play a major role in the development and growth of blood vessels. The study of HIF-1a does not show a significant difference between the two conditions: 117±20% with respect to the CTL (n=12, FIG. 17). In contrast, the study of HIF-2α shows an overexpression of this protein thanks to decorin: 163±6% relative to the CTL (n=11, *** p<0.0001, FIG. 17).

To complete this data the effect of the decorin on the expression of HIF-2α has been studied, in particular via an action on the PHDs. The PHDs are a family of enzymes comprising three proteins: PHD 1, 2 and 3, which, in normoxia (normal quantity of oxygen in the blood, allowing normal activity of the cells), promote the degradation of HIF-1 and 2a proteins by using oxygen as a substrate.

In contrast, in hypoxia, the oxygen is rare, because of lack of substrate the PHD can no longer degrade HIF-1a or 2a: the pro-angiogenic mechanisms are then engaged.

Figure 18:
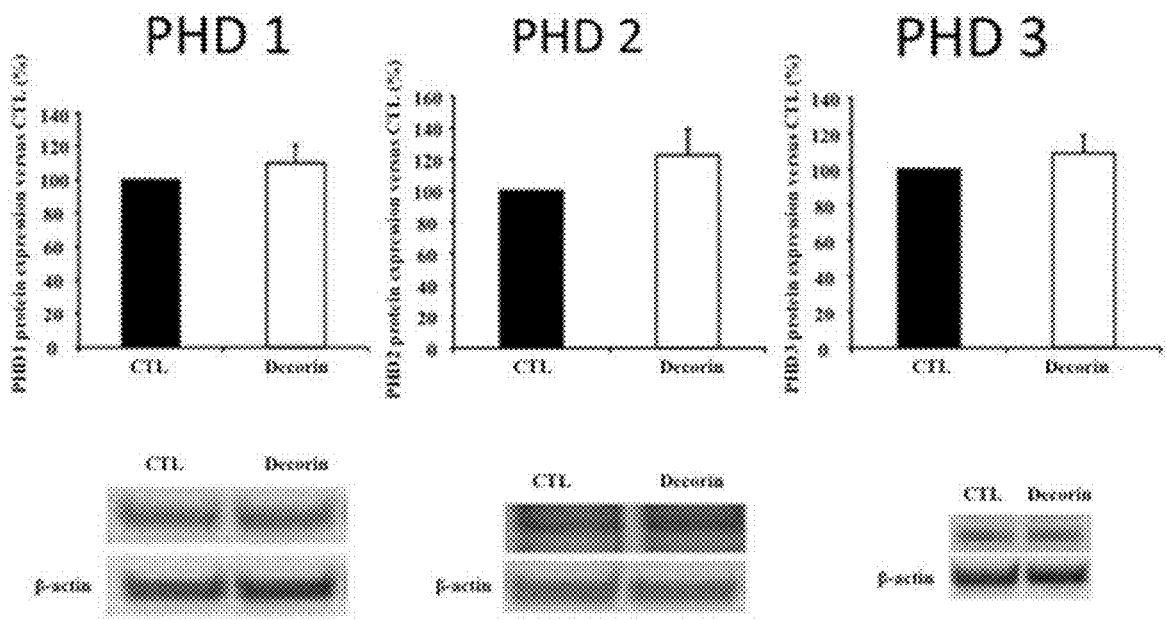
FIG. 18 represents the protein expression of PHD1 (A), PHD2 (B) and PHD3 (C). The black and white columns respectively represent the control conditions (CTL) and treatment of the pancreatic islets with decorin. The results are presented in the average form±SEM. n=12 independent experiments.

After 24 h of treatment with decorin, there is no modification of the expression of these three proteins with respect to the control condition. PHD1: 125±15%, PHD2 123±16% and PHD3 109±10% (n=12, FIG. 18). The overexpression of HIF-2α by the decorin therefore does not pass through an action on the PHDs.

An overexpression of HIF-2α without modification of the expression of PHDs allows the transcription of the angiogenesis genes. The decorin therefore appears to have an impact on the blood vessel development mechanisms within the pancreatic islets.

The HIFs pathway is not the sole responsible for vascularization and angiogenesis mechanisms. The inventors were thus interested in another major pathway of angiogenesis: the VEGF-A signaling pathway and its receptor the VEGF-Receptor 2 (VEGF-R2).

Figure 19:
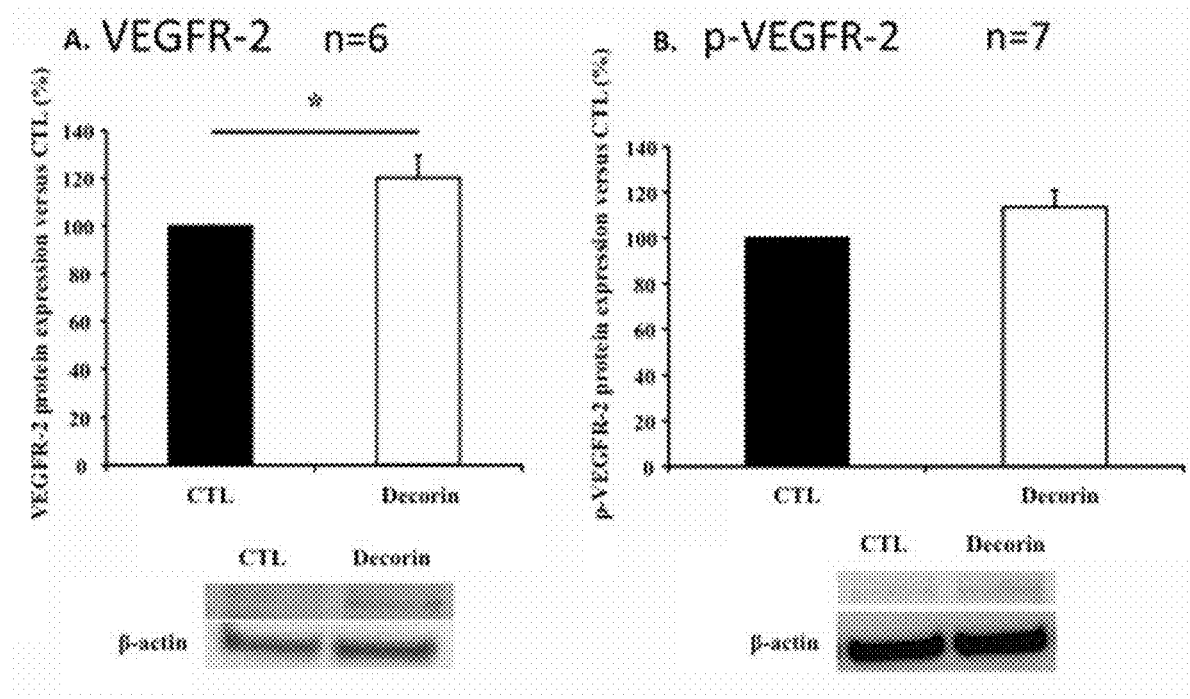
FIG. 19 represents the protein expression of the VEGFR2 receptor (A) and its phosphorylated form (B). The black and white columns respectively represent the control conditions (CTL) and treatment of the pancreatic islets with decorin. The results are presented in the average form±SEM. n=6 and n=7 independent experiments; * p<0.05 versus CTL.

VEGF-R2 (Vascular Endothelial Growth Factor Receptor 2) is a membrane receptor on which VEGF growth factor can bind. The binding of this protein to its receptor makes it possible to trigger cellular reactions (survival, proliferation, vascular permeability, modification of the cytoskeleton) and thus to stimulate angiogenesis. The study of VEGF-R2 shows a significant difference thanks to decorin: 120±9% relative to the CTL (n=6, * p<0.05, FIG. 19). In parallel, the study of the phosphorylated form (active form) of VEGF-R2 also shows a significant difference. After treatment with decorin, an increase in the quantity of VEGF-R2 and a significant increase in the activation of this receptor are observed. It is advantageous to increase the number of receptors since in this way the islets will be more receptive to induction of angiogenesis by VEGF when they will be transplanted.

Finally, in order to complete the study of the effects of decorin on the mechanisms of the angiogenesis of pancreatic islets, the secretion of VEGF-A in function of the time of culture was studied. For this purpose, rat islets were treated with decorin for 2, 4, 8, 12 or 24 h. At these different times, the culture medium is taken and the quantity of VEGF-A present in the medium is determined by the ELISA method. The cells are also collected and the quantity of proteins is determined for each sample in order to normalize the results.

Figure 20:
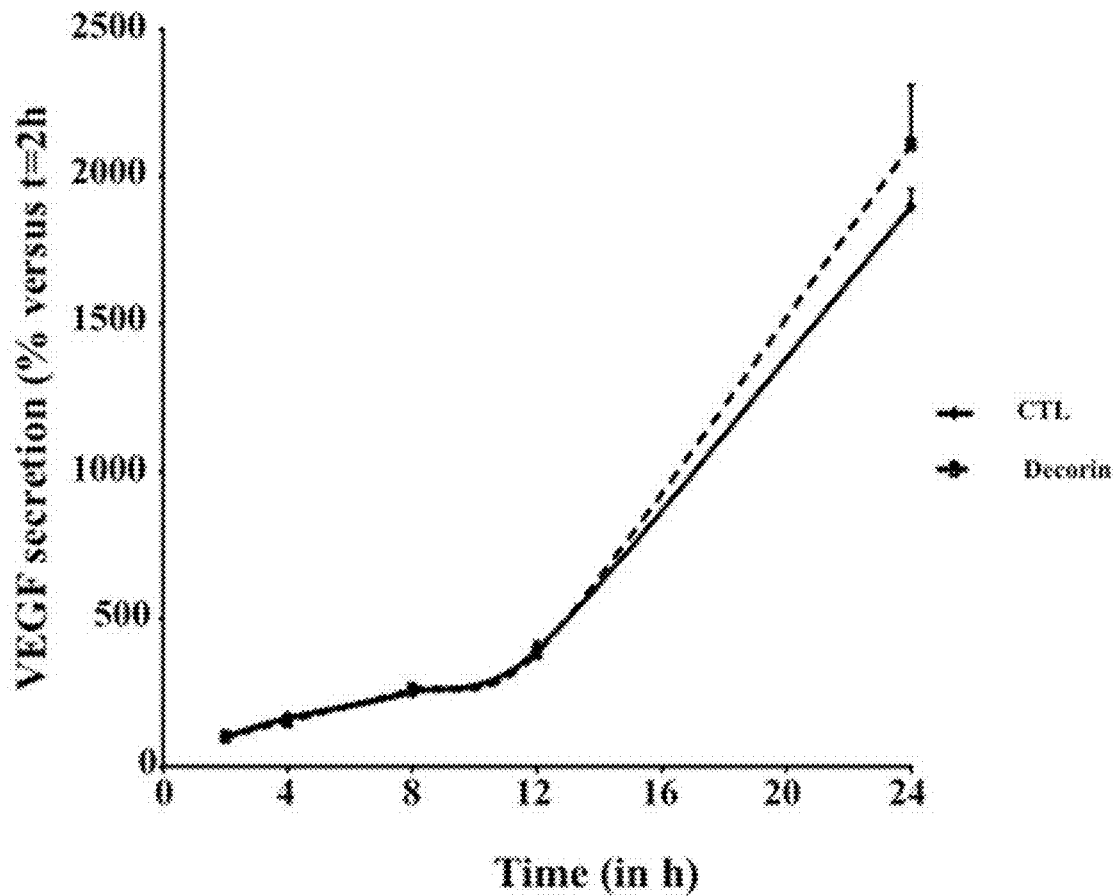
FIG. 20 represents the study of VEGF-A secretion over time. The black and dotted curves respectively represent the control conditions (CTL) and treatment of the pancreatic islets with decorin. The secretion of VEGF is represented in percentage with respect to time, 2 h after treatment. The results are presented in the average form±SEM. n=6 independent experiments.

The results are presented in the percentage form with respect to the condition CTL at time 2 h (% with respect to the CTL 2 h, n=6, FIG. 20). On this figure, we can first observe didentical secretion for both conditions between 2 h and 12 h of treatment. But after 24 h of treatment with decorin, the secretion of VEGF-A is increased (CTL=1896±61% and decorin=1992±152%).

1. 5 Effects of Decorin on Animals Models of Diabetes

Figure 24:
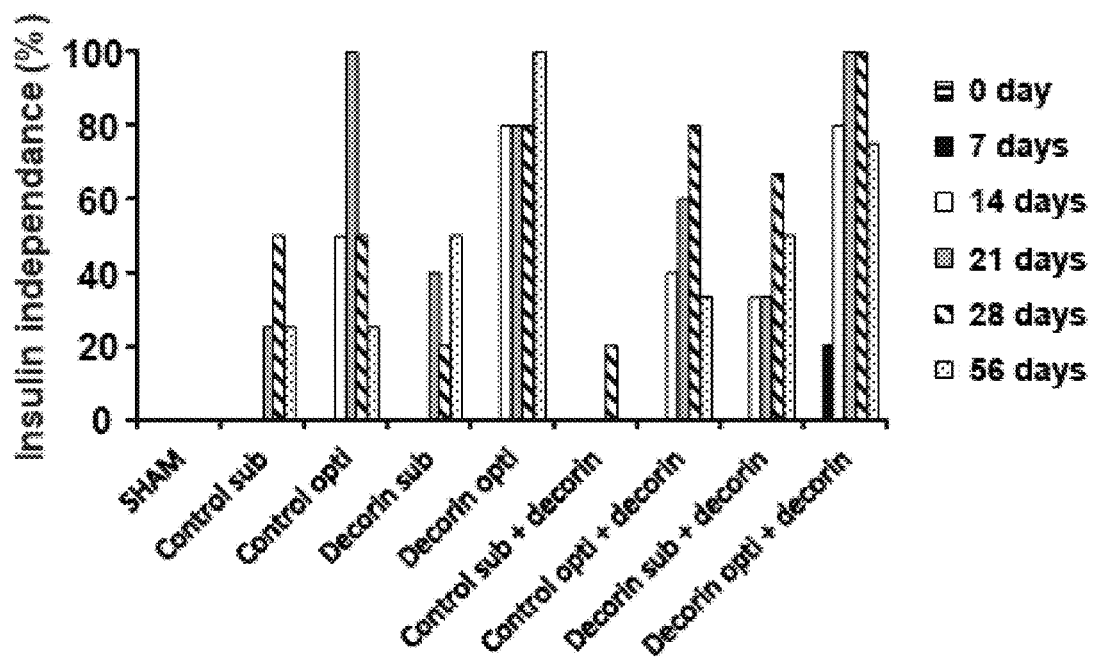
FIG. 24 represents the increase in insulin-independence of post-transplantation STZ rats with the decorin treatment: insulin-independence expressed in percentage of animals having reached normoglycemia (Glucose <2 g/l) relative to all animals of each of the SHAM or transplanted groups (Control or decorin having received 5000 (sub) or 10000 IEQ (opti)). n=3 to 5 independent experiments. The decorin is abbreviated under the term "decorin".
Figure 25:
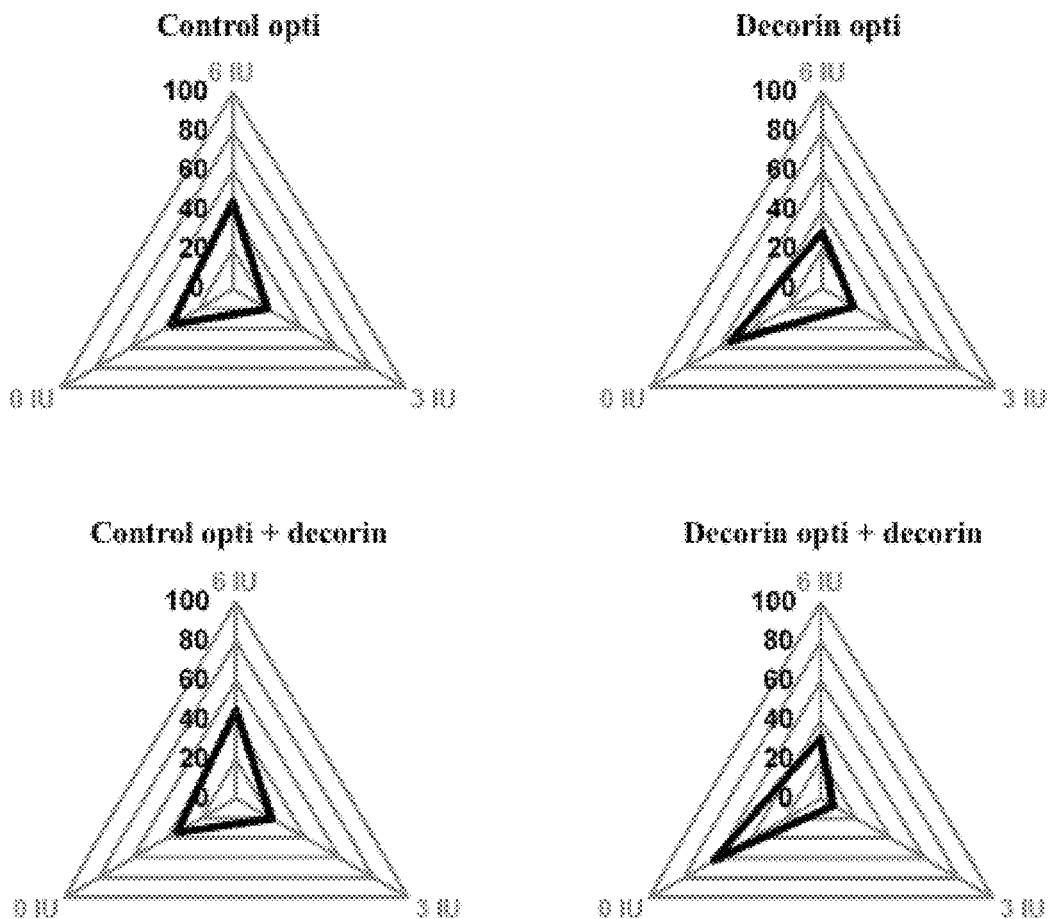
FIG. 25 represents the impact of decorin on the insulin needs of post-transplantation STZ rats. Spatial distribution of daily insulin needs received throughout the study by SHAM or transplanted animals (Control or decorin having received 10000 IEQ (opti)) according to 3 axes representing the doses of injected insulin (0 UI, 3 Ul or 6 UI). This distribution is represented as a percentage of animals having received one of the 3 doses relative to the set of animals of each of the groups shown. n=3 to 5 independent experiments.

The efficacy of islet transplantation was evaluated for 56 days post-transplantation in rats by controlling the body weight (FIGS. 21A and B, n=3 to 5), blood glucose (FIGS. 22A and B, n=3 to 5), c-peptidemia C (FIGS. 23A and B, n=3 to 5), the onset of insulin independence (FIG. 24, n=3 to 5) and the evolution of insulin needs (FIG. 25, n=3 to 5).

Figure 21A:
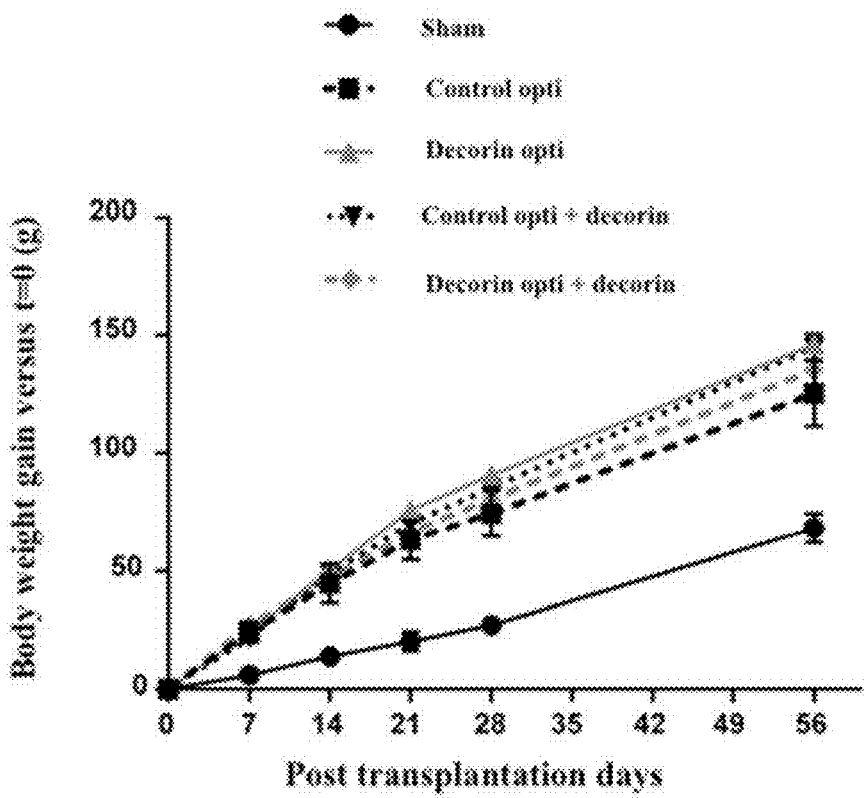
FIG. 21A represents the increase in body weight gain of post-transplantation STZ rats with decorin. A body weight gain over time measured in gram with respect to t=0 post-transplantation (10000 IEQ: opti) for the SHAM (●), control (■), decorin (▲), control+decorin (▼) and decorin+decorin groups (♦).
Figure 21B:
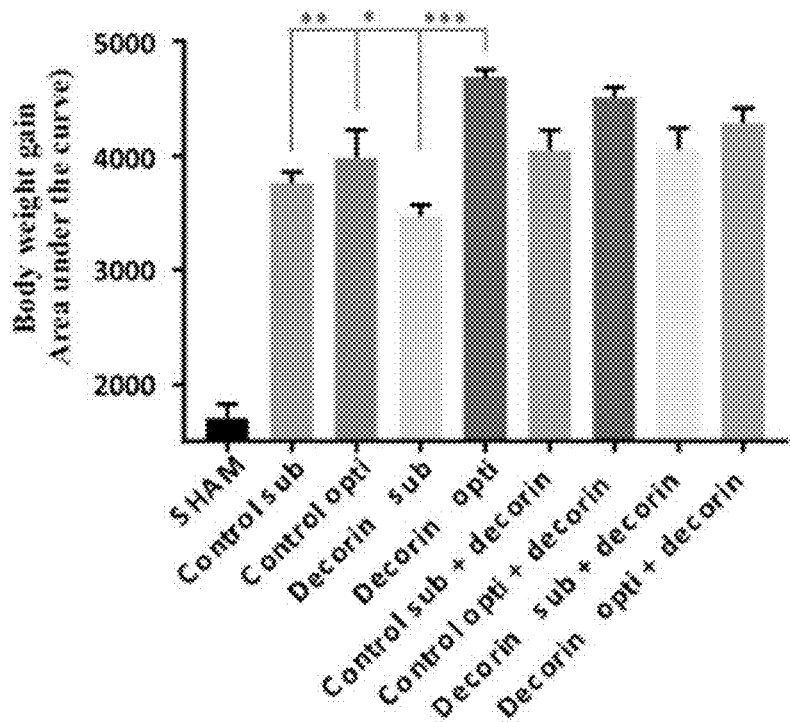
FIG. 21B represents the increase in body weight gain of post-transplantation STZ rats with decorin. B Gain of body weight evaluated over the set of 56 days of metabolic tracking and represented by the area under the curve for SHAM, control, decorin, control+decorin and decorin+decorin groups having been transplanted with 5000 (sub) or 10000 IEQ. The results are presented in the average form±SEM. n=3 to 5 independent experiments; * p<0.05, ** p<0.01 versus decorin opti. The decorin is abbreviated under the term "decorin".

First, the pre-treatment of pancreatic islets with decorin, added or not with injections of this myokine, appears to increase the body weight gain over time with respect to the control group, and this from 14 days post-transplantation (FIG. 21A, n=3 to 5). The effect of decorin on the weight gain is confirmed by measuring the areas under the curve (FIG. 21 B, n=3 to 5). Indeed, the results obtained on the whole study, show a significantly increased body weight gain for the rats transplanted with islets pre-treated with decorin (optimal condition) versus suboptimal controls (p<0.01, n=3 to 5), optimal control (p<0.01, n=3 to 5) and suboptimal decorin (p<0.001, n=3 to 5). In addition, no statistical difference is obtained between the "suboptimal" control and the "optimum control". Moreover, since this difference is no longer statistical between the optimal decorin group and the other groups having received in addition a decorin injection, this further demonstrated that the decorin has a positive effect on the body weight gain. Nevertheless, it remains to determine whether this gain is linked to an improvement in the function of the graft or to an increase in muscle mass.

Figure 22A:
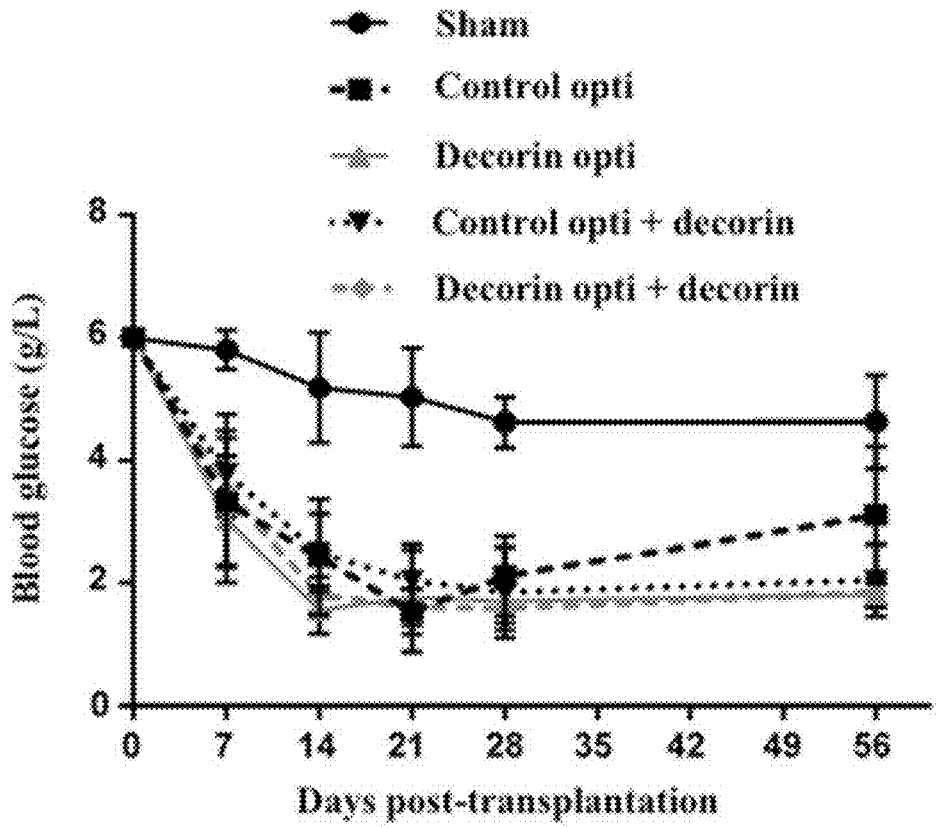
FIG. 22A represents the improvement of glycemic control of post-transplantation STZ rats with decorin. A. Blood glucose evolution over time measured in g/L for the SHAM (●), control (■), decorin (▲), control+decorin (▼) and decorin+decorin groups (♦).
Figure 22B:
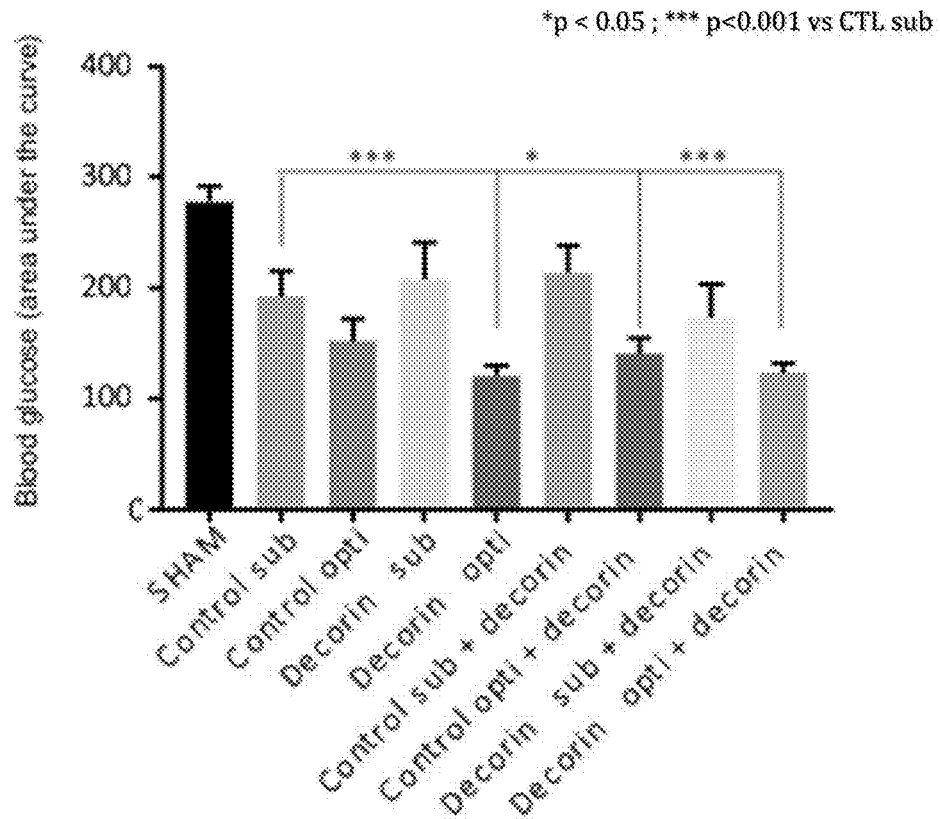
FIG. 22B represents the improvement of glycemic control of post-transplantation STZ rats with decorin. B. Blood Glucose evaluated over the set of 56 days of metabolic tracking and represented by the area under the curve for the SHAM, control, decorin, control+decorin and decorin+decorin groups having been transplanted with 5000 (sub) or 10000 IEQ. The results are presented in the average form±SEM. n=3 to 5 independent experiments; * p<0.05, ** p<0.01 versus decorin opti. The decorin is abbreviated under the term "decorin".
Figure 23A:
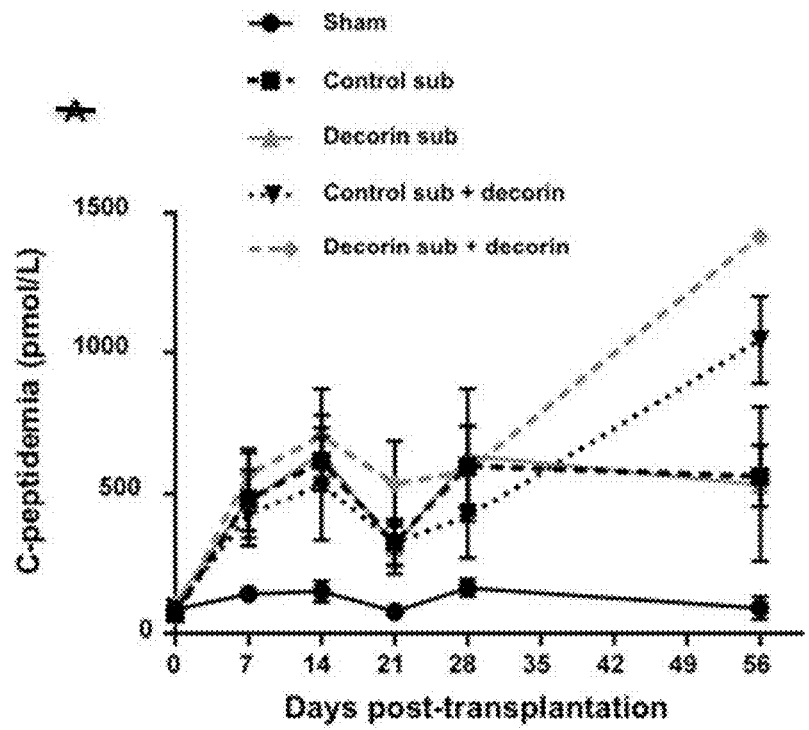
FIG. 23A represents the effect of decorin on the c-peptidemia of post-transplantation STZ rats. Evolution of c-peptidemia over time measured in pmol/l for the SHAM (●), control (■), decorin (▲) control+decorin (▼) and decorin+decorin groups (♦).
Figure 23B:
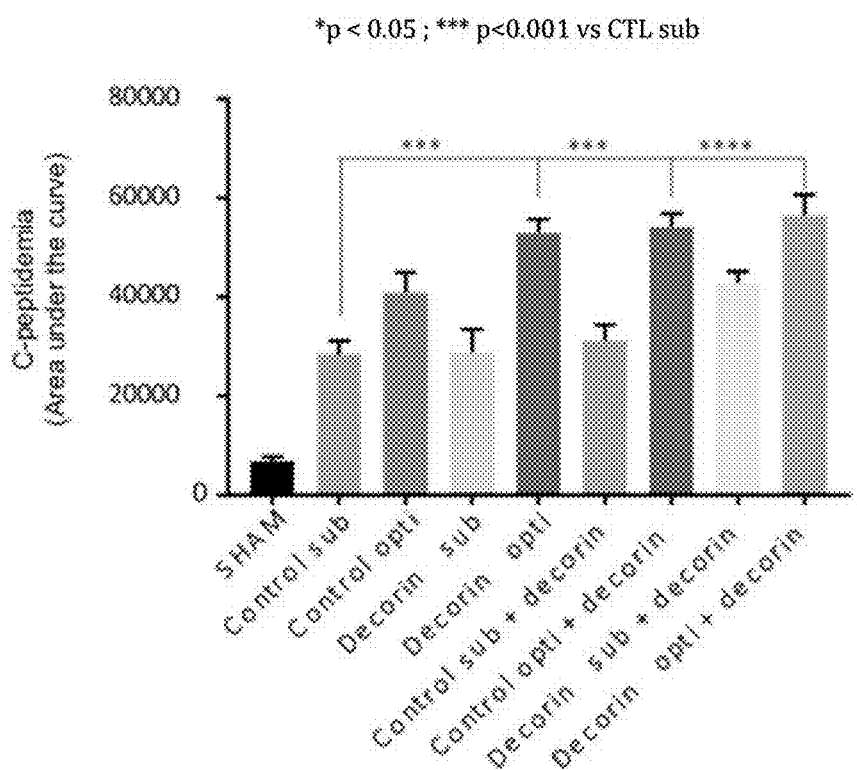
FIG. 23B represents the effect of decorin on the c-peptidemia of post-transplantation STZ rats. C-peptidemia evaluated over all 56 days of metabolic tracking and represented by the area under the curve for the SHAM group, control, decorin, control+decorin and decorin+decorin having been transplanted with 5000 (sub) or 10000 IEQ groups. The results are presented in the average form±SEM. n=3 to 5 independent experiments; * p<0.05, ** p<0.01 versus decorin.

A pre-treatment of the pancreatic islets with decorin and/or a daily injection of decorin improves the glycemic control of the transplanted rats with respect to animals having received a conventional graft (FIG. 22A, n=3 to 5). Indeed, as early as 14 days, the blood glucose of the control group is higher than the other transplanted groups with a remarkable stall after 28 days. This beneficial effect of decorin is confirmed by the analysis of the areas under the curve (FIG. 22 B, n=3 to 5). Indeed, only the "optimal decorin" groups (p<0.001), optimal control+injection of decorin (p<0.05) and optimal decorin+injection of decorin (p<0.001) groups have a blood glucose level significantly lower than the suboptimal control group. Moreover, the greatest significance obtained for the optimal decorin group+decorin injection (p<0.001) than the optimum control+injection of decorin (p<0.05) versus suboptimal control demonstrates that the pre-treatment of the islets with decorin associated with an injection of this myokine could be even more beneficial for the functionality of the graft. These results are reinforced by the study of c-peptidemia over time (FIG. 23A, n=3 to 5) and the analysis of the areas under the curve (FIG. 23 B, n=3 to 5).

Finally, the studies of obtaining insulin independence (FIG. 24, n=3 to 5) and insulin needs (FIG. 25, n=3 to 5) during the progress of monitoring, prove the favourable impact of the decorin on the function of the graft whether in pre-treatment only or associated with a daily injection of decorin (potentiating effect of the pre-treatment/injection combination). Indeed, after 7 days post-transplant, 20% of the animals become insulin independent for the group "optimal decorin+injection of decorin" against 14 days for the groups receiving a decorin injection. Furthermore, the "optimal decorin" groups with or without injection present a higher percentage of insulin independent animals than the other groups, with a maintenance of the percentage of insulin independent animals at least 80% at 56 days post-transplantation. Thus, in view of these results on metabolic control, it appears that the body weight gain observed with the decorin treatment could be linked to an improvement in the survival and the function of the graft.

1.6 In Vivo Study Showing the Interest of Decorin on the Survival of the Islet Graft after Transplantation to the Liver Level after Induction of Type 1 Diabetes.

Figure 26A:
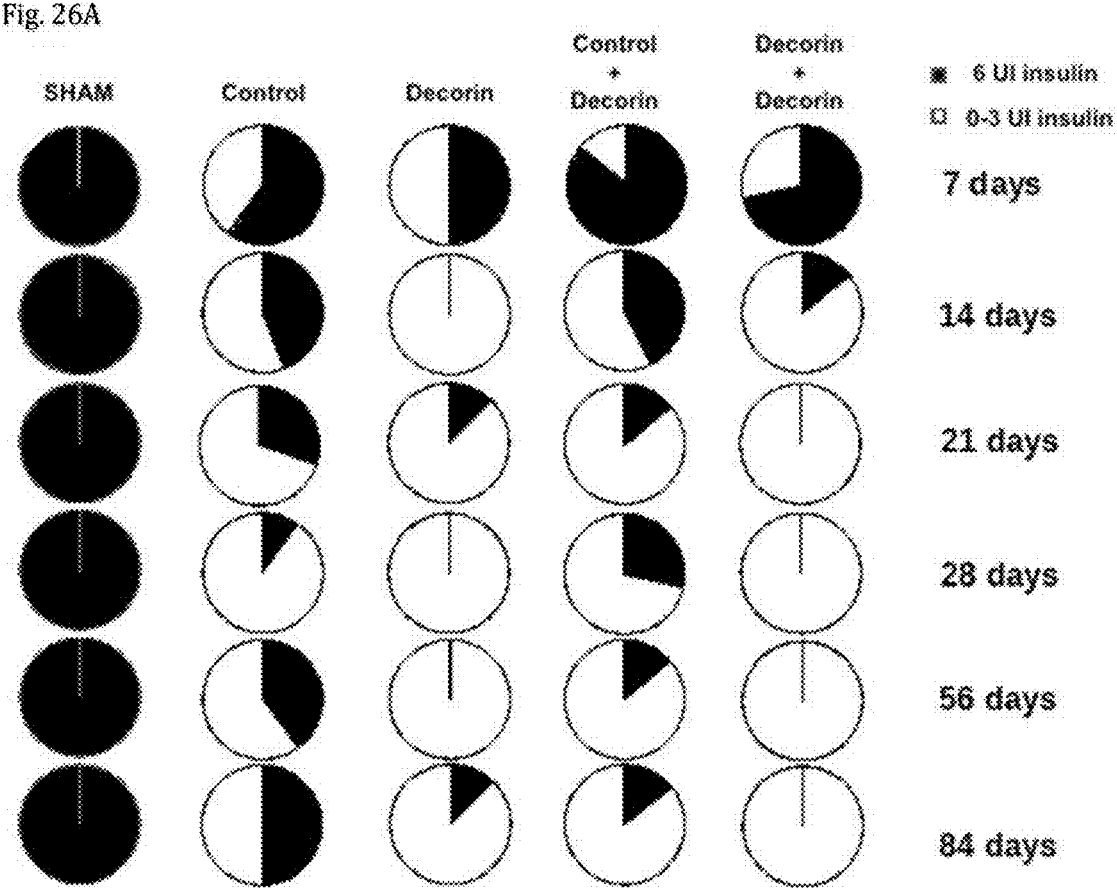
FIGS. 26A and 26B represent the need for insulin of rats after induction of diabetes by killing pancreatic beta cells and islets graft. The following groups are studied: SHAM: destruction of beta cells and no transplantation; control: destruction of beta cells+islets transplantation, decorin: destruction of beta cells+transplantation of pre-treated islets with decorin during 24 h; control+decorin: beta cells destruction+transplantation of islets with injection of decorin to the recipient every 24 h; decorin+decorin: destruction of beta cells+transplantation of pre-treated islets with injection of the recipient every 24 h. The decorin is abbreviated under the term "decorin".
Figure 26B:
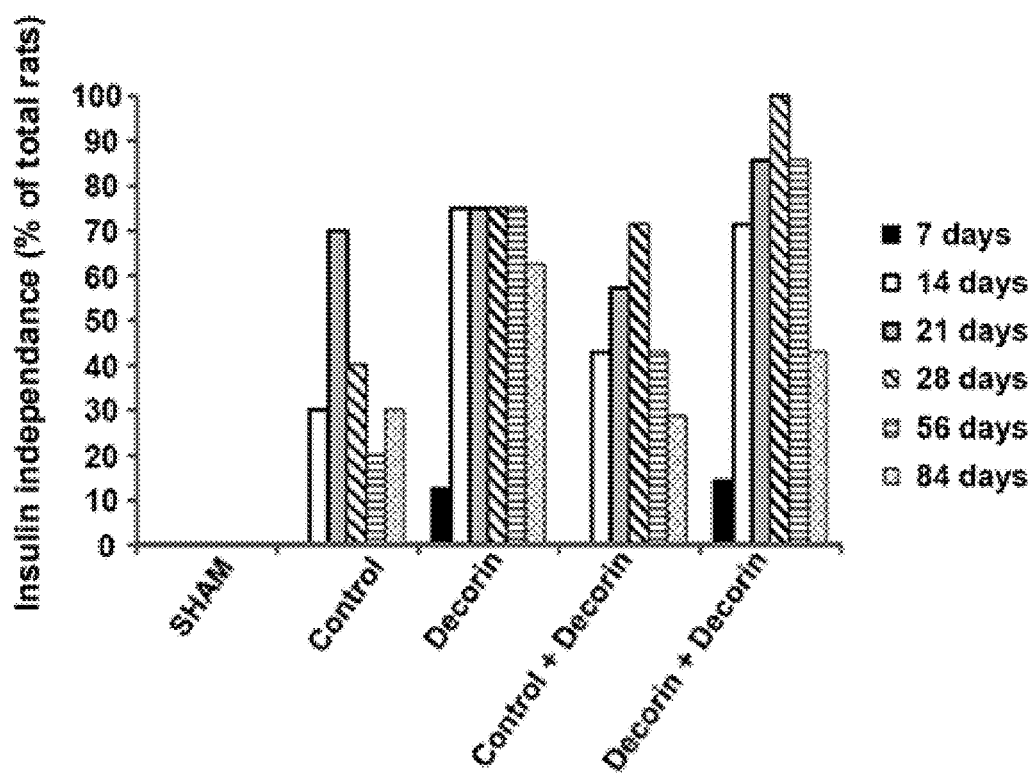

By comparing FIGS. 26A and 26B, it can be seen that the rats recipient of the islets transplantation have an islets graft surviving and operating much longer when a pre-treatment of the islets has been performed and that the graft recipient has received a decorin injection every 24 h. However, it can be observed that a pre-treatment of the islet before transplantation has a strong impact on the survival, the graft function and the insulin independence of the recipient.

Thus, it can clearly be seen that a pre-treatment with decorin increases the function and survival of transplanted islets in vivo (control vs. decorin). In addition, the injection of decorin in the recipient every 24 h in addition to the pre-treatment of the transplanted islets significantly increases the function of the transplant and the insulin independence of the recipient.

1. 7 Study of the Impact of Decorin in Diabetogenic Conditions

The human islets are treated either with decorin or exposed to different solutions mimicking the diabetogenic conditions (inflammation, fatty acid and sugar). It can be seen here that a decorin treatment potentiates insulin secretion and protects the human islet from the adverse effects of inflammation, of fatty acids and of hyperglycemia on insulin secretion but also on the survival of pancreatic beta-cells.

Figure 27:
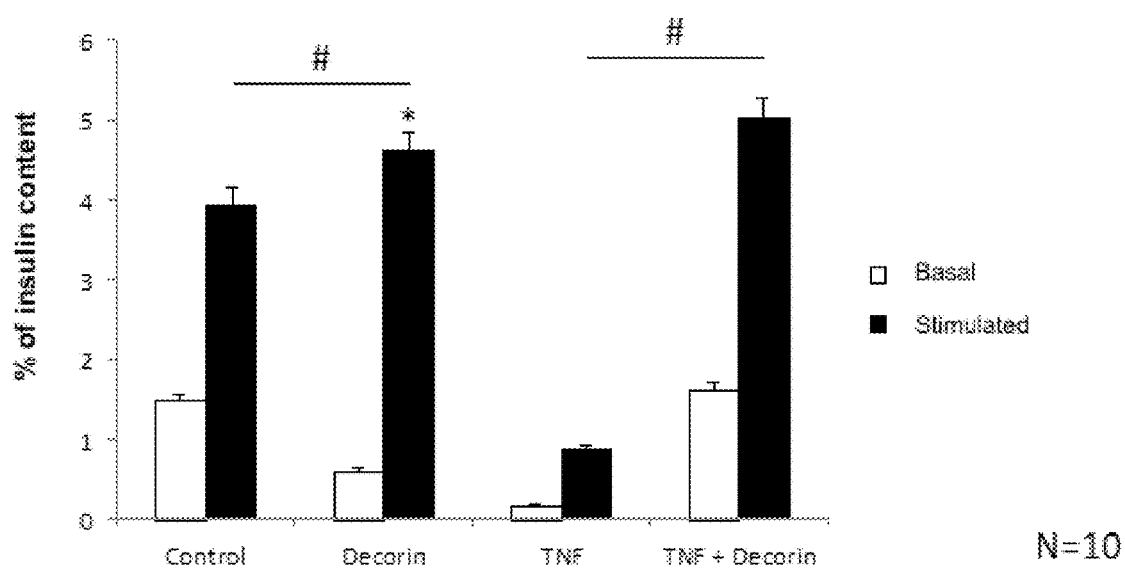
FIG. 27 represents the impact of decorin in humans on insulin secretion under control and inflammatory conditions (48 h TNF-ALPHA).

In particular, FIG. 27 shows that decorin potentiates insulin secretion in response to glucose and protects the effect of TNF-alpha on insulin secretion in human Langerhans islets. The 10 independent preparations of human islets were treated with decorin under control and after pre-treatment with TNF-alpha 20 nM for 24 h. The human islets have been treated in their native forms (no dissociation or cell isolation); N=10.

Figure 28:
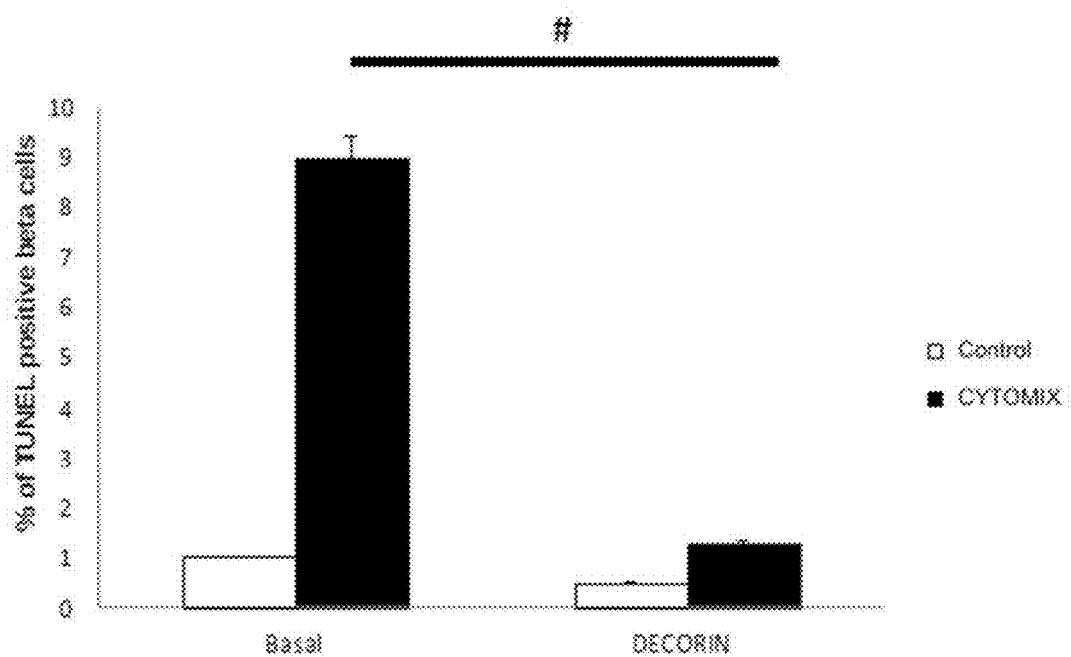
FIG. 28 represents the impact of decorin in humans on the survival and apoptosis in the control and inflammatory (Cytomix 48 h TNF-alpha+Interferon gamma+IL1-beta) conditions. The decorin is abbreviated under the term "decorin".

FIG. 28 shows that the decorin increases the survival of the pancreatic beta cell and protects from the cell death induced by a mix of pro-inflammatory cytokine known to induce cell death during diabetes. The human Langerhans islets have been treated and then have undergone a double labeling: a TUNEL labeling marking the dead cells and an insulin labeling marking the beta-pancreatic cells. The 10 independent preparations of human islets were treated with decorin under control condition and after pre-treatment with TNF-alpha+interferon gamma+IL-1beta (20 nM for 24 h). N=10

Figure 29:
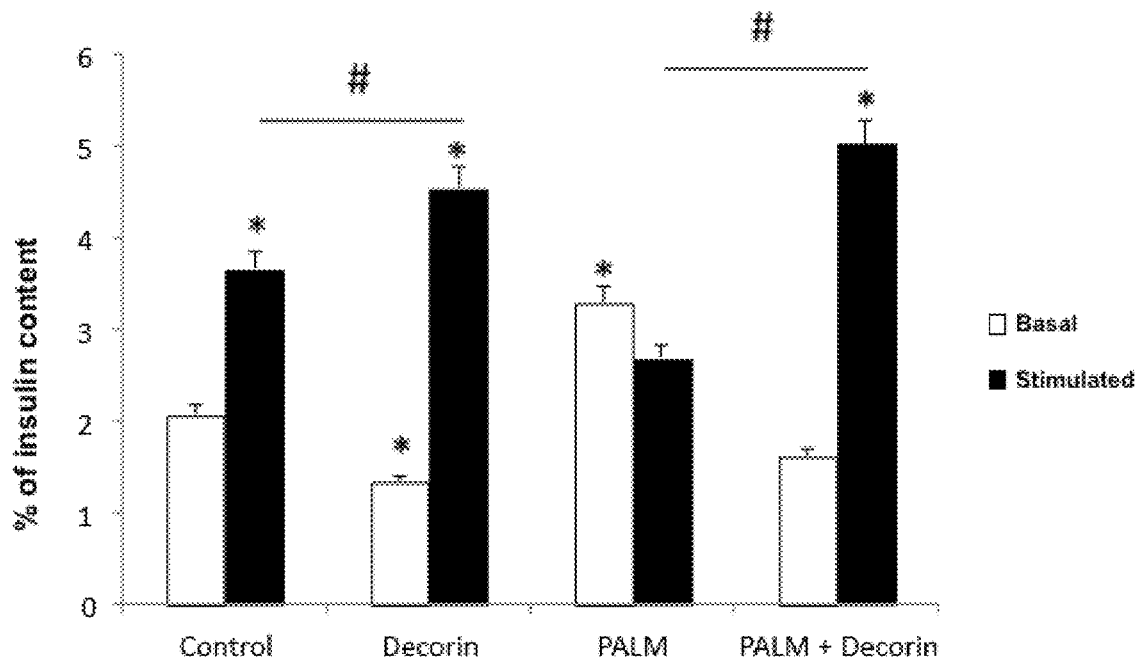
FIG. 29 represents the impact of decorin in humans on insulin secretion under control and rich in fatty acid (palmitate 48H) conditions. The decorin is abbreviated under the term "decorin".

FIG. 29 shows that decorin potentiates insulin secretion in response to glucose and protects from the effect of a fatty acids excess (palmitate: 500 mM final) on insulin secretion in human Langerhans islets. The 10 independent preparations of human islets were treated with decorin under control condition and after a pre-treatment with palmitate for 48 h. The human islets have been treated in their native forms (no dissociation or cell isolation); N=10.

Figure 30:
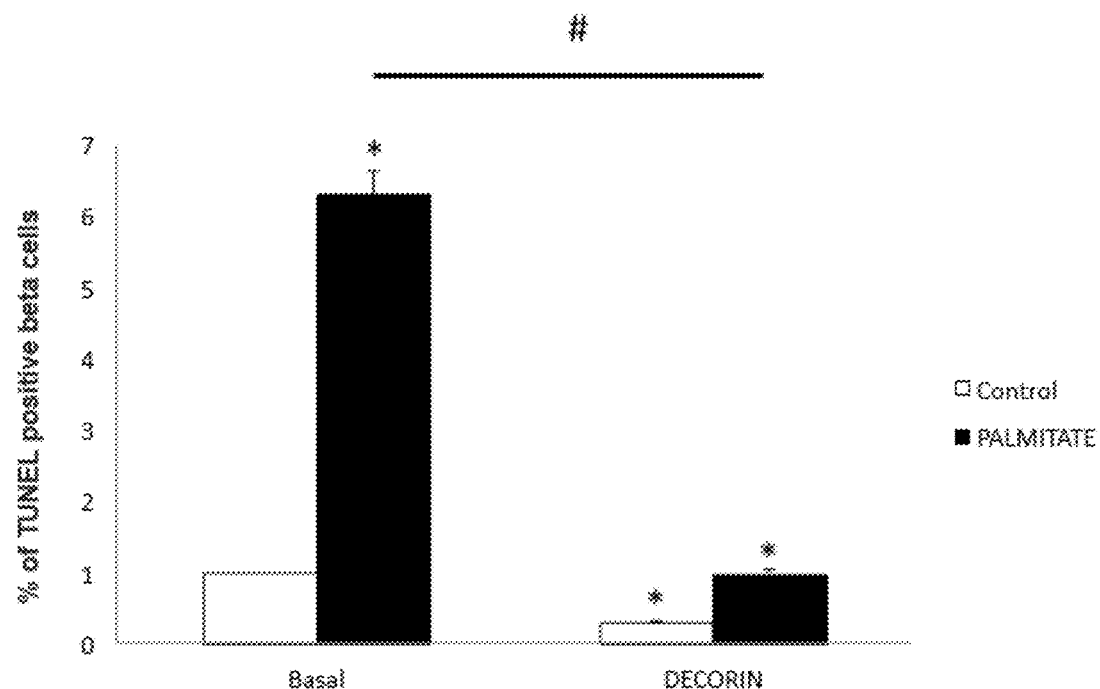
FIG. 30 represents the impact of decorin in humans on the survival and apoptosis under control and rich in fatty acid (48 h) conditions. The decorin is abbreviated under the term "decorin".

FIG. 30 shows that the decorin increases the survival of pancreatic beta cells and protects them from fatty acid-induced death which mimic the circulating conditions of a diabetic patient. The human islets of Langerhans have been treated and then a double labeling was made: a so-called TUNEL labeling marking dead cells and an insulin labeling marking pancreatic beta-cells. The 10 independent preparations of human islets were treated with decorin under control condition and after a pre-treatment with palmitate for 48 h. N=10

Figure 31:
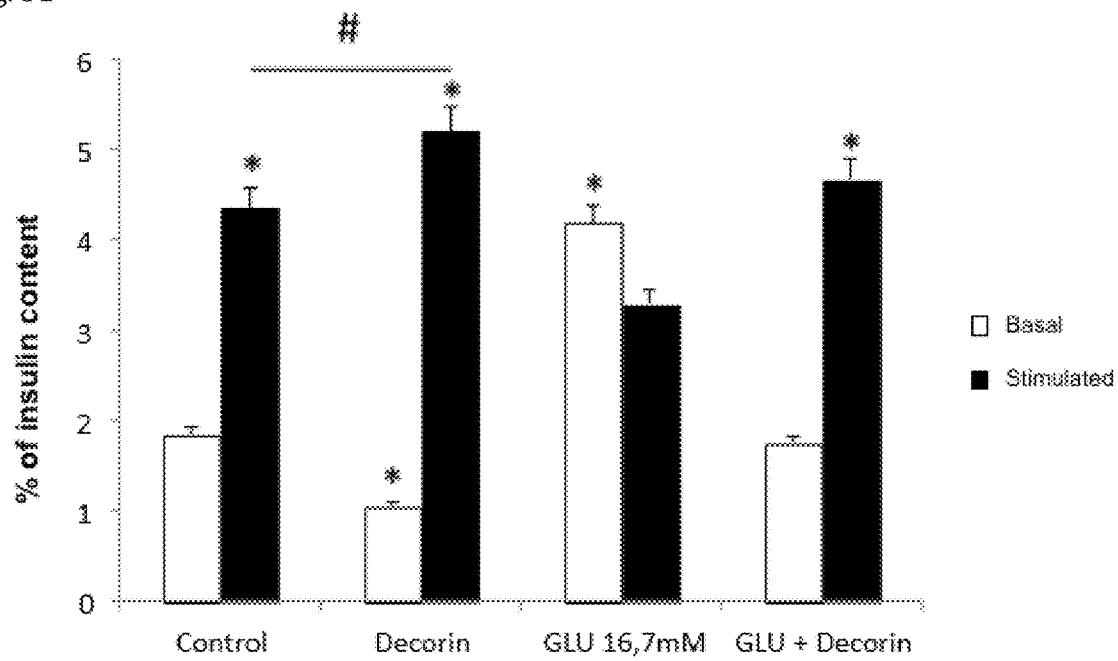
FIG. 31 represents the impact of decorin in humans on insulin secretion under control and rich in sugar (16.7 mM glucose 48H) conditions. The decorin is abbreviated under the term "decorin".

FIG. 31 shows that decorin potentiates insulin secretion in response to glucose and protects from the effect of sugar excess (glucose: 16.7 mM final) on insulin secretion in human Langerhans islets. The 10 independent preparations of human islets were treated with decorin under control conditions and after glucose pre-treatment for 48 h. The human islets have been treated in their native forms (no dissociation or cell isolation); N=10.

1. 8 Effect of Decorin in Subjects with Type II Diabetes

The human islets have been isolated from diabetic patients of type 2. The islets are incubated or not with the decorin for 24 h. It can be seen here on both preparations that a decorin treatment restores insulin secretion in response to glucose.

Figure 32:
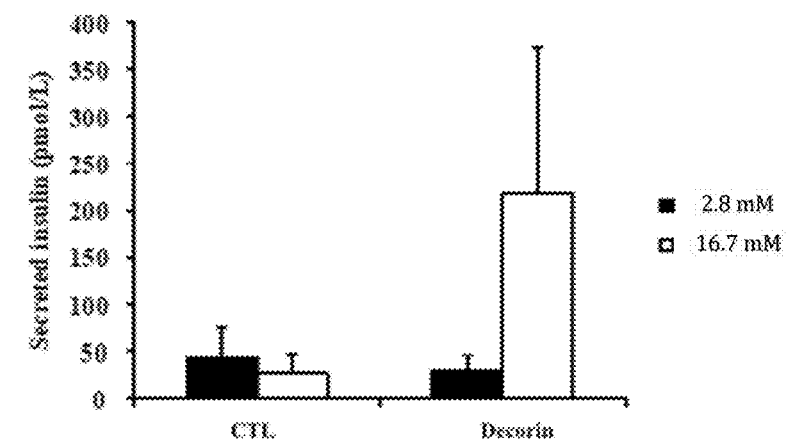
FIG. 32 represents the impact in humans of the decorin on insulin secretion in islets isolated from donors with type 2 diabetes.
Figure 32:
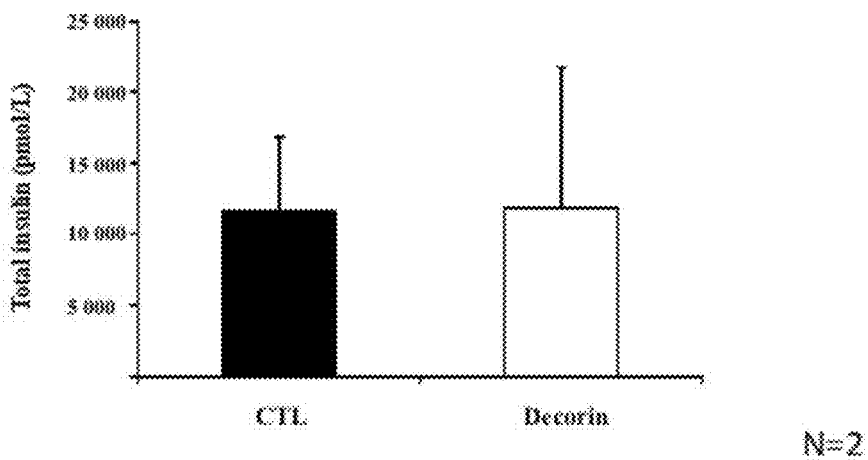

In particular, FIG. 32 shows that decorin restores insulin secretion in isolated human islets in diabetic patients of type 2. The human Langerhans islets were treated with decorin for 24 h prior to the measurement of insulin secretion in response to glucose. N=2

CONCLUSION

The study of apoptosis by the TUNEL method showed that decorin makes it possible to significantly decrease the apoptosis of pancreatic islet cells. Decorin potentiates insulin secretion in response to glucose stimulation. This increase is correlated to a decrease in glucagon secretion. In order to explain the positive effects of decorin on the survival and functionality of the pancreatic islets, the inventors have investigated the intracellular mechanisms by the Western Blot method, in particular in relation to the IGF-1R signaling pathway. The mechanisms of angiogenesis have been studied, in particular the expression of proteins involved in the two main angiogenesis pathways: the HIFs pathway and that of the VEGF. The study of VEGF-A secretion during 24 h by the islets shows that the decorin appears to improve this secretion and thus could promote the vascularisation mechanism.

Thus, the results obtained on Rat islets show that the use of decorin on islets can improve the survival, the function and the angiogenesis of pancreatic islets.

The results obtained in vivo in the rat show that the decorin is a highly interesting candidate for optimizing the survival and function of the post-transplantation graft but also during the preparation thereof and participates in maintaining insulin dependency in transplanted rats.

Materials and Methods

Animals

The study is carried out on Wistar rats. The rats are hosted according to the collective standards: by five in cages, in a room at 23±1° C. and in light/dark cycle of 12 h. Rats are fed with standard dry food (SAFE-A04, Villemoisson-sur-orge, France), the food and water are available ad libitum (free feeding mode, typically up to satiety). The experiments on Rats are carried out in accordance with the principles and rules of European legislation relating to the protection of animals. The protocol has been submitted to the ministry and evaluated by Regional Comity of Ethics in Animal Experimentation of Srasbourg (CREEAS) reference file 2015042216149683.

All in vivo experiments were carried out in accordance with the principles and guidelines of French legislation on the well-being of animals (Decree 2013-118, Feb. 1, 2013). The proposed experiments were evaluated by the French ethic comity number CEEA-35 and the protocols have been approved by the French government by virtue of the authorization n°2018040316185500. The Lewis rats were provided by the Charles River company (Saint-Germain-Nuelles, France). The rats were housed in standard collective cages, in a controlled temperature room (22±1° C.) with a cycle of 12 h of light/12 h of darkness. They have been fed with standard SAFE-A04 granules (Villemoisson-sur-orge, France). The food and water were available ab libitum.

Rat Pancreatic Islet Removal

The isolation of pancreatic islets is carried out on male Wistar Rats of body weight ranging from 200 to 220 g, previously anesthetized with Imalgen® (Ketamine, Marial, Lyon, France) supplemented with Rompun® (Xyalazine 2%, Bayer, Puteaux, France) by intraperitoneal route at a rate of 100 ml/100 g of body weight.

The isolation of pancreatic islets is carried out according to the method described by Sutton et al. (Sutton R. et al 1986). A cut of the ventral buttonhole is carried out, and then the pancreas is released from the other organs. After ligating the bile duct to the duodenal mouth, 10 ml of collagenase of type XI (Sigma-Aldrich, St-Louis, USA) at a rate of 1 mg/ml, are injected in the pancreas of the animal via a catheter in the bile duct at the hepatic mouth. The pancreas is completely removed and the pancreatic islets are then separated from the exocrine tissue by centrifugation, using a discontinuous gradient of Ficoll. The purified islets are cultured during a night in flanges of 25 cm2 in medium M199* (Gibco®, Saint Aubin, France) supplemented with 10% of SVF (Sigma-Aldrich) and 1% of ABAM for 24 h at 37° C., 5% of CO 2 and in humid atmosphere.

Pancreatic Islets Treatments

The pancreatic islets contained in the flanges are then cultured in 24-well plates at a density of 250 islets per well. For the Rat islets, the culture medium is the M199 supplemented as described above. The culture medium for the human islets is the CMRL-1066 supplemented as described above. The culture media contain or not decorin (R&D, Systems, Minneapolis, USA) at the final concentration of 1 µg/ml. The culture is carried out for 24 h at 37° C., 5% CO2 and in humid atmosphere. After 24 h of incubation, the following tests were carried out.

Study of Apoptosis by Immunofluorescence

The islets were isolated and cultured in the absence or presence of decorin in a 24-well plate at a concentration of 1250 islets per well, at 37° C. and 5% CO2.

The islets are retrieved and placed in an Optimal Cutting Temperature (OCT) compound before being solidified in the liquid nitrogen. Sections of 10 um are made with a microtome-cryostat (Leica CM3050 s) and fixed on blades for analyses.

The disruptions at the ends of the 3-OH strands of the DNA, generated during apoptosis, are detected using the TUNEL technique (Terminal deoxynucleotidyl-transferase-mediated deoxyuridine 5-triphosphate nick-end labeling) according to the manufacturer protocol (In situ cell death detection kit, Roche).

The cells were co-labeled with an anti-insulin monoclonal antibody (Cell Signaling Technology) and the nucleus of the cells was labeled with DAPI. The number of TUNEL-positive cells was determined by counting after observation with the fluorescence microscope. For each experiment, about 1000 cells were counted with the ImageJ software.

Study of Proliferation by K167 Immunolabeling

The histological section blades are made and the labeling of KI67 is carried out. This protein is synthesized only when the cells are in the division phase. The cells were labeled with an anti-KI67 antibody (Novus Biologicals) used at a dilution of 1:100 in a saline phosphate buffer (PBS). The nucleus of the cells was labeled with DAPI.

Functionality Test

Culture media at glucose concentrations of 2.8 and 16.7 mM are prepared from a solution of Krebs (115 mM NaCl, 4.7 mM KCl, 3.4 mM $CaCl_2$), 1.2 mM $KH_2PO_4$, 2.1 mM $MgSO_4$, 21.2 mM $NaHCO_3$, 13.5 mM Hepes, [pH 7.4]) supplemented with 10% of SVF.

10 islets are taken and synchronized for 30 minutes in the medium 2.8 mM glucose, then cultured 1 h in the medium 2.8 mM and finally 1 h in 16.7 mM glucose, at 37° C. and 5% CO2. After these incubations, the islets are placed in an acid-ethanol solution to measure the total content of insulin and glucagon of the islets that have not been secreted during the test. The supernatant of the culture media and the acid-ethanol are maintained at −20° C. until the dosages. The quantity of insulin or glucagon in each sample is determined by the ELISA method according to the manufacturer protocol (Mercodia AB, Uppsala, Sweden). The secretion of the islets is expressed as a percentage of the total content in insulin or glucagon.

Western Blotting

The total protein content is extracted from the cultured islets by virtue of a lysis buffer supplemented with a protease inhibitor (Roche Diagnostics GmbH, Mannheim, Germany). The samples were centrifuged at 10 000 g for 10 minutes and the protein concentration in each sample was determined by a Bradford assay, with BSA as a standard.

For each sample, 20 µg of proteins are deposited in the wells of a 4-12% SDS-polyacrylamide gel (SDS-PAGE). The proteins are separated by electrophoresis and transferred to a PVDF membrane (Millipore). The specific sites of the membrane are blocked with a Tris-Buffered Saline solution and 0.1% Tween 20 (TBS-T) containing 5% milk, for 1 h and at room temperature. The membrane is then incubated with a solution of primary antibodies during the night and at 4° C. The primary antibodies are diluted to 1:1000 in a TBS-T solution containing 5% BSA.

The antibodies used are as follows: monoclonal anti-phospho-IRS1 Tyr628 (Novus Biologicals, Littleton, CO, USA); polyclonal anti-phospho-IRS2 Tyr978 (RayBiotech, Norcross, USA); monoclonal anti-Akt (Cell Signaling Technology, Leiden, NETHERLANDS); monoclonal anti-phospho-Akt Ser473 (Cell Signaling Technology); polyclonal anti-phospho-AS160 Ser/Thr (Cell Signaling Technology); monoclonal anti-NF-kB p65 (Cell Signaling Technology); monoclonal anti-phospho-NF-kB p65 Ser536 (Cell Signaling Technology): monoclonal anti-FoxO1 (Cell Signaling Technology); polyclonal anti-phospho-FoxO1.

Thr24/FoxO3a Thr32 (Cell Signaling Technology); polyclonal anti-SIRTI (Cell Signaling Technology); polyclonal anti-PGC1α (Abcam, Cambridge, USA); polyclonal anti-PHD1, polyclonal anti-PHD2, et polyclonal anti-PHD3 (Novus Biologicals); monoclonal anti-HIF-1a (Novus Biologicals); monoclonal anti-HIF-2 (Novus Biologicals); polyclonal anti-VEGF Receptor 2 (Abcam); polyclonal anti-phospho-VEGF Receptor 2 Tyr1054/Tyr1059 (Abcam); polyclonal anti-IGF-1 Receptor (Novus Biologicals); monoclonal anti-phospho-IGF-1 Receptorβ/Insulin Receptor β Tyr1150/1151 (Cell Signaling); polyclonal anti-β-actine dilution 1:10000 (Abcam).

The membranes are then rinsed three times five minutes with TBS-T, then incubated 1 h at room temperature with the secondary antibodies diluted to 1:10000 in a solution of TBS-T and 5% of BSA. Depending on the species that produces the primary antibodies, either an anti-Rabbit immunoglobulin G (IgG) antibody coupled with a horseradish Peroxidase enzyme (Horseradish Peroxidase, HRP) (Sigma), or an anti-mouse IgG antibody coupled with an HRP (Sigma) is used.

The membranes are rinsed as described above and the activity of HRP is detected after addition of the substrate SUPER SIGNAL™ West Femto Maximum Sensitivity Substrate (Thermo Fisher Scientific Inc, Pittsburgh, PA, USA). The light emission is then captured by a camera (Chemidoc, Bio-Rad Laboratories, Hercules, CA, USA) and images are taken.

The light energy emitted by the HRP enzyme is analyzed in a semi-quantitatively manner using the ImageJ software. The light intensity with respect to each protein is normalized by means of b-actin.

VEGF-A Secretion Kinetics

The islets were isolated and cultured in the absence or in the presence of decorin in a 24-well plate at a concentration of 500 islets per well, at 37° C. and 5% CO2. After 2, 4, 8, 12, or 24 h of culture, the supernatant is taken and stored at −20° C. until the dosage of VEGF-A.

The quantity of VEGF-A in the samples was determined by the ELISA method according to the manufacturer protocol (RayBiotech). The protein concentration of each well was determined and the quantity of VEGF-A was normalized by the total quantity of protein.

Islet Transplantation

The islet grafting was carried out in male Lewis rats (200 g), inbred strain, in order to avoid immunological rejection reactions. Diabetes has been induced by a single intraperitoneal injection of 75 mg/kg of streptozotocin (STZ, Sigma-Aldrich) diluted in sterile physiological serum. The animals were considered to be diabetic after two consecutive measurements of blood glucose level >3 g/L using a blood glucose reader (Accu-chek Performa, Roche). The rats were then divided into 9 groups of 6 animals per group and metabolic monitoring was carried out for 2 months. Concerning the transplantation of pancreatic islets, after gas anesthesia with isoflurane, diabetic rats have undergone a laparotomy followed by intraportal injection either of CMRL medium alone (SHAM group), or of pancreatic islets, at a rate of 5000 IEQ/kg (suboptimal condition, quickly allowing to identify differences between the groups) or of 10000 IEQ/kg (optimal condition, comparable to what is carried out in clinical). Thus, among the transplanted rats, we find the control groups (without pre-treatment of islets) and decorin (pre-treatment of islets with 1 μg/mL of decorin for 24 h) in a suboptimal or optimal quantity and having received or not a daily intraperitoneal injection of 1 μg/mL of decorin.

Diabetic rats received a subcutaneous daily injection of 6 Ul insulin (blood glucose >3 g/L) or of 3 UI (2 g/L≥ blood glucose <3 g/L) diluted in daily sterile physiological serum (Lantus SoloStar® with 100 UI/ml of insulin glargine, Sanofi, Paris, France).

Metabolic Monitoring

The metabolic control was monitored for 56 days after transplantation. The body weight gain (gram with respect to t=0 post-transplantation), blood glucose (g/L) and c-peptidemia (pmol/L) were evaluated over time but also over the set of 56 days of metabolic monitoring by measuring the area under the curve. To complete these data, a comparative study between the groups has been made regarding, on one hand, the onset of insulin independence and, on the other hand, the daily needs of insulin.

Statistical Analysis of the Results

The statistical analyses were carried out using the software Statistica (StatSoft, Maisons-Alfort, France). To analyze the results, a non-parametric Mann-Whitney test is used. The results are presented in the form average±SEM and the number of repetitions is indicated for each graphic. A value of p less than 0.05 was considered to be significantly statistical. For the graphical representation, the value of p is noted as follows: $p<0.05$ with *, $p<0.01$ with  and $p<0.001$ with *.

The statistical tests of the experiments in vivo were carried out with the software GraphPad Prism version 7. The differences between the groups were evaluated using a variance analysis (One way ANOVA), followed by the test of multiple comparisons of Tukey. The post-hoc tests are executed only if F reaches $P<0.05$ and no significant variance inhomogeneity is present. The data was reported as an average±SEM for the number of repetitions indicated and that a value p of <0.05 was considered as statistically significant.

The invention claimed is:

1. A method for increasing insulin production in a subject suffering from diabetes, wherein the method comprises:
   transplanting pancreatic islet cells to the subject; and
   administering, to the subject, decorin or a pharmaceutical composition comprising decorin.

2. The method according to claim 1, wherein the diabetes is type 1 diabetes.

3. The method according to claim 1, wherein the diabetes is type 2 diabetes.

4. The method according to claim 1, wherein the diabetes is gestational diabetes.

5. The method according to claim 1, wherein the method comprises:
   administering an immunosuppressive therapy and/or anti-inflammatory treatment concomitant or following the transplanting of pancreatic islet cells to the subject.

6. The method according to claim 5, wherein the immunosuppressive therapy and/or anti-inflammatory treatment is selected from immunosuppressive agents, anti-TNFα, calcineurin inhibitors, T cell depleting agents, or combinations thereof.

7. The method according to claim 5, wherein the immunosuppressive therapy and/or anti-inflammatory treatment is a combination of an immunosuppressive agent and a monoclonal CD20 antibody.

8. The method according to claim 1, wherein the pharmaceutical composition is administered in a combination with an antidiabetic active ingredient.

9. The method according to claim 8, wherein the antidiabetic active ingredient is selected from insulin, metformin, sulfonylureas, tolbutamide, acetohexamide, tolazamide, chlorpropamide, glibenclamide, glimepiride, glipizide, gliclazide, glycopyramide, gliquidone, alpha-glucosidase inhibitors, acarbose, miglitol, voglibose, thiazolidinediones, pioglitazone, rosiglitazone, meglitinides, repaglinide, nateglinide, incretino-mimetic, a glucagon-like peptide analog, exenatide or its derivatives, taspoglutide, liraglutide, semaglutide, a dipeptidyl peptidase-4 inhibitor, vildagliptin, sitagliptin, saxagliptin, linagliptin, allopigezine, dapagliptin, canamycin analog, palmlintide, a sodium glucose transporter inhibitor, emagliflozin, dapagliptin, canamycin, or a combination thereof.

10. The method according to claim 1, wherein the subject is grafted with the pancreatic islet cells before administration of decorin or the pharmaceutical composition comprising decorin.

11. The method according to claim 1, wherein the pancreatic islet cells have been treated with decorin before the transplanting.

12. The method according to claim 1, wherein said pharmaceutical composition comprises human cells and the decorin as an active ingredient.

13. The method according to claim 12, wherein the human cells are selected from endocrine cells and pancreatic islet cells.

* * * * *

SEQUENCE LISTING

```
<160> NUMBER OF SEQ ID NOS: 2

<210> SEQ ID NO 1
<211> LENGTH: 359
<212> TYPE: PRT
<213> ORGANISM: artificial
<220> FEATURE:
<223> OTHER INFORMATION: Decorine

<400> SEQUENCE: 1

Met Lys Ala Thr Ile Ile Leu Leu Leu Ala Gln Val Ser Trp Ala
1               5                   10                  15

Gly Pro Phe Gln Gln Arg Gly Leu Phe Asp Phe Met Leu Glu Asp Glu
                20                  25                  30

Ala Ser Gly Ile Gly Pro Glu Val Pro Asp Asp Arg Asp Phe Glu Pro
            35                  40                  45

Ser Leu Gly Pro Val Cys Pro Phe Arg Cys Gln Cys His Leu Arg Val
        50                  55                  60

Val Gln Cys Ser Asp Leu Gly Leu Asp Lys Val Pro Lys Asp Leu Pro
65                  70                  75                  80
```

```
Pro Asp Thr Thr Leu Leu Asp Leu Gln Asn Asn Lys Ile Thr Glu Ile
                85                  90                  95

Lys Asp Gly Asp Phe Lys Asn Leu Lys Asn Leu His Ala Leu Ile Leu
            100                 105                 110

Val Asn Asn Lys Ile Ser Lys Val Ser Pro Gly Ala Phe Thr Pro Leu
        115                 120                 125

Val Lys Leu Glu Arg Leu Tyr Leu Ser Lys Asn Gln Leu Lys Glu Leu
    130                 135                 140

Pro Glu Lys Met Pro Lys Thr Leu Gln Glu Leu Arg Ala His Glu Asn
145                 150                 155                 160

Glu Ile Thr Lys Val Arg Lys Val Thr Phe Asn Gly Leu Asn Gln Met
                165                 170                 175

Ile Val Ile Glu Leu Gly Thr Asn Pro Leu Lys Ser Ser Gly Ile Glu
            180                 185                 190

Asn Gly Ala Phe Gln Gly Met Lys Lys Leu Ser Tyr Ile Arg Ile Ala
        195                 200                 205

Asp Thr Asn Ile Thr Ser Ile Pro Gln Gly Leu Pro Pro Ser Leu Thr
    210                 215                 220

Glu Leu His Leu Asp Gly Asn Lys Ile Ser Arg Val Asp Ala Ala Ser
225                 230                 235                 240

Leu Lys Gly Leu Asn Asn Leu Ala Lys Leu Gly Leu Ser Phe Asn Ser
                245                 250                 255

Ile Ser Ala Val Asp Asn Gly Ser Leu Ala Asn Thr Pro His Leu Arg
            260                 265                 270

Glu Leu His Leu Asp Asn Asn Lys Leu Thr Arg Val Pro Gly Gly Leu
        275                 280                 285

Ala Glu His Lys Tyr Ile Gln Val Val Tyr Leu His Asn Asn Asn Ile
    290                 295                 300

Ser Val Val Gly Ser Ser Asp Phe Cys Pro Pro Gly His Asn Thr Lys
305                 310                 315                 320

Lys Ala Ser Tyr Ser Gly Val Ser Leu Phe Ser Asn Pro Val Gln Tyr
                325                 330                 335

Trp Glu Ile Gln Pro Ser Thr Phe Arg Cys Val Tyr Val Arg Ser Ala
            340                 345                 350

Ile Gln Leu Gly Asn Tyr Lys
        355

<210> SEQ ID NO 2
<211> LENGTH: 1778
<212> TYPE: DNA
<213> ORGANISM: artificial
<220> FEATURE:
<223> OTHER INFORMATION: Decorine

<400> SEQUENCE: 2
gaattccggt tacgtctgcc ccccggtggc aaattcccgg attaaaaggt tccctggttg      60
tgaaaataca tgagataaat catgaaggcc actatcatcc tccttctgct tgcacaagtt    120
tcctgggctg gaccgtttca acagagaggc ttatttgact ttatgctaga agatgaggct    180
tctgggatag gccagaagt tcctgatgac cgcgacttcg agccctccct aggcccagtg     240
tgccccttcc gctgtcaatg ccatcttcga gtggtccagt gttctgattt gggtctggac    300
aaagtgccaa aggatcttcc ccctgacaca actctgctag acctgcaaaa caacaaaata    360
accgaaatca agatgggaga ctttaagaac ctgaagaacc ttcacgcatt gattcttgtc    420
```

```
aacaataaaa ttagcaaagt tagtcctgga gcatttacac ctttggtgaa gttggaacga    480
ctttatctgt ccaagaatca gctgaaggaa ttgccagaaa aaatgcccaa aactcttcag    540
gagctgcgtg cccatgagaa tgagatcacc aaagtgcgaa aagttacttt caatggactg    600
aaccagatga ttgtcataga actgggcacc aatccgctga agagctcagg aattgaaaat    660
ggggctttcc agggaatgaa gaagctctcc tacatccgca ttgctgatac caatatcacc    720
agcattcctc aaggtcttcc tccttccctt acggaattac atcttgatgg caacaaaatc    780
agcagagttg atgcagctag cctgaaagga ctgaataatt tggctaagtt gggattgagt    840
ttcaacagca tctctgctgt tgacaatggc tctctggcca acacgcctca tctgagggag    900
cttcacttgg acaacaacaa gcttaccaga gtacctggtg ggctggcaga gcataagtac    960
atccaggttg tctaccttca taacaacaat atctctgtag ttggatcaag tgacttctgc   1020
ccacctggac acaacaccaa aaaggcttct tattcgggtg tgagtctttt cagcaacccg   1080
gtccagtact gggagataca gccatccacc ttcagatgtg tctacgtgcg ctctgccatt   1140
caactcggaa actataagta attctcaaga aagccctcat ttttataacc tggcaaaatc   1200
ttgttaatgt cattgctaaa aaataaataa aagctagata ctggaaacct aactgcaatg   1260
tggatgtttt acccacatga cttattatgc atgttatgat cagtagttga ttttgagaaa   1320
gctctatgag ctctaagtaa ctgcatggtt ttttgtttaa tgtaatatag gagacccttc   1380
acattcccaa ggaatatatt ccaaaacatt tttgtgaata tctaagtttg tgaaactact   1440
agggcatgat acagtaaggt gtaattacag aatttacgaa atgtaaatga cctctacaga   1500
gttttatgga atacctggta ctaacgtagg cagctgcaaa accacactga gttacagctg   1560
tcagccctcc tcattcctaa ataacttgcc ttacatatca gccctcccac ttctgaagtt   1620
caaattagtg cctcggaaat gtagaattta ttatttgtca ttttttttt tttagcatag   1680 attgagaaca gttgaactct taaatcctca gatgccaggg gtctgctcta gcatcagtaa   1740
gtatttagca gaaactaact ccgtaatgaa tggaattc                           1778
```